United States Patent
Sugiyama et al.

[19]

[11] Patent Number: 6,104,973
[45] Date of Patent: Aug. 15, 2000

[54] DEVICE FOR STARTING OCCUPANT CRASH PROTECTOR

[75] Inventors: Takami Sugiyama; Hideki Nishi, both of Aichi; Sachiko Nakamura, Tokyo; Yukihiro Okimoto, Tokyo; Takashi Furui, Tokyo, all of Japan

[73] Assignees: Mitsubishi Jidosha Kogyo Kabushiki Kaisha; Mitsubishi Denki Kabushiki Kaisha, both of Tokyo, Japan

[21] Appl. No.: 08/722,776

[22] Filed: Sep. 27, 1996

[30] Foreign Application Priority Data

Oct. 12, 1995 [JP] Japan .................................. 7-264493

[51] Int. Cl.[7] .................................................. B60R 21/22
[52] U.S. Cl. ......................... 701/46; 73/12.04; 73/118.1
[58] Field of Search ................................. 701/1, 8, 9, 45, 701/46; 73/11.07, 11.04, 12.04, 506, 118.1

[56] References Cited

U.S. PATENT DOCUMENTS

| | | | |
|---|---|---|---|
| 5,068,793 | 11/1991 | Condne et al. | 701/46 |
| 5,363,302 | 11/1994 | Allen et al. | 701/46 |
| 5,440,485 | 8/1995 | Okimoto et al. | 701/46 |
| 5,483,451 | 1/1996 | Ohmae et al. | 701/46 |
| 5,758,301 | 5/1998 | Saito et al. | 701/46 |
| 5,790,404 | 8/1998 | Faye et al. | 701/46 |
| 5,815,393 | 9/1998 | Chae | 701/46 |

FOREIGN PATENT DOCUMENTS

| | | |
|---|---|---|
| 444 866 | 9/1991 | European Pat. Off. . |
| 4-287748 | 10/1992 | Japan . |
| 4-317837 | 11/1992 | Japan . |

*Primary Examiner*—George Dombroske
*Attorney, Agent, or Firm*—Sughrue, Mion, Zinn, Macpeak & Seas, PLLC

[57] ABSTRACT

A device for starting an occupant crash protector can output, as a start signal, a logical product of an output of a collision determining mechanism and an output of a non-collision determining mechanism. The collision determining mechanism detects a collision including an impact that does not require a start-up. The non-collision determining mechanism detects only a collision that requires a start-up using a value obtained by subtracting a value varied with time from the output of an acceleration sensor and integrating the result of the subtraction.

10 Claims, 40 Drawing Sheets

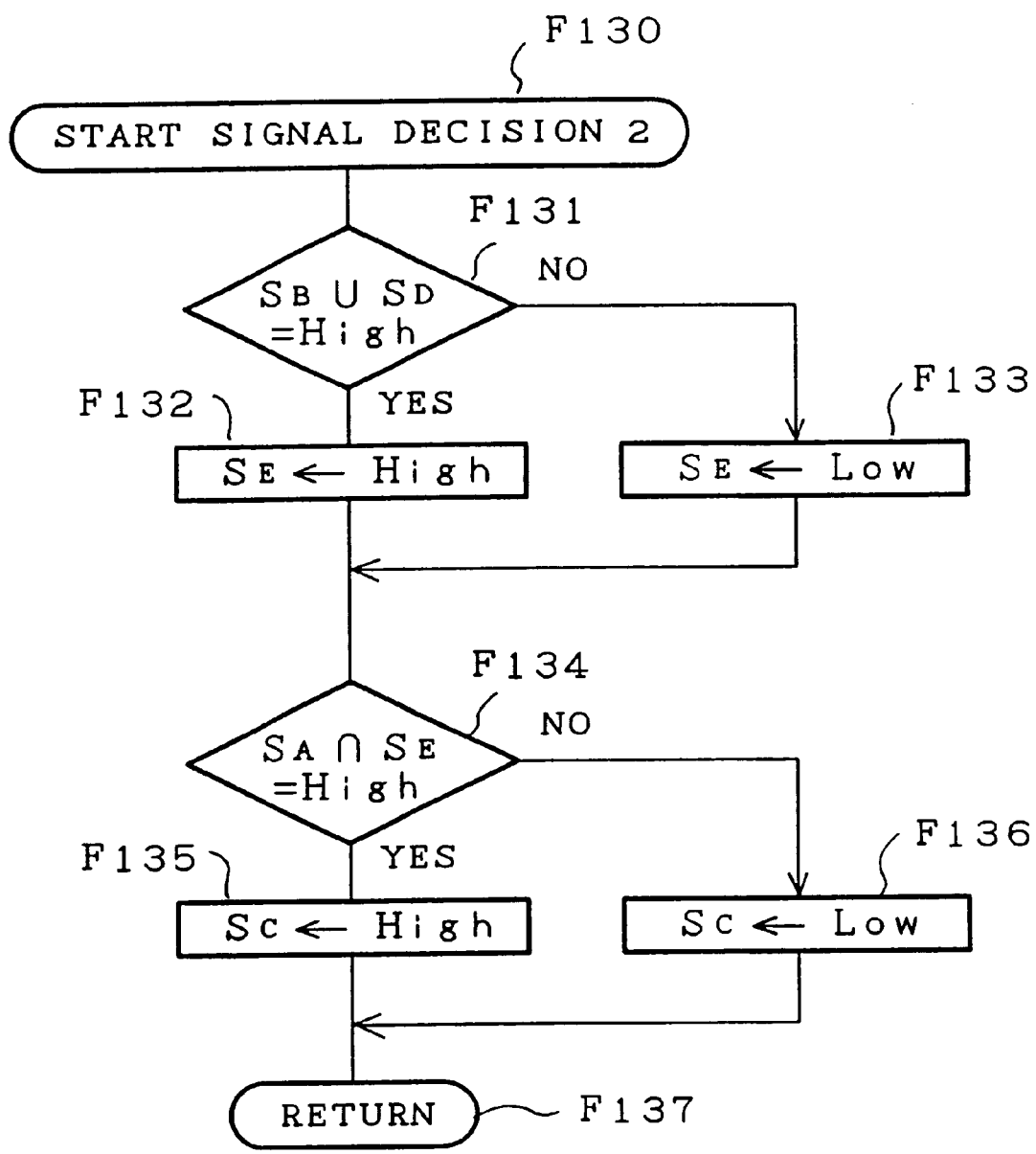

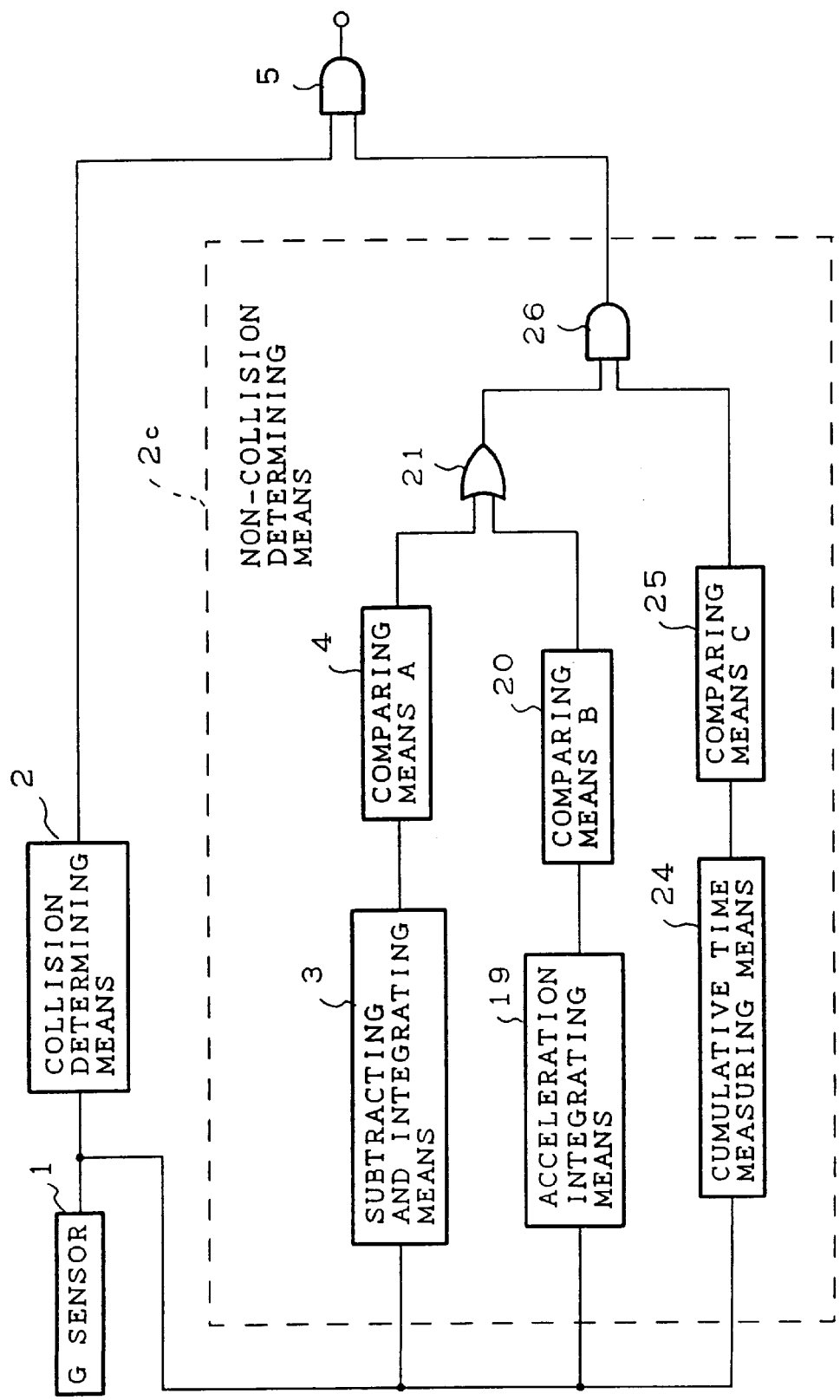

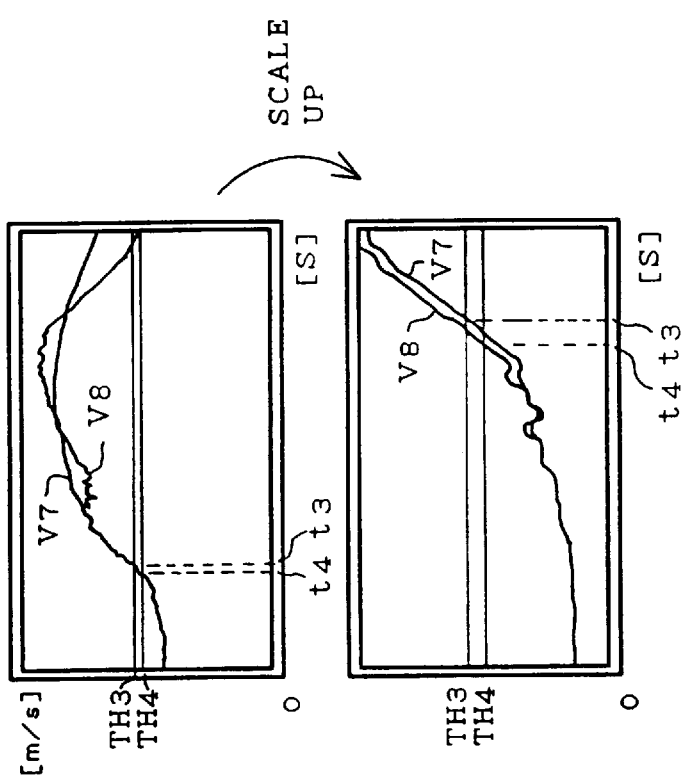
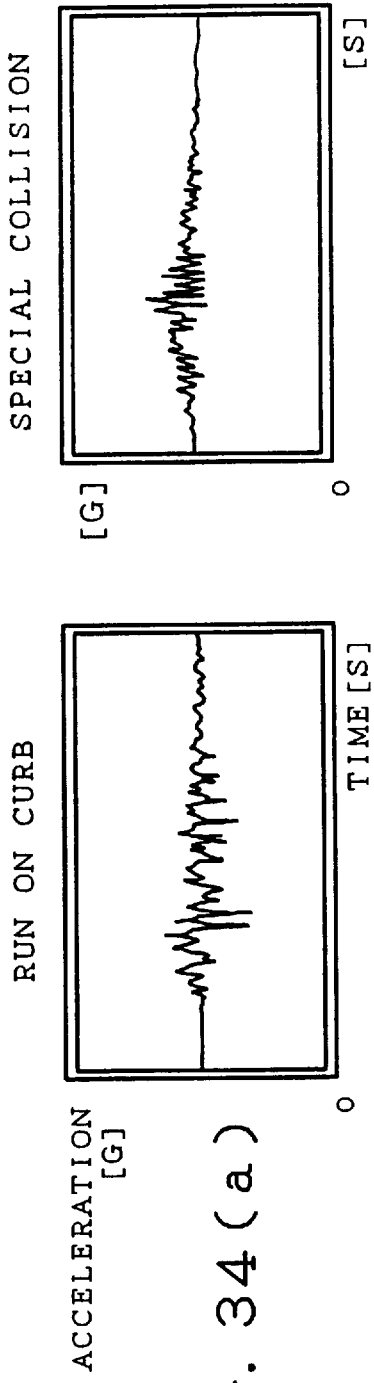
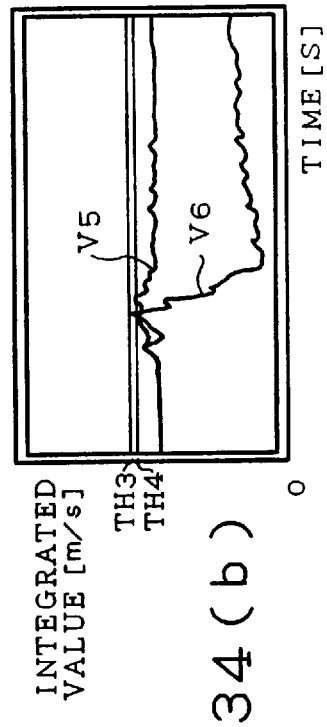
FIG. 34(a)
FIG. 34(b)

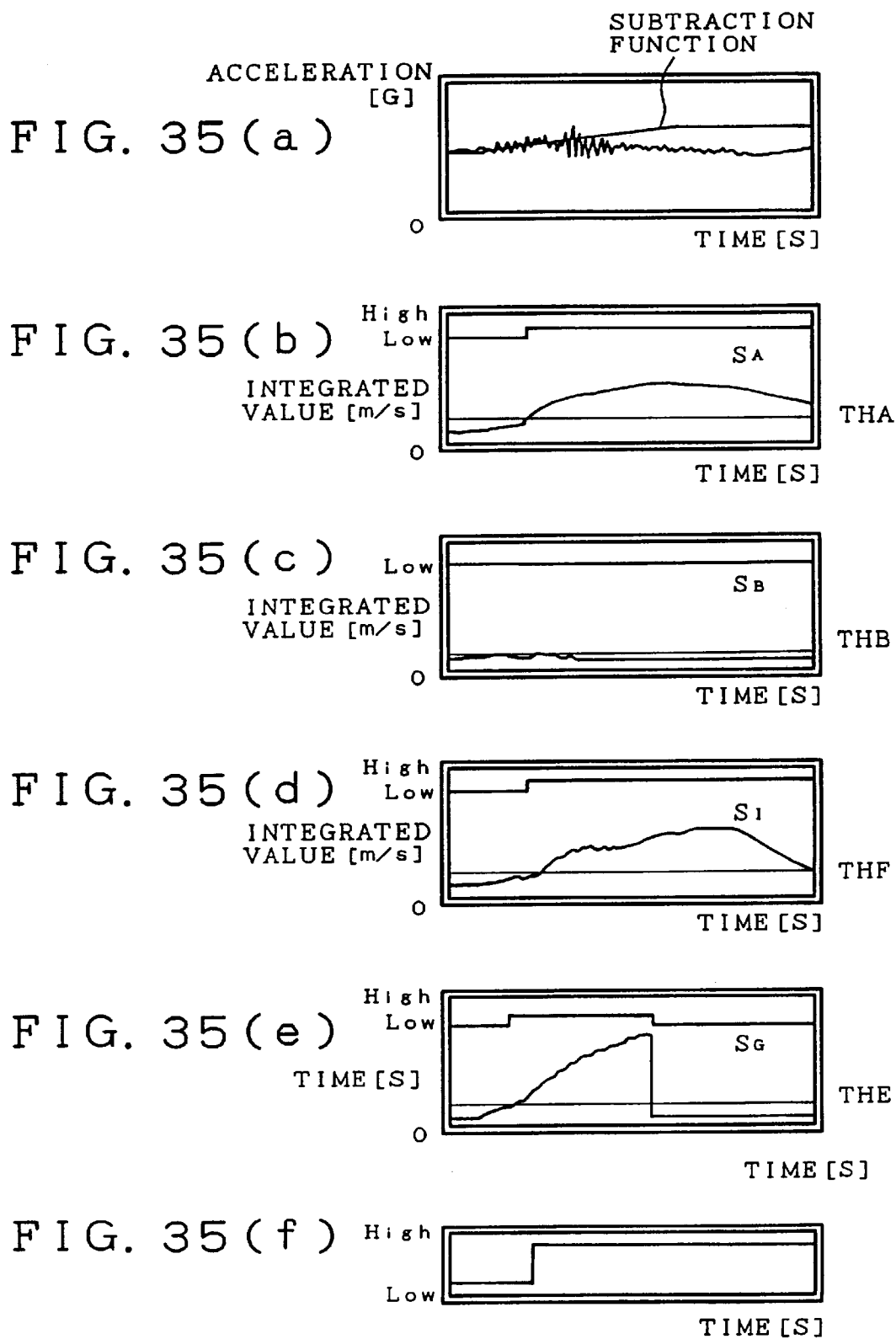

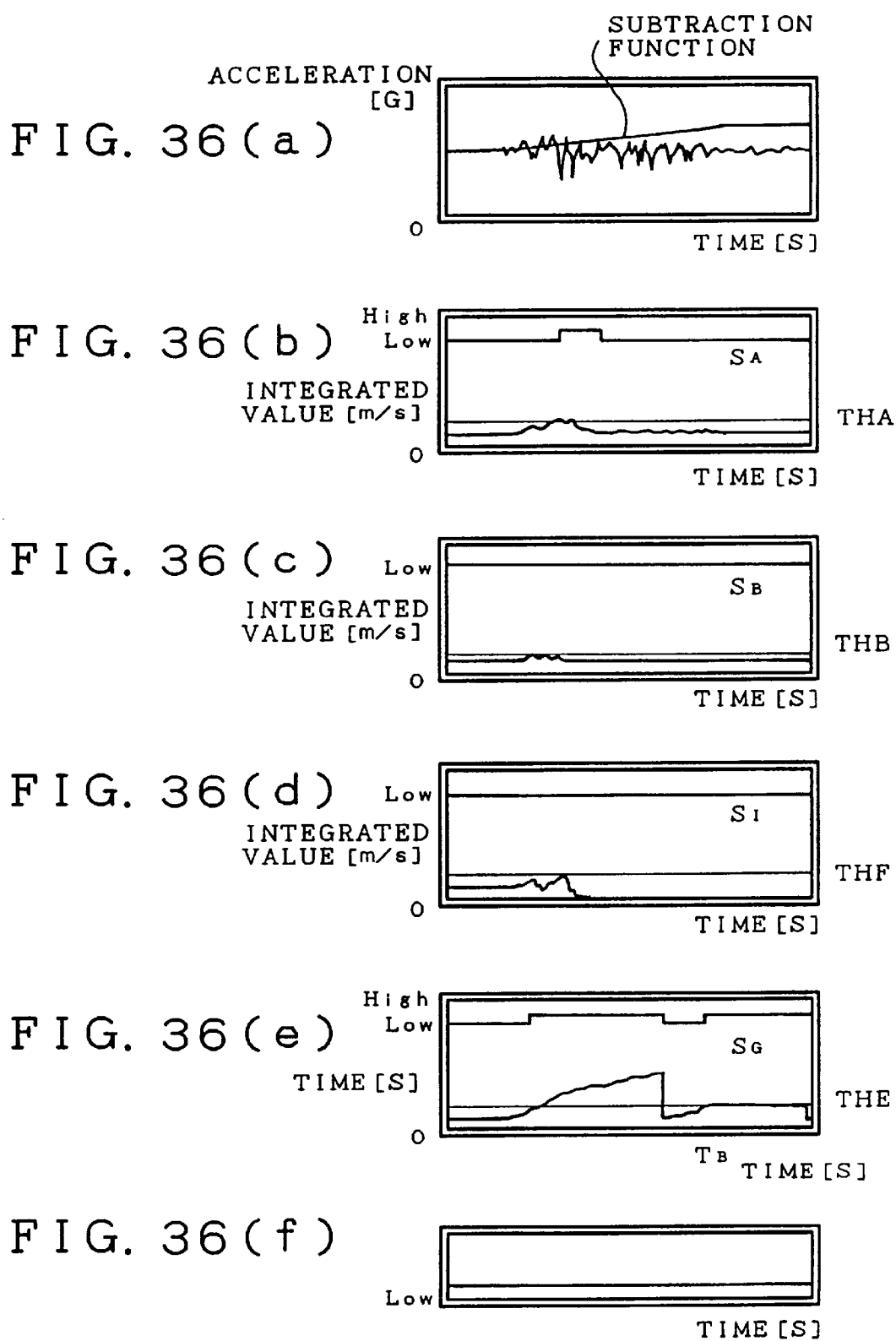

DEVICE FOR STARTING OCCUPANT CRASH PROTECTOR

BACKGROUND OF THE INVENTION

1. Field of the Invention:

The present invention relates to a device for starting an occupant crash protector, such as an air bag, a seat belt pretensioner, which detects a vehicle collision and is activated based on the result of detection.

2. Description of the Prior Art:

FIG. 40 is a block diagram showing a conventional device for starting an occupant crash protector, which has been disclosed in JP-A-4/287748, for example. In the drawing, reference numeral 1 indicates an acceleration sensor (hereinafter abbreviated as "G sensor") for outputting a signal about an acceleration developed in the direction of acceleration or deceleration of a vehicle. Reference numeral 1A indicates an integral computing means for obtaining a total acceleration integrated value indicative of a change in vehicle speed, based on the output of the G sensor 1. Reference numeral 2A indicates a first comparing means for comparing the total acceleration integrated value with a threshold level (hereinafter abbreviated as "threshold"). Reference numeral 31 indicates an acceleration direction integrating means for integrating the signal about the acceleration developed in the direction of acceleration of the vehicle, which is outputted from the G sensor 1. Reference numeral 29 indicates a deceleration direction integrating means for integrating the signal about the acceleration developed in the direction of deceleration of the vehicle, which is outputted from the G sensor 1. Reference numeral 3A indicates an integrated-value ratio computing means for computing the ratio of the integrated value in the deceleration direction integrating means 29 to the integrated value in the acceleration direction integrating means 31. Reference numeral 4A indicates a second comparing means for comparing the integrated-value ratio with a threshold. Reference numeral 5A indicates a trigger signal output means for outputting a trigger signal when it is judged in the first comparing means 2A that the total acceleration integrated value increased in the direction of deceleration of the vehicle has exceeded the threshold. Reference numeral 6A indicates a vehicle safety device which is started in response to the trigger signal.

The operation of the device shown in FIG. 40 will now be described.

The G sensor 1 outputs an acceleration developed upon a vehicle collision. The integral computing means 1A integrates the output of the G sensor 1 so as to output a speed signal indicative of a change in vehicle speed. The first comparing means 2A outputs a vehicle-speed change detected signal if the output of the integral computing means 1A is greater than a predetermined threshold.

The acceleration direction integrating means 31 integrates only the signal about the acceleration developed in the direction of acceleration of the vehicle, which is outputted from the G sensor 1. The deceleration direction integrating means 29 integrates only the signal about the acceleration developed in the direction of deceleration of the vehicle, which is outputted from the G sensor 1. The integrated-value ratio computing means 3A produces the ratio of the integrated value in the acceleration direction integrating means 31 to that in the deceleration direction integrating means 29. The second comparing means 4A outputs an acceleration detected signal therefrom if the ratio is greater than a value preset therein. The trigger signal output means 5A outputs a trigger signal when the output of the first comparing means 2A and the output of the second comparing means 4A are both outputted and starts up the vehicle safety device 6A using the trigger signal.

Thus, when this is a shock such that a very large acceleration is alternately developed in the directions of acceleration and deceleration of the vehicle as in the case of an artificial impact or shock (hereinafter called "hammering") which no requires start-up of the vehicle safety device 6A, acts on the vehicle, the integrated-value ratio becomes substantially constant and no outputs is produced from the second comparing means 4A. Therefore, the trigger signal is not outputted from the trigger signal output means 5A.

Since the threshold of the first comparing means 2A is set higher so that the output of the integral computing means 1A does not exceed the threshold of the first comparing means 2A, even if the output of the integrated-value ratio computing means 3A exceeds the threshold upon hammering and the output is produced from the second comparing means 4A, the trigger signal output means 5A does not output a trigger signal.

On the other hand, since the integrated value in the direction of deceleration of the vehicle exceeds the threshold of the first comparing means 2A in a relatively short time when the vehicle actually collides, the trigger signal output means 5A outputs a trigger signal based on the outputs of the first comparing means 2A and the second comparing means 4A so as to promptly activate the vehicle safety device 6A.

Since the conventional starting device is constructed as described above, the shock such as hammering or the like, on which the starting device should not be started, can be detected. The device can distinguish hammering from a shock developed upon the actual collision if the ratio between the integrated values of the signals about the accelerations developed in the directions of acceleration and deceleration of the vehicle is below the predetermined threshold. However, the integrated value in the direction of deceleration of the vehicle becomes greater than the integrated value in the direction of acceleration of the vehicle even if the shock is small, and the ratio between the integrated values often exceeds the predetermined value. In this case, a problem arises such that hammering or the like is misjudged as an actual collision, thus resulting in unnecessary start-up of the starting device. A problem also arises such that if the threshold to be compared with the integrated value is increased to avoid the above problem and make an actual collision decision with satisfactory accuracy, then the actual collision decision is delayed.

SUMMARY OF THE INVENTION

With the foregoing problems in view, it is therefore an object of the present invention to provide a device for starting an occupant crash protector, which is not started upon impacts such as a run on a curb or hammering, on which the starting device is not to be started, and enables a high-speed collision decision upon a collision, particularly, a high-speed collision on which the starting device is to be started.

According to a first aspect of the present invention, there is provided a device for starting an occupant crash protector, which outputs as a start signal the logical product of the output of collision determining means for making a decision about a collision including a shock which requires no start signal and the output of non-collision determining means for detecting only a collision which requires the start signal, using a value obtained by subtracting a value varied with time from the output of an acceleration sensor and integrating the result of subtraction.

According to a second aspect of the present invention, the device for starting the occupant crash protector includes subtracted value generating means for generating a subtracted value such that a value integrated after the subtraction exceeds a first predetermined threshold only upon a collision which requires a start signal, as a value varied with time. When the subtracted and integrated value is smaller than the first predetermined threshold, the starting device prevents the start signal from being outputted.

According to a third aspect of the present invention, when an acceleration integrated value is smaller than the peak value of the integral of acceleration at the time of a shock which requires no start signal, of acceleration integrated values, the starting device prevents the outputting of the start signal.

According to a fourth aspect of the present invention, the starting device further cumulates time intervals required to output predetermined or more accelerations and prohibits the outputting of a start signal when the cumulated time interval is smaller than a cumulated time interval at the time of a shock which requires no start signal.

According to a fifth aspect of the present invention, the starting device cumulates time intervals required to output predetermined or more accelerations, prohibits the outputting of a start signal when the cumulated time interval is smaller than the peak value of a cumulated time interval at the time of a shock which does not require the start signal, and prevents the outputting of the start signal when the difference between values, obtained by integrating accelerations developed in the directions of deceleration and acceleration of a vehicle and assigning weights to them, is smaller than the peak value of the difference between values produced at the time of the shock which requires no start signal.

According to a sixth aspect of the present invention, the starting device includes absolutizing means for absolutizing the output of the acceleration sensor, which is provided in a stage preceding the subtracting and integrating means.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The present invention will now be described with reference to the accompanying drawings wherein:

FIG. 18 is a flowchart for describing a process for a start signal decision 2 shown in FIG. 17, in detail;

FIG. 21 is a block diagram illustrating a basic configuration of a device for starting an occupant crash protector, according to a third embodiment of the present invention;

FIGS. 34(a) and 34(b) are signal waveform charts for describing the speeding up of starting of the starting device shown in FIG. 30 with respect to a special collision;

FIGS. 35(a) to 35(f) are signal waveform charts for describing the operation of generation of start signals by the starting device shown in FIG. 30;

FIGS. 36(a) to 36(f) are signal waveform charts for describing the operation of non-generation of the start signals by the starting device shown in FIG. 30;

DETAILED DESCRIPTION OF THE PREFERRED EMBODIMENTS

Preferred embodiments of the present invention will hereinafter be described in detail with reference to the accompanying drawings.

[First Embodiment]

Figure 1:
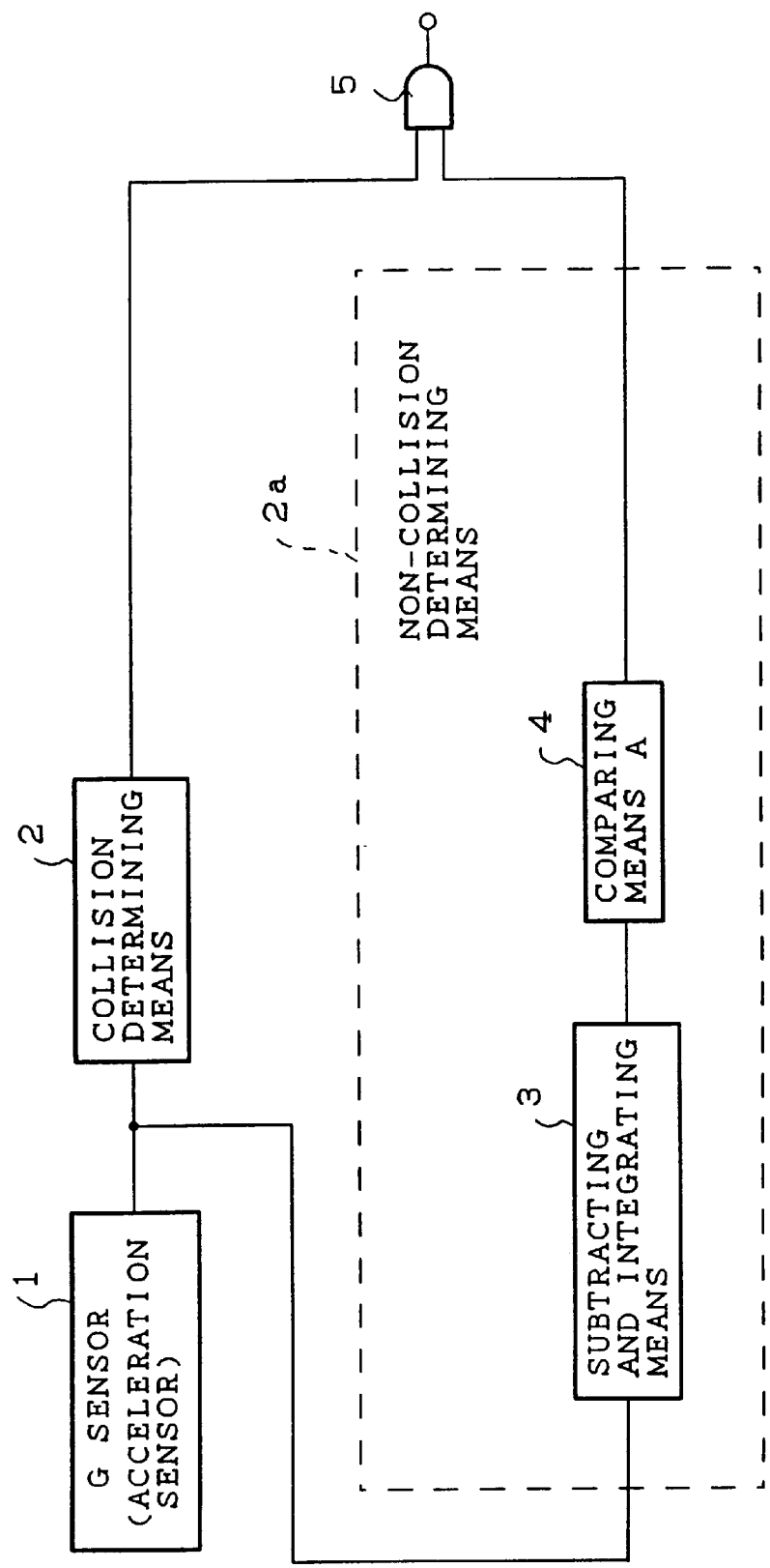
FIG. 1 is a block diagram showing a basic configuration of a device for starting an occupant crash protector, according to a first embodiment of the present invention.

FIG. 1 is a block diagram showing a basic configuration of a device for starting an occupant crash protector, according to a first embodiment of the present invention. In the drawings, reference numeral 1 indicates a G sensor (acceleration sensor) for converting an acceleration developed lengthwise to a vehicle into an electric signal and outputting the converted signal therefrom. Reference numeral 2 indicates a collision determining means for making a decision as to a collision including a shock unrequiring a start signal, based on the output of the G sensor 1. Reference numeral 2a indicates a non-collision determining means for detecting only a collision requiring the start signal, based on the output of the G sensor 1. Reference numeral 3 indicates a subtracting and integrating means for subtracting a value varied with time from the output of the G sensor 1 and integrating the result of subtraction. Reference numeral 4 indicates a comparing means A (first comparing means) for comparing the output of the subtracting and integrating means 3 with a threshold (first threshold) THB to control the generation of a start signal. Reference numeral 5 indicates an ANDing means or a logical product means (first logical product means) for outputting a start signal from the logical product of the output of the comparing means A designated at numeral 4 and the output of the collision determining means 2. The value varied with time shows a value obtained by subtracting the former value from the output of the G sensor 1 and integrating the result of subtraction exceeds a predetermined threshold only upon collision requiring the start signal, which excludes a shock such as hammering, unrequiring the start signal.

Figure 2:
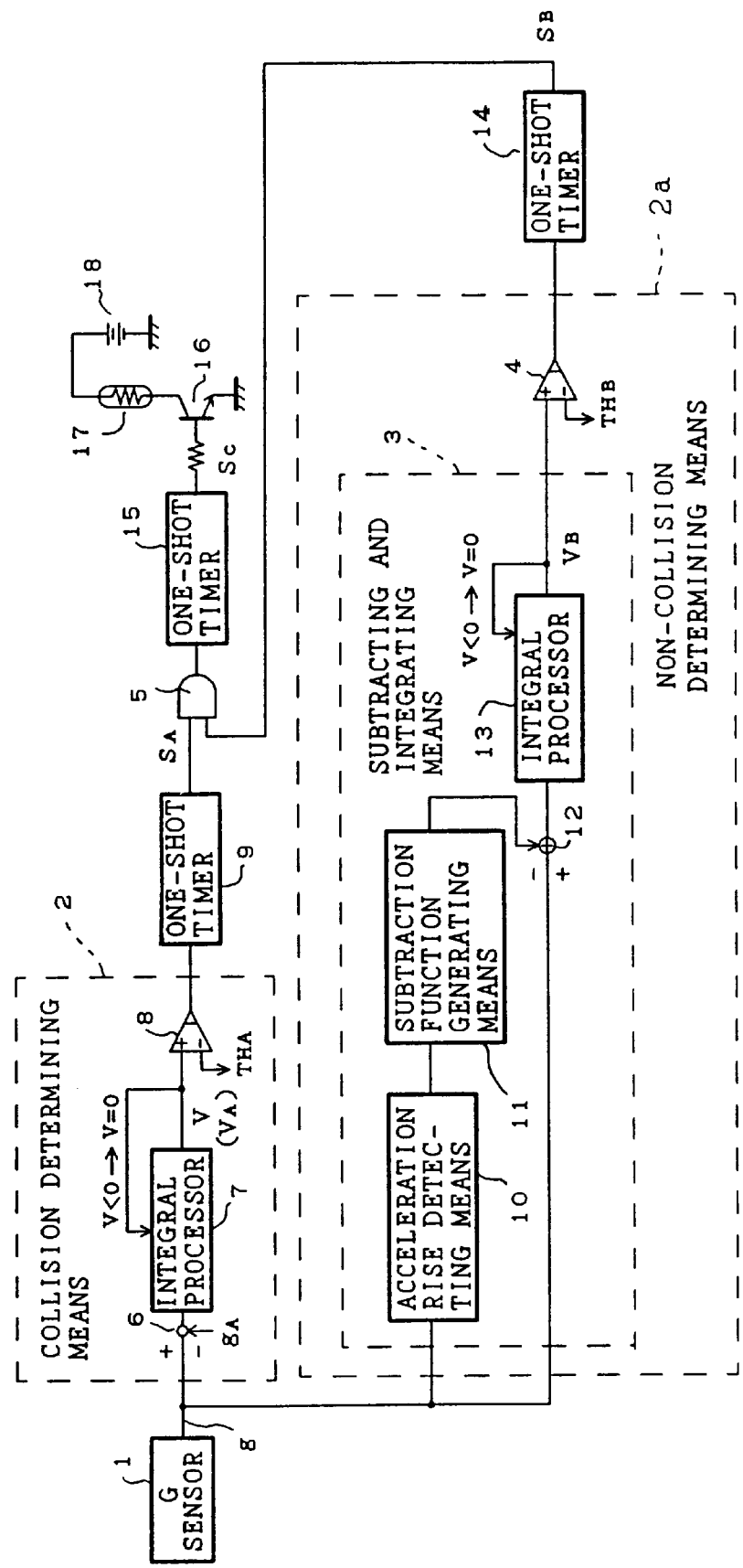
FIG. 2 is a block diagram illustrating specific configurational examples of respective blocks in the basic configuration shown in FIG. 1.

FIG. 2 is a block diagram showing specific configurational examples of respective blocks included in the basic configuration shown in FIG. 1. In the collision determining means 2 shown in the drawing, reference numeral 6 indicates a subtraction processor for subtracting a given value $g_A$ from an acceleration signal detected by the G sensor 1. Reference numeral 7 indicates an integral processor having the function (hereinafter abbreviated as "reset function") of initializing an integrated value $V_A$ ($V_A$ is set to V when it is computed by a microcomputer as will be described later) corresponding to the output of the subtraction processor 6 when the integrated value $V_A$ is smaller than 0. Reference numeral 8 indicates a comparing means for comparing the integrated value $V_A$ with a threshold THA. The threshold THA is a predetermined value larger than the peak value of an integrated value of the integrated value $V_A$, at the time of the shock or impact which requires no start signal. The collision determining means 2 can start an integral process simultaneously with the rising of the output of the G sensor 1.

In the subtracting and integrating means 3 provided within the non-collision determining means 2a shown in FIG. 2, reference numeral 10 indicates an acceleration rise detecting means for detecting the rising edge of the acceleration signal g detected by the G sensor 1. Reference numeral 11 indicates a subtraction function generating means (subtracted value generating means) for producing a value varied with time in response to the output of the acceleration rise detecting means 10. Reference numeral 12 indicates a subtracting means for subtracting the output of the subtraction function generating means 11 from the output of the G sensor 1. Reference numeral 13 indicates an integral processor (integrating means) for integrating the output of the subtracting means 12. Incidentally, the integral processor 13 has the reset function. Upon non-collision, the integrated value V is set to 0. Simultaneously with the rising of the output of the G sensor 1, the integral processor 3 can start the integral process.

Referring also to FIG. 2, reference numeral 9 indicates a one-shot timer for holding the output of the collision determining means 2 in an ON state for a predetermined time interval from the falling edge of the output of the collision determining means 2. Reference numeral 14 indicates a one-shot timer for holding the output of the comparing means A designated at numeral 4 in an ON state for a predetermined time interval from the falling edge of the output of the comparing means A. Reference numeral 15 indicates a one-shot timer for holding the output of the logical product means 5 in an ON state for a further predetermined time interval from the falling edge of the output of the logical product means 5. Reference numeral 16 indicates a switching transistor controlled based on the output of the one-shot timer 15. Reference numeral 17 indicates a means for starting the occupant crash protector, which is called "squib" series-connected to the transistor 16. Reference numeral 18 indicates a dc supply. The respective blocks provided within the device shown in FIG. 2 can be realized by a microcomputer.

The operation of the present embodiment will now be described.

Figure 3:
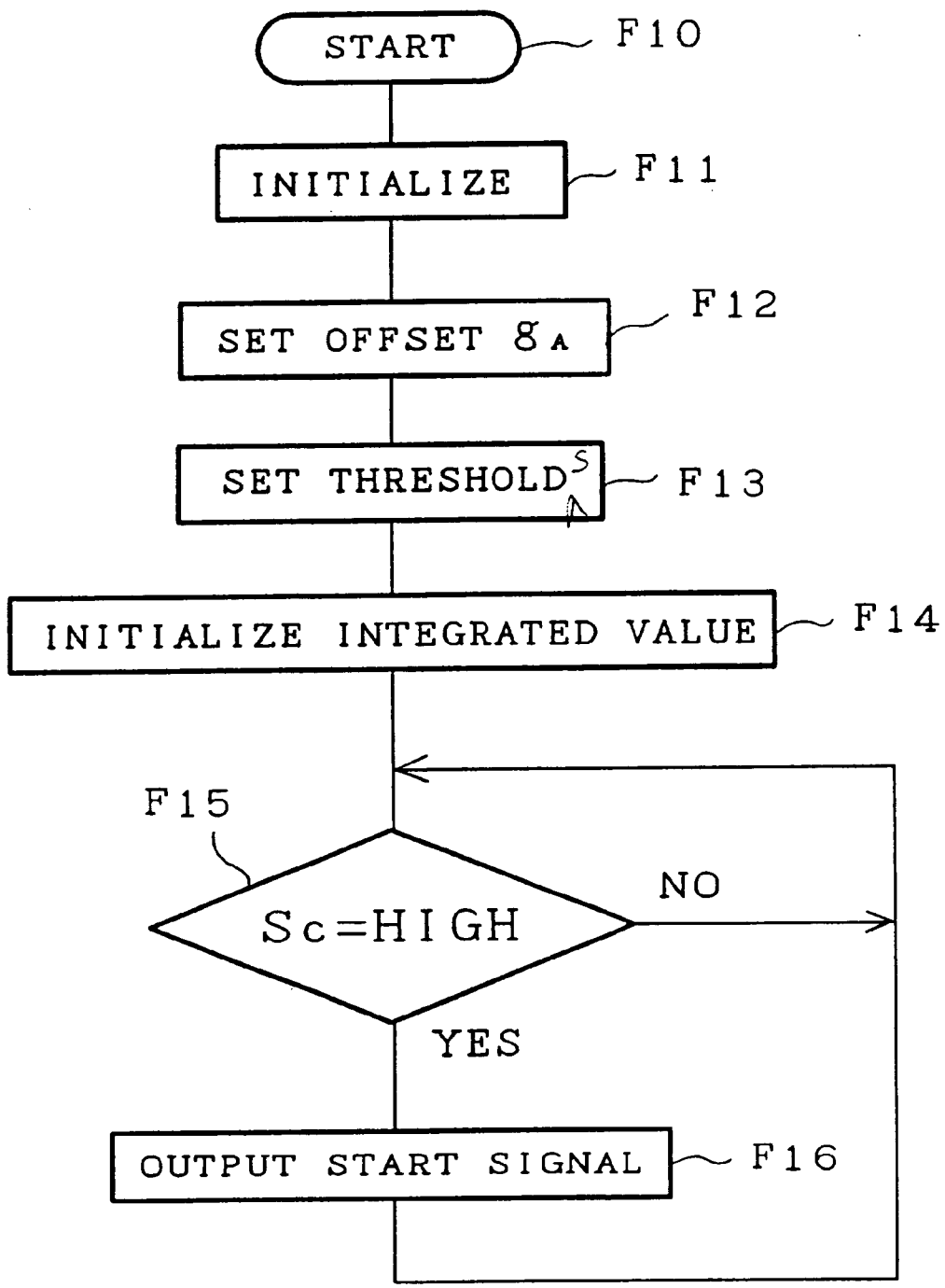
FIG. 3 is a flowchart for describing the operation of the starting device shown in FIG. 2.

Now consider in the following description that the device shown in FIG. 2 has been realized by the microcomputer. FIG. 3 is a flowchart for describing the main control of the device shown in FIG. 2. In a process F10, the device starts its operation. In an initializing process of F11, the device inputs therein a sampling time interval T and initially sets a time t from the commencement of detection of the rise of acceleration, to 0. In the next process F12, a predetermined value $g_A$ to be input to the subtracting means 6 is set. In a process F13, a threshold THA used for the decision of collision by the collision determining means 2 and a threshold THB (first threshold) used for the decision of non-collision by the non-collision determining means 2a are input. In a process F14, an integrated value used in an integrating means in each of the integral processors 7 and 13 is initialized into a certain value, for example, 0 (hereinafter called "initialized into 0 or reset to 0"). The main control of the device will be next described. If a start signal Sc obtained at the output of the one-shot timer 15 in a process F15 in the main control is High, then the routine procedure proceeds to YES. In a process F16, a start signal is outputted and the routine procedure returns to the process F15. If the start signal Sc is found to be Low in the process F15, then the routine procedure proceeds to NO and returns to the F15, where the same process as described is repeated.

Figure 4:
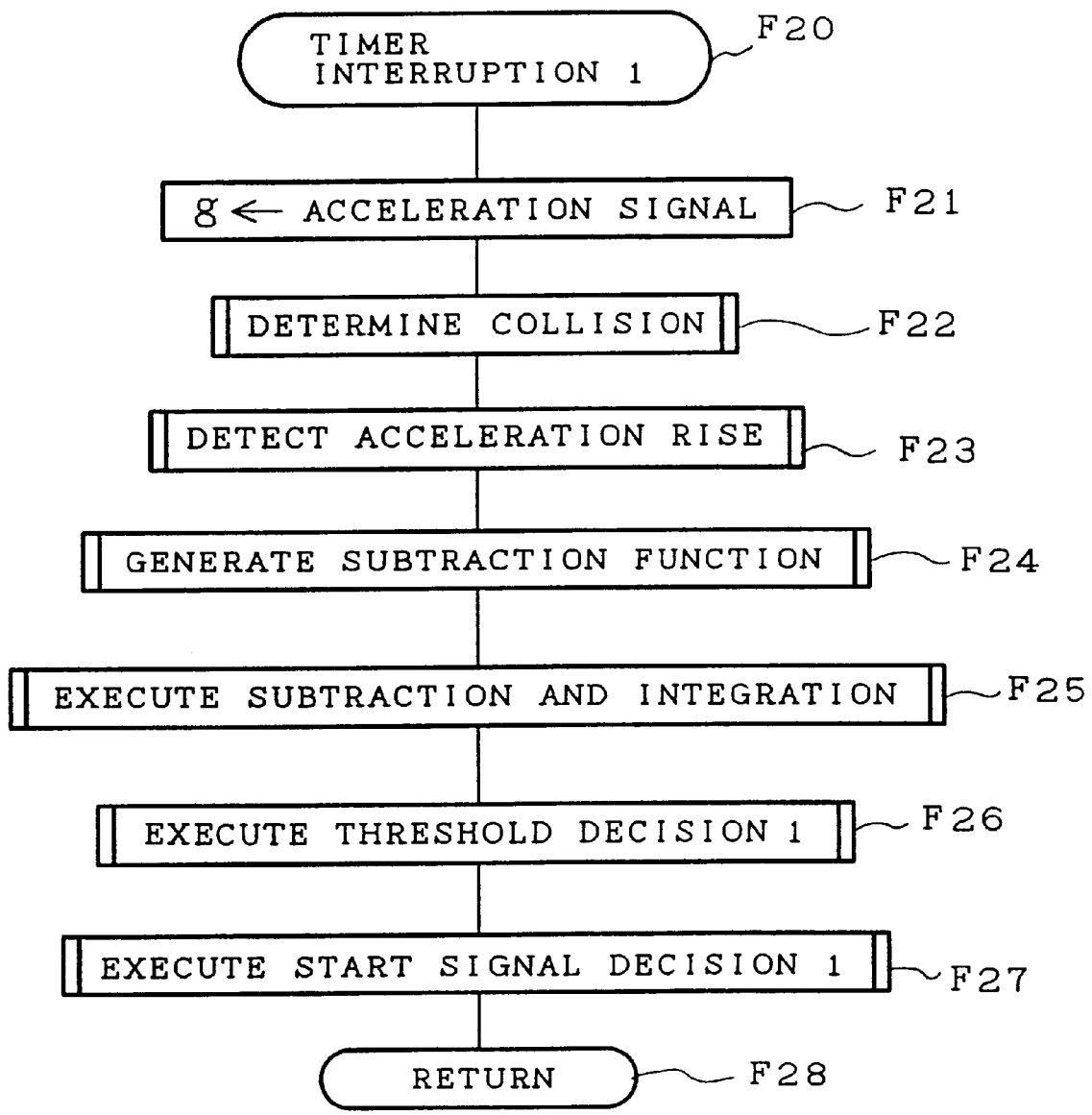
FIG. 4 is a flowchart for describing a timer interruption process shown in FIG. 3, in detail.

FIG. 4 is a flowchart for describing a process executed in accordance with a timer interruption for each predetermined time interval T set in the initializing process F11. In a process F20, a timer interruption operation is started. In a process F21, the acceleration signal g outputted from the G sensor 1 is input to the collision determining means 2 and the non-collision determining means 2a. In a process F22, a collision decision is done by the collision determining means 2. In a process F23, the rising edge of the acceleration signal g is next detected by the acceleration rise detecting means 10. In a process F24, a subtraction function is generated from the subtraction function generating means 11. In a process F25, the output of the subtraction function generating means 11, which has been obtained in the process F24, is subtracted from the acceleration signal g by the subtracting means 12. Thereafter, the result of subtraction is integrated by the integral processor 13. In a process F26, the output of the integral processor 13, which has been obtained in the process F25, is compared with the predetermined threshold THB. It is determined in a process F27, based on the result of decision in the process F22 and the result of decision in the process F26, whether the start signal is outputted. Thereafter, the timer interruption 1 is finished.

Figure 5:
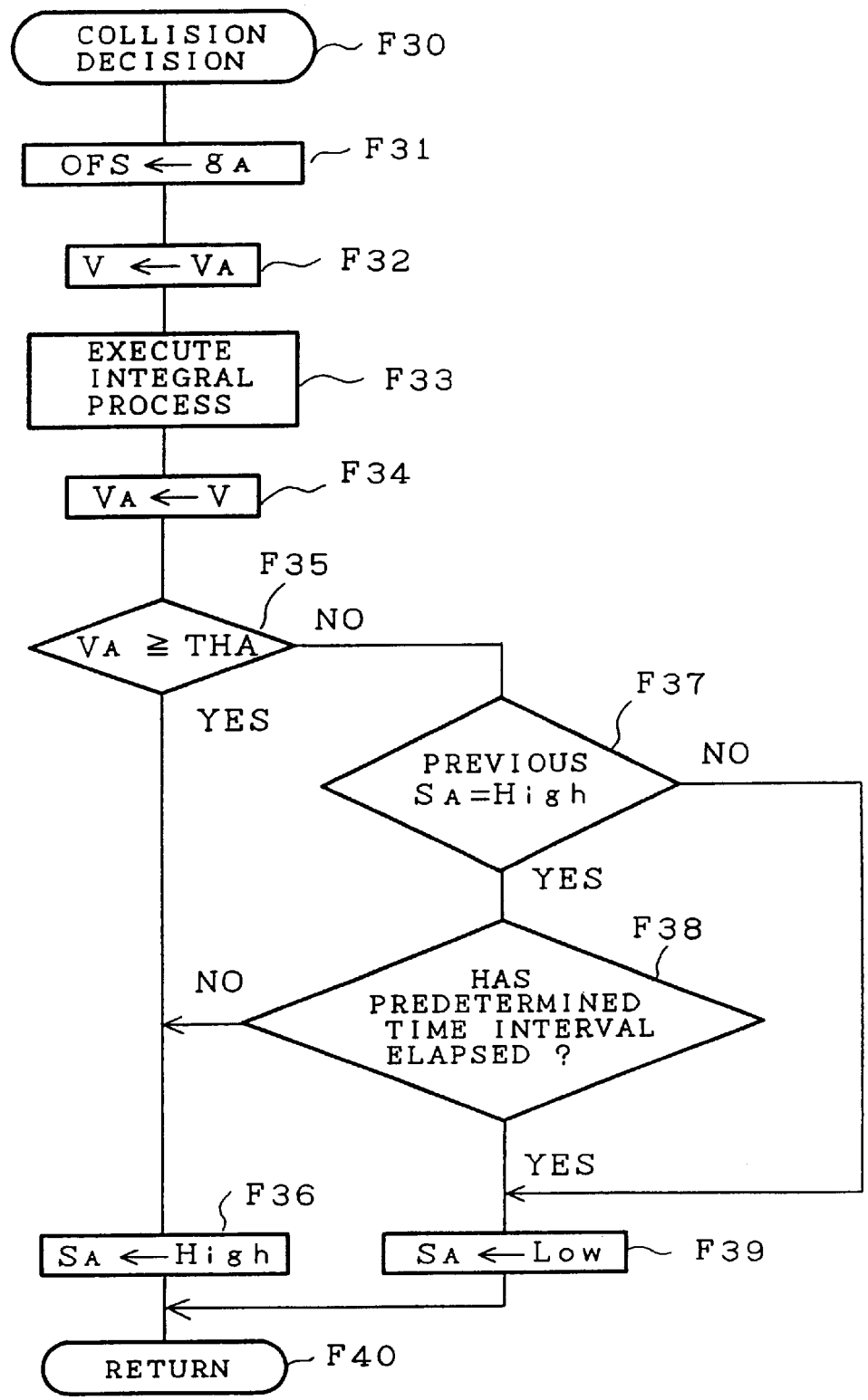
FIG. 5 is a flowchart for describing a collision determining process shown in FIG. 4, in detail.
Figure 6:
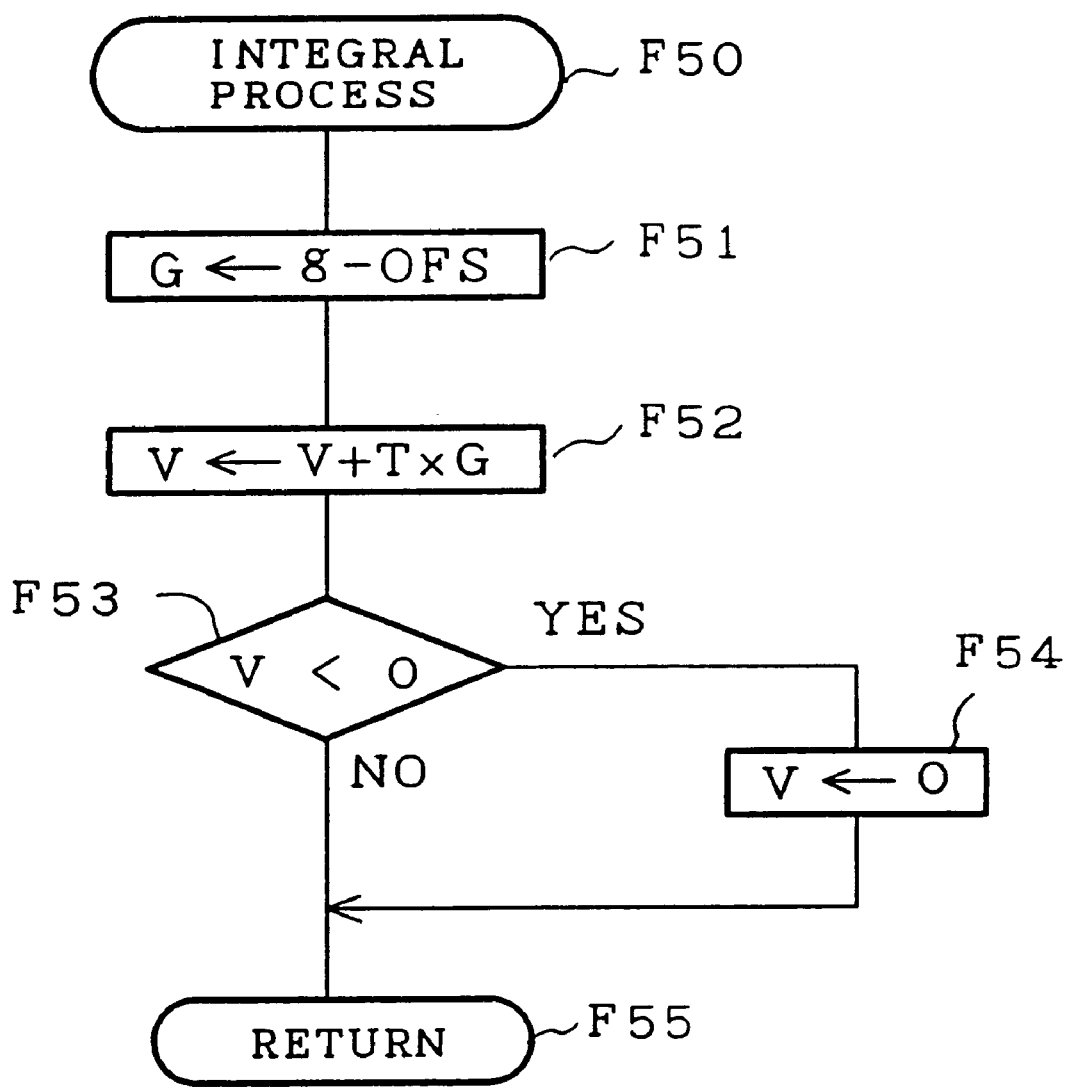
FIG. 6 is a flowchart for describing an integral process shown in FIG. 5, in detail.

FIG. 5 is a flowchart for describing the process F22 of the collision decision shown in FIG. 4, in detail. In a process F31, a predetermined value $g_A$ is set to an offset OFS. In a process F32, the integrated value $V_A$ is defined as the integrated value V and an integral process is executed in a process F33. This integral process includes processes of F50 to F55 shown in FIG. 6. In FIG. 6, the result of subtraction of the offset OFS set in the process F31 from the acceleration signal g input in the process F21 will be defined as an acceleration signal G in the process F51. In the process F52, the acceleration signal is integrated by adding one, obtained by multiplying the sampling time interval T set in the process F11 by the acceleration signal G to the integrated value V set in the process F32, whereby the integrated value is updated. Next, if it is found in the process F53 that the integrated value V is smaller than 0, then the routine procedure proceeds to YES, i.e., the process F54 where the integrated value V is reset to 0 and the routine procedure proceeds to the process F55. Thereafter, the routine procedure is returned to the process F33. If it is found in the process F53 that the integrated value V is greater than 0, then the routine procedure proceeds to NO, i.e., the process F55 where the process F33 is finished.

Next, the integrated value V is returned to the integrated value $V_A$ in a process F34. If it is judged in a process F35 that the integrated value $V_A$ is less than or equal to the threshold THA, then the routine procedure proceeds to NO. If it is judged in a process F37 that the collision decision signal $S_A$ at the preceding time is High, it is then found that the falling edge of the collision decision signal has been detected. Thus, the routine procedure proceeds to YES, i.e., a process F38. If it is judged in the process F38 that the predetermined time interval set by the one-shot timer 9 has elapsed since the falling of the collision decision signal $S_A$, then the routine procedure proceeds to YES, i.e., a process F39 where the collision decision signal $S_A$ is rendered Low, followed by proceeding to a process F40 from which the routine procedure is returned to the process F22. If it is judged in the process F37 that the preceding collision decision signal $S_A$ is Low, then the routine procedure proceeds to NO and the collision decision signal $S_A$ is set Low in the process F39, followed by proceeding to the process F40 from which the routine procedure is returned to the process F22. If it is judged in the process F35 that the integrated value $V_A$ is greater than or equal to the threshold THA and the predetermined time interval has not yet elapsed in the process F38, then the collision decision signal $S_A$ is rendered High in a process F36 and the routine procedure is returned to the process F22.

Figure 7:
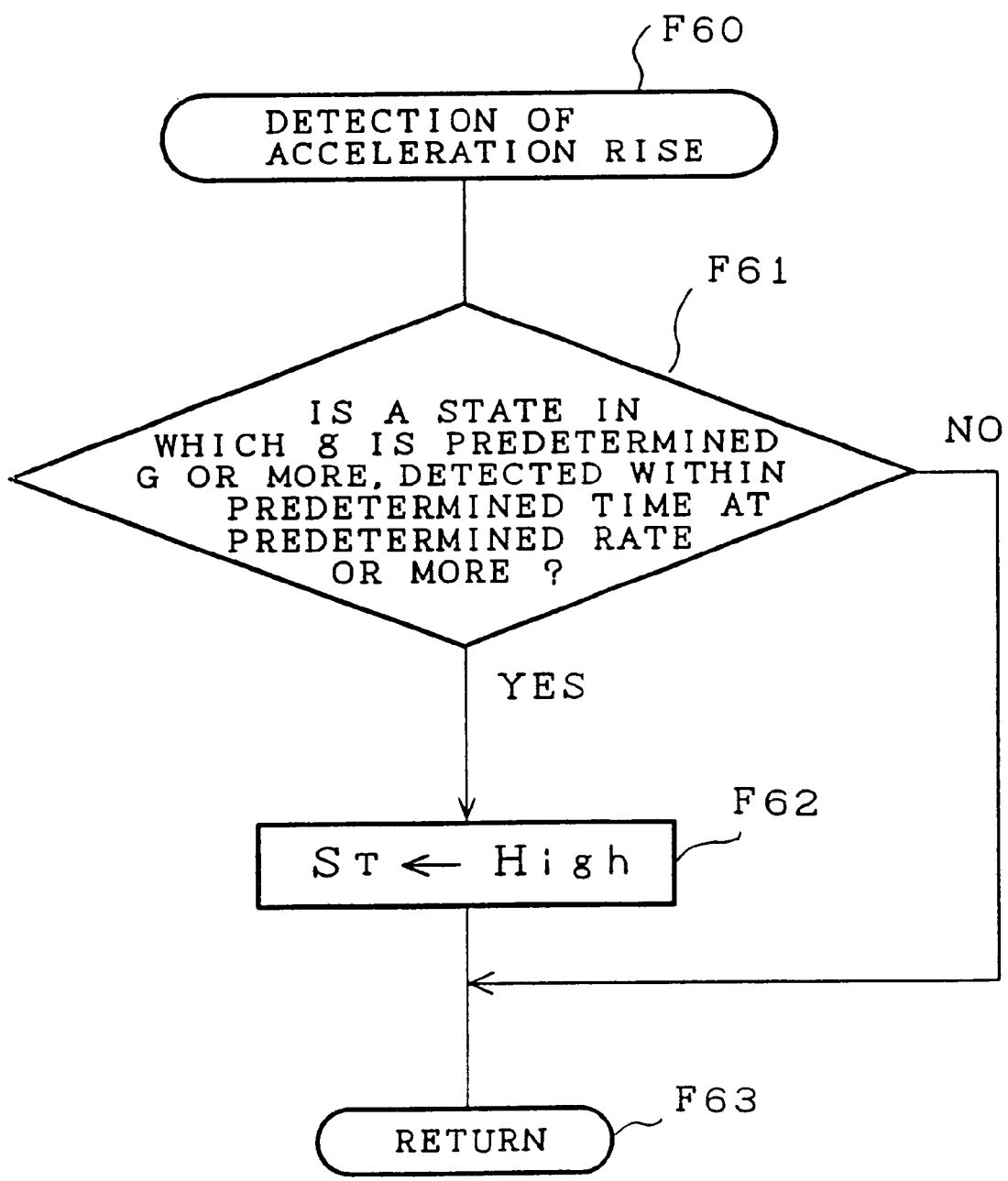
FIG. 7 is a flowchart for describing an acceleration rise detecting process shown in FIG. 4, in detail.

The detection of the rise in acceleration by the acceleration rise detecting means 10 in the process F23 is performed as shown in FIG. 7. Namely, if a state in which the acceleration signal g is of a predetermined G or more is detected within a predetermined time interval in a predetermined proportion or more, then the routine procedure proceeds to YES, i.e., a process F62 where a rise signal $S_T$ is rendered High. If it is judged in the process F61 that the above state is detected in the predetermined proportion or below, then the routine procedure proceed to a process F63 from which the routine procedure is returned to the process F23.

Figure 8:
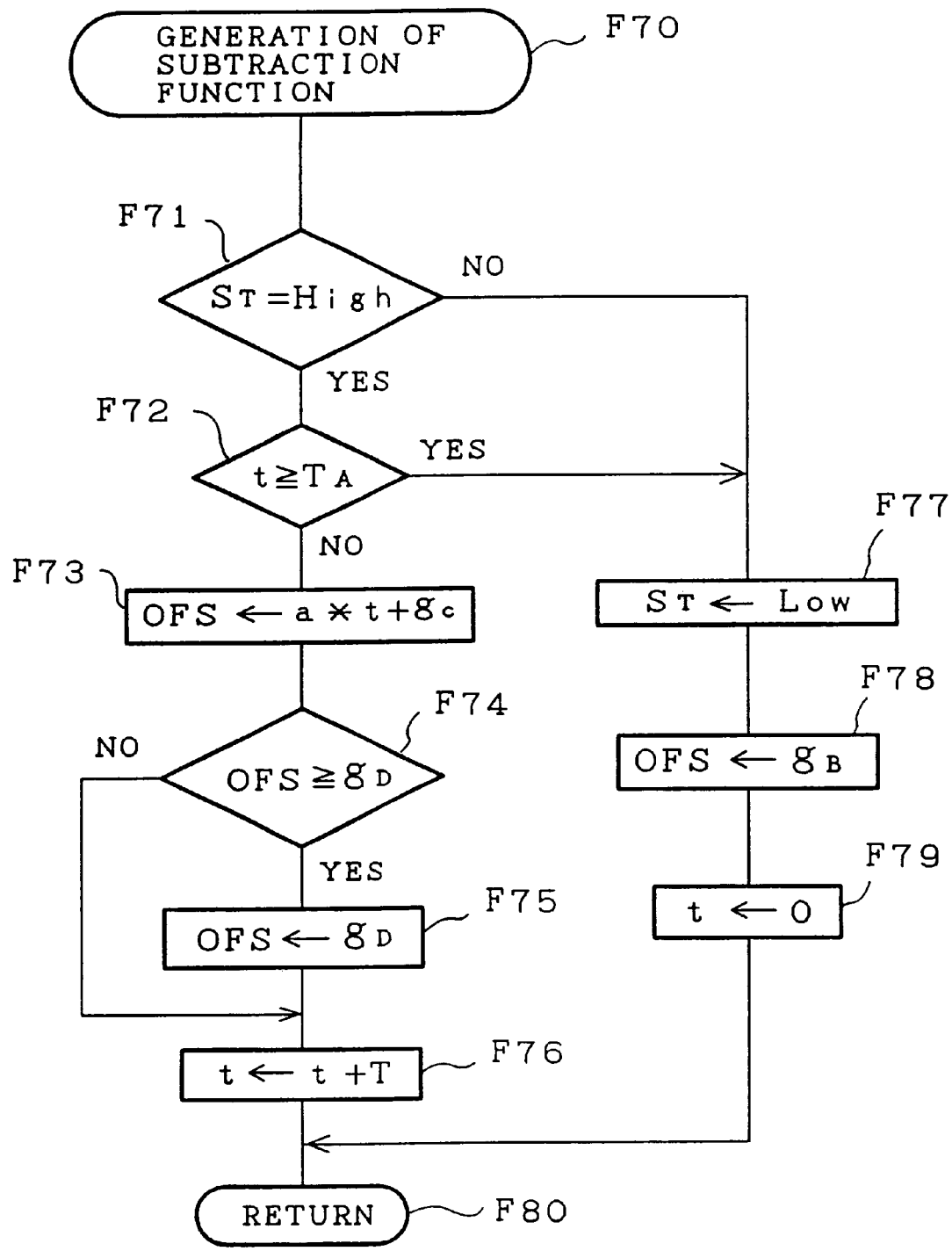
FIG. 8 is a flowchart for describing a subtraction function generating process shown in FIG. 4, in detail.

A flowchart for describing the generation of the subtraction function by the subtraction function generating means 11 in the process F24 is shown in FIG. 8. The rising edge of the acceleration signal is detected in the process F23. If the rise signal $S_T$ becomes High, then the routine procedure proceeds to YES in a process F71. In a process F73, an offset OFS is set to a linear function $a*t+g_C$ comprised of a time t[S], a predetermined coefficient a [G/S] and a given value $g_C$ until the rise signal $S_T$ reaches High and a predetermined time interval ($T_A$) elapses. When the offset OFS is greater than or equal to a predetermined upper limit $g_D$, the offset OFS is set to $g_D$ in a process F75. Incidentally, the time t increases for each sampling time interval T in a process F76. On the other hand, when the rise signal $S_T$ is found to be Low in the process F71 and it is found in the process F72 that the predetermined time interval ($T_A$) has elapsed, the routine procedure proceeds to a process F77 where the rise signal $S_T$ is rendered Low. Thereafter, the offset OFS is set to a predetermined value $g_B$ in a process F78 and the time t is initially set to 0 in a process F79 from which the routine procedure is returned to the process F24.

Figure 9:
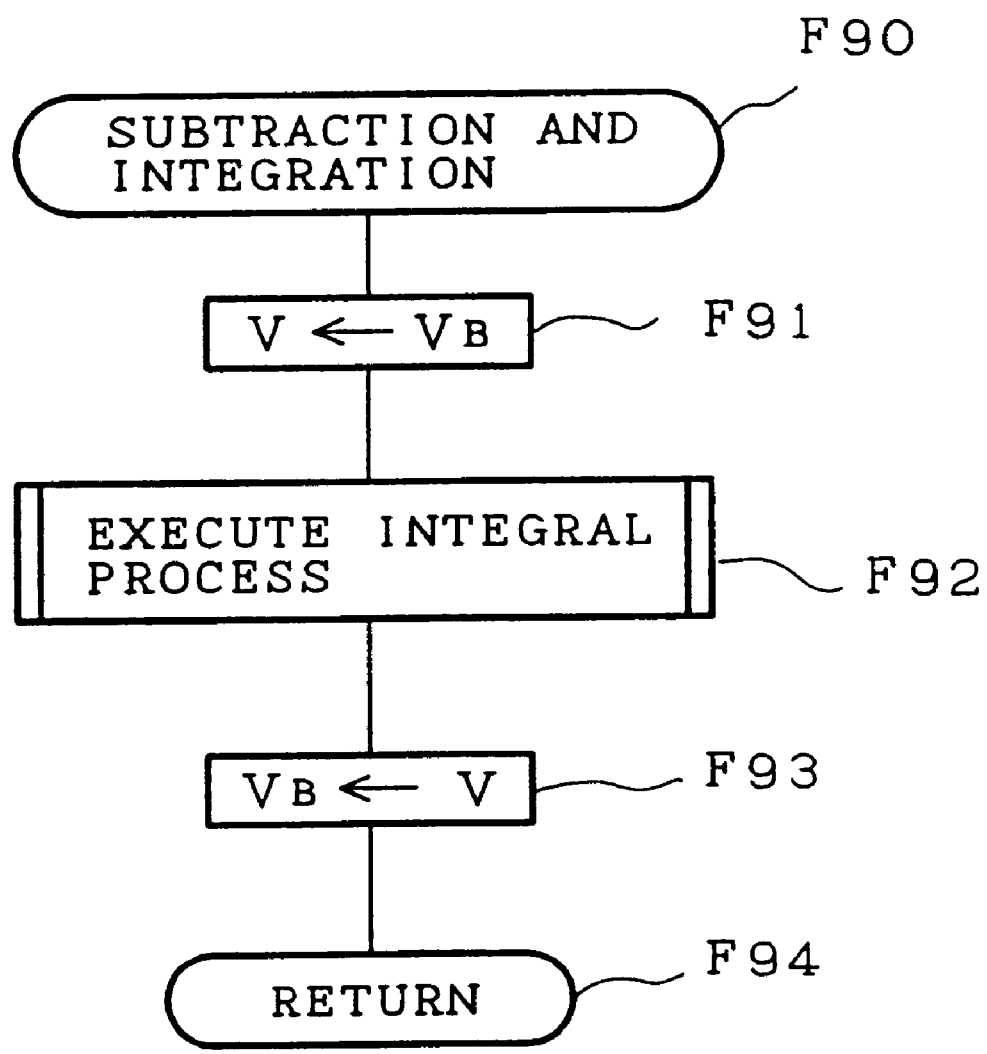
FIG. 9 is a flowchart for describing a subtracting and integrating process shown in FIG. 4, in detail.

The integration of the subtracted value by the integral processor 13 in the process F25 is carried out as shown in FIG. 9. Namely, an integrated value $V_B$ corresponding to the output of the integral processor 13 is set to an integrated value V in a process F91 and an integral process is thereafter executed in a process F92. Next, the integrated value V is restored to the integrated value $V_B$ and the subtraction and integration process is completed.

Figure 10:
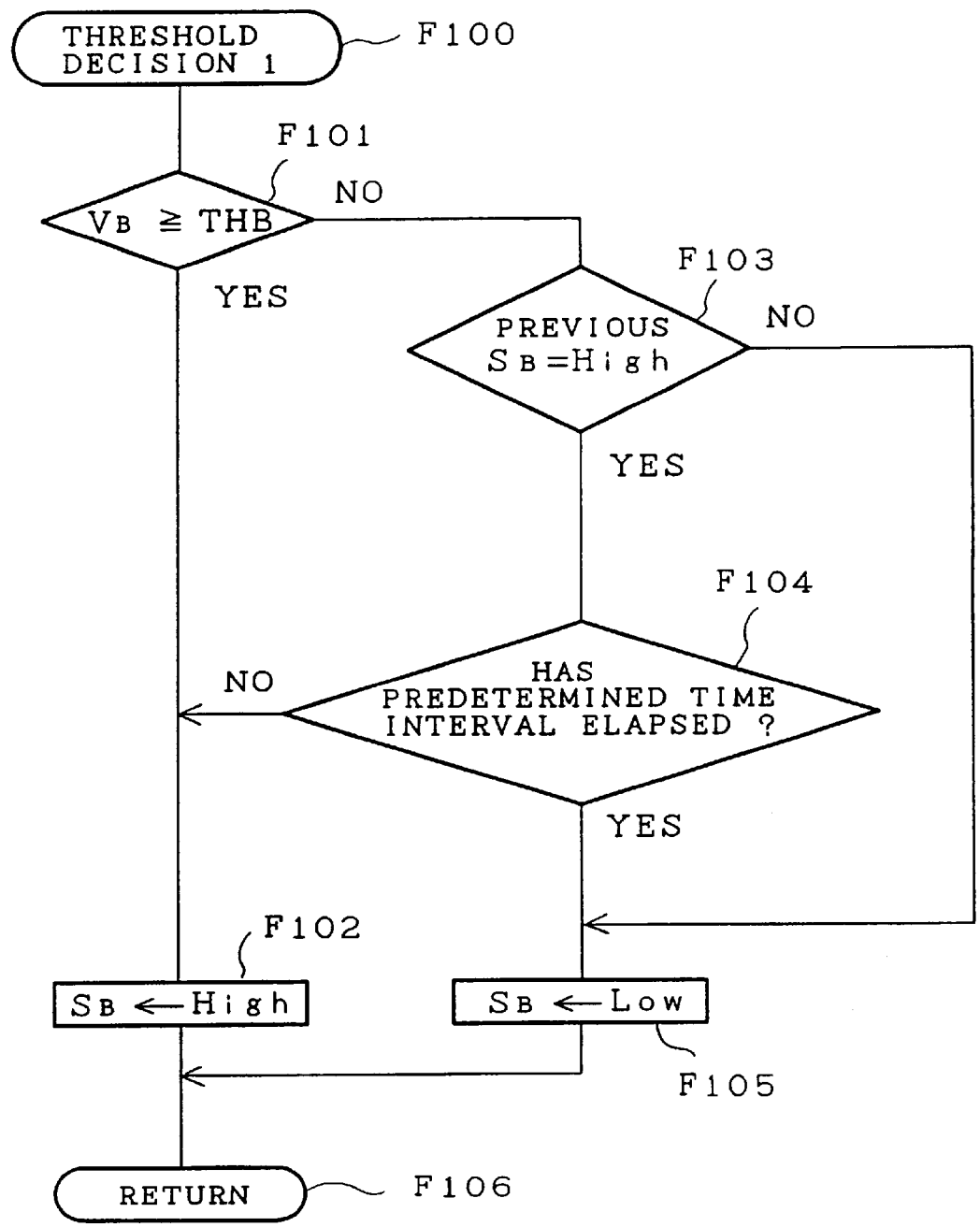
FIG. 10 is a flowchart for describing in detail a process for a threshold decision 1, which is shown in FIG. 4.

The threshold decision 1 of the comparing means A, designated as reference numeral 4 (FIG. 1) (hereinafter abbreviated A4), in the process F26 is carried out as shown in FIG. 10. Namely, if it is judged in a process F101 that the integrated value $V_B$ corresponding to the output of the integral processor 13 is less than or equal to the threshold THB, then the routine procedure proceeds to NO. If it is judged in a process F103 that the preceding control signal $S_B$ is High, it is found that the rising edge of the control signal $S_B$ has been detected. As a result, the routine procedure proceeds to YES. If it is judged in a process F104 that a predetermined time interval set by the one-shot timer 14 has elapsed since the falling of the control signal $S_B$, then the routine procedure proceeds to YES and the control signal $S_B$ is rendered Low in a process F105. When it is judged in the process F104 that the predetermined time interval has not yet elapsed since the falling of the control signal $S_B$ and it is judged in the process F101 that the integrated value $V_B$ is greater than or equal to the threshold THB, the control signal $S_B$ is rendered High in a process F102 and the routine procedure is returned to the process F26. A value larger than the maximum value in an integrated value $V_B$ at the time of a shock that does not require a start signal, of integrated values $V_B$ corresponding to outputs produced from the integral processor 13, is set as the threshold THB.

Figure 11:
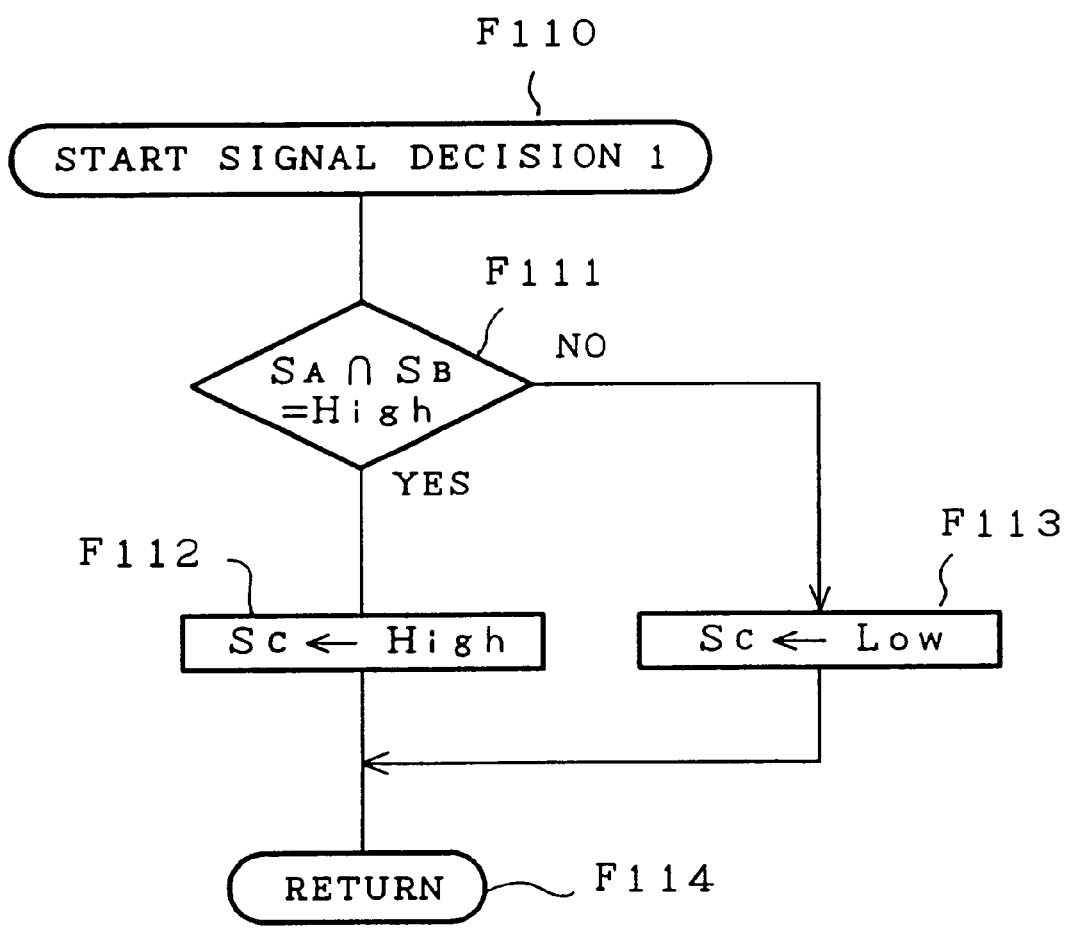
FIG. 11 is a flowchart for describing in detail a process for a start signal decision 1, which is shown in FIG. 4.

The start signal decision 1 of the logical product means 5 in the process F27 is carried out as shown in FIG. 11. Namely, when at least one of the collision decision signal $S_A$ and the control signal $S_B$ is found to be Low in a process F111, the routine procedure proceeds to NO, i.e., a process F113 where the start signal $S_C$ is rendered Low. If it is judged in the process F111 that both the collision decision signal $S_A$ and the control signal $S_B$ are both High, then the start signal $S_C$ is set High in a process F112 and the process for the start signal decision 1 is terminated.

Figures 12A, 12B:
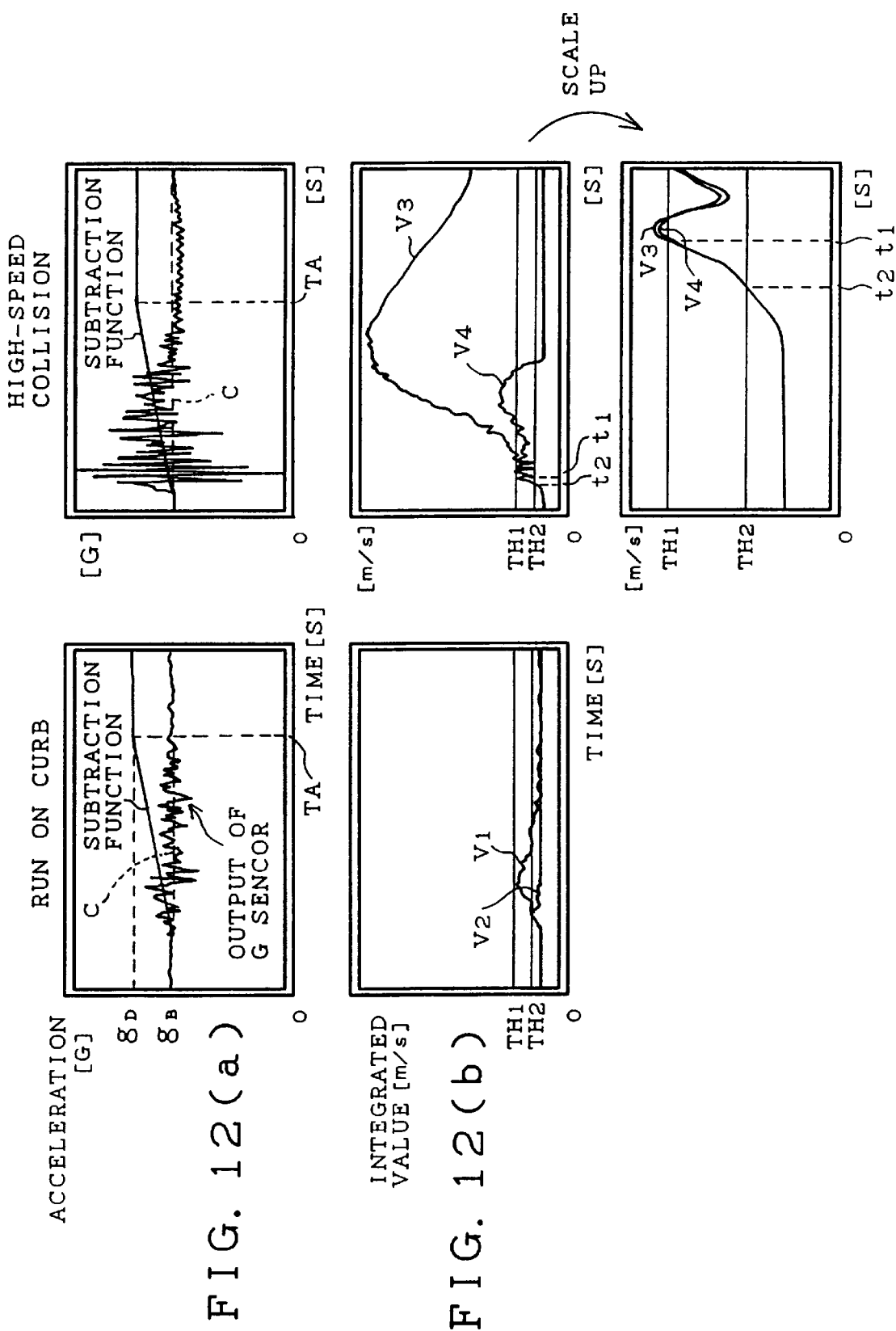
FIGS. 12(a) and 12(b) are signal waveform charts for describing the speeding up of starting of the starting device shown in FIG. 2 with respect to a high-speed collision.

FIG. 12 illustrates parts of waveforms outputted from the respective components in the non-collision determining means 2a shown in FIG. 2. The left side as seen in FIG. 12(a) shows a waveform outputted from the G sensor 1 at the time of an impact or shock such as a run on a curb, which requires no start signal, and a subtraction function corresponding to the output of the subtraction function generating means 11. The right side as seen in FIG. 12(a) illustrates a waveform (hereinafter abbreviated as "G waveform") outputted from the G sensor 1 at the time of a high-speed collision (50 km/h or so) which requires the start signal, and a subtraction function corresponding to the output of the subtraction function generating means 11. Further, the left side as seen in FIG. 12(b) shows integrated values subsequent to the subtraction and integration of waveforms at the time of the shock such as the run on the curb, which no requires the start signal is required. The right side as seen in FIG. 12(b) shows integrated values subsequent to the subtraction and integration of waveforms at the time of the high-speed collision (50 km/h or so) which requires the start signal.

When the subtracted value is of such a given value as indicated by a broken line C in FIG. 12(a), which is other than the value varied with time as described in the first embodiment, the subtracted and integrated value at the time of the run on the curb becomes V1 shown in FIG. 12(b) and the subtracted and integrated value at the time of the high-speed collision becomes V3. Since the start signal is unnecessary upon the run on the curb, the threshold THB of the comparing means A4 is set to TH1 larger than the peak value of V1. In this case, the time (hereinafter abbreviated as "TTF" (time to fire)) required to output the start signal upon high-speed collision reaches a time interval t1 necessary for V3 to exceed the threshold TH1.

On the other hand, when the subtracted value is represented as the subtraction function varied with time as indicated by each solid line in FIG. 12(a) as in the present invention, the subtracted and integrated value at the time of the run on the curb reaches V2 shown in FIG. 12(b) and the subtracted and integrated value at the time of the high-speed collision becomes V4. As described in accordance with the flowchart shown in FIG. 8, the subtraction function is represented as the predetermined value $g_B$ from the rising edge of the acceleration signal $S_T$ and is represented as a linear function with respect to the time before the subtracted value reaches a predetermined value $g_D$ from the rising edge of the acceleration signal $S_T$ or before the elapse of a predetermined time interval $T_A$. The value of the subtraction function increases with the elapse of the time. After the subtracted value has reached the predetermined value $g_D$, the subtracted value becomes the predetermined value $g_D$. After the predetermined time interval $T_A$ has elapsed, the subtracted value is initialized into $g_B$.

In the G waveform at the time of the run on the curb, a period in which the amplitude thereof is almost constant, continues as shown in FIG. 12(a). Thus, when a subtracted value determined from the subtraction function is subtracted from the G waveform, the resultant subtracted value becomes small. Therefore, the peak value of the subtracted and integrated value becomes small as compared with the case where the subtracted value is constant, and the threshold also becomes TH2 smaller than TH1.

The TTF of the G waveform at the time of the high-speed collision, which is obtained using the threshold TH2, becomes t2 shorter than t1 as is understood from the waveform chart on the right side of FIG. 12(b) and an enlarged view of the rising edge thereof. This is because since the G waveform at the time of the high-speed collision sharply rises, the latter half portion of the waveform V4 obtained by subtracting the subtraction function from the G waveform and integrating the result of subtraction becomes small in time in the same manner as described above, whereas since the rising edge of the first half portion thereof still remains sharply even after the subtraction, the TTF becomes short by a decrease in threshold.

It is thus possible to reliably prevent the outputting of the start signal by using the subtraction function varied with time in the case of the waveform at the time of the run on the curb, which requires no start signal, and to output the start signal at high speed as in the case of TTF transition from t1 to t2 as shown in FIG. 12 by way of example.

FIG. 13 shows waveforms outputted from the respective components of the device shown in FIG. 2 at the time of the high-speed collision (50 km/h or so) which requires the start signal. FIG. 13(a) illustrates a waveform outputted from the G sensor 1 at the time of a high-speed collision which requires a start signal $S_C$. A function indicated by a solid line in the drawing corresponds to a waveform outputted from the subtraction function generating means 11. FIG. 13(b) shows a waveform obtained by subtracting a predetermined value $g_A$ from the waveform shown in FIG. 13(a) and integrating the result of subtraction with the integral processor 7. A threshold THA shown in the drawing indicates a value determined based on the integrated value of the G waveform at the time of a low-speed collision (13 km/h or so) which requires no start signal $S_C$. Further, a waveform (decision signal $S_A$) outputted from the one-shot timer 9 is also illustrated in the drawing. When the output of the integral processor 7 exceeds the threshold THA as shown in the drawing, the decision signal $S_A$ becomes High. FIG. 13(c) depicts a waveform obtained by subtracting a value varied with time from the G waveform shown in FIG. 13(a) and integrating the result of subtraction by the integral processor 13. A threshold THB shown in the drawing indicates a predetermined value larger than the peak value of an output waveform, of an waveform outputted from the subtracting and integrating means 3, at the time of a shock, which requires no start signal, such as a run on a curb, hammering or the like. A waveform (control signal $S_B$) outputted from the one-shot timer 14 is also illustrated in the drawing. When the output of the integral processor 13 exceeds the threshold THB as shown in the drawing, the control signal $S_B$ becomes High. Even if the output of the integral processor 13 is equal to or below the threshold THB, the control signal $S_B$ is held High for a predetermined time interval by the one-shot timer 14. FIG. 13(d) shows a waveform (start signal $S_C$) outputted from the one-shot timer 15 driven based on the output of the logical product means 5 which makes a logical product or ANDing of the output waveform (decision signal $S_A$) of the one-shot timer 9 and the output waveform (control signal $S_B$) of the one-shot timer 14.

Figure 13A:
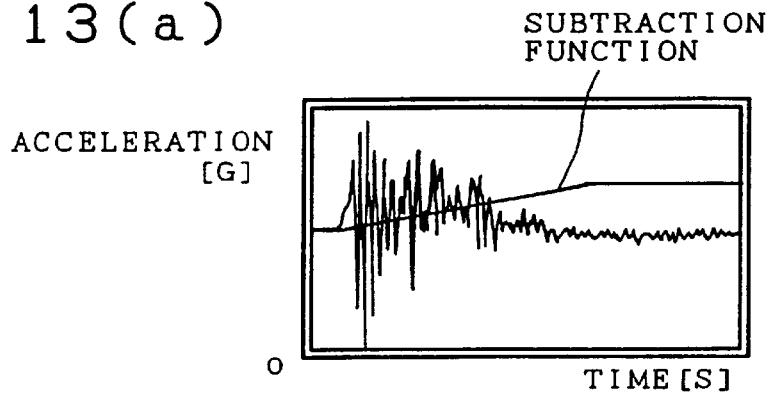
FIGS. 13(a) to 13(d) are signal waveform charts for describing the operation of generation of start signals by the starting device shown in FIG. 2.
Figure 13B:
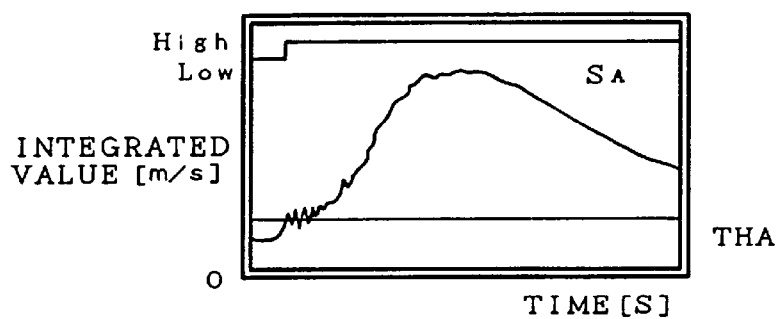
Figure 13C:
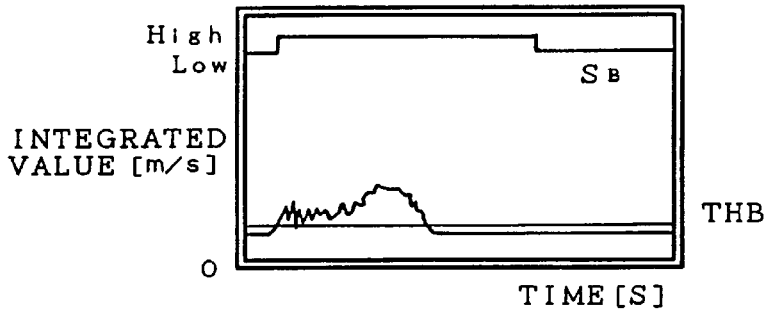
Figure 13D:
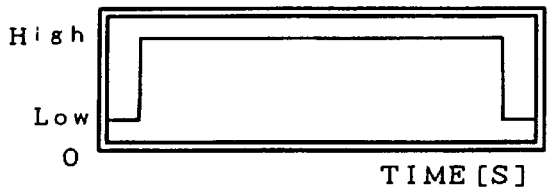

Upon high-speed collision, the output waveform of the integral processor 7 exceeds the threshold THA relatively quickly as shown in FIG. 13(b) and the decision signal $S_A$ becomes High at a given time.

Since the acceleration sharply rises in the case of the waveform at the time of the high-speed collision, the TTF is decided at the first half portion of the waveform even if the value varied with time is subjected from the waveform to restrict the latter half portion of the waveform. Therefore, the output of the integral processor 13 exceeds the threshold THB relatively quickly and the control signal $S_B$ becomes High at a given time. Since the one-shot timer 15 is driven based on the logical product of the decision signal $S_A$ and the control signal, the output waveform about the start signal $S_C$ becomes High at a given time. The High start signal brings the transistor 16 into conduction to thereby activate the starting means 17 so as to protect an occupant.

FIG. 14 shows waveforms outputted from the respective components of the device shown in FIG. 2 at the time of a run on a curb, which requires no start signal. Since the portions for outputting the respective waveforms are identical to those shown in FIG. 13, the same portions as those shown in FIG. 13 are identified by like reference numerals and the description of certain common portions will therefore be omitted.

Figure 14A:
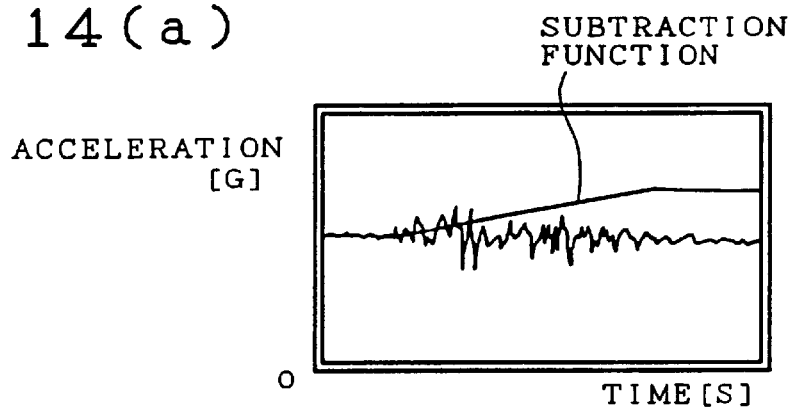
FIGS. 14(a) to 14(d) are signal waveform charts for describing the operation of non-generation of the start signals by the starting device shown in FIG. 2.
Figure 14B:
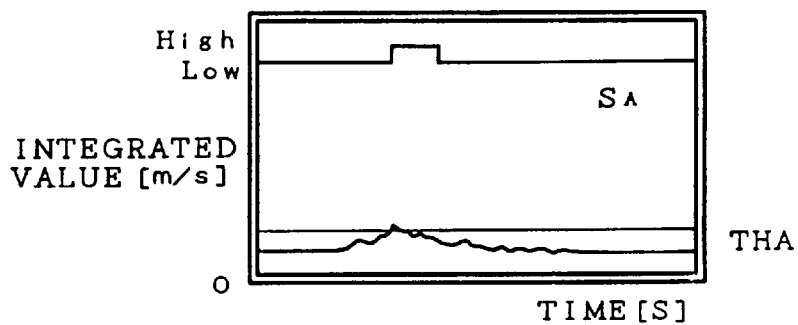
Figure 14C:
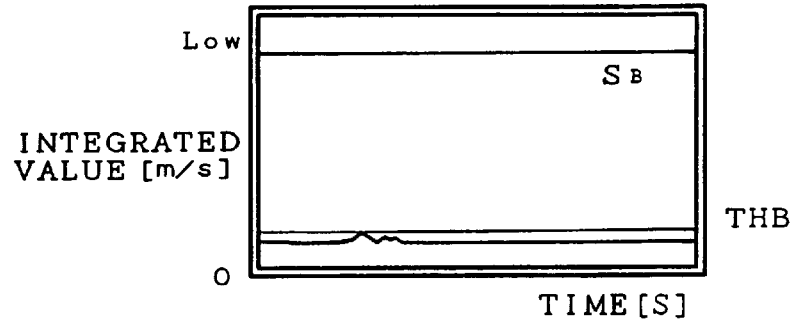
Figure 14D:
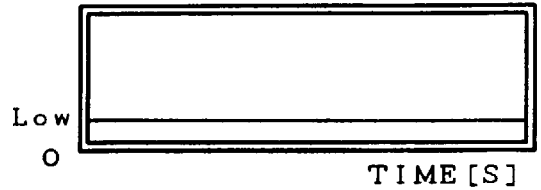

In a run-on-curb G waveform whose first half portion is similar to the on-collision waveform as shown in FIG. 14(a), a waveform outputted from the integral processor 7 gradually increases as shown in FIG. 14(b) and exceeds a threshold THA indicated by a straight line in the drawing. Therefore, a waveform (decision signal $S_A$) outputted from the one-shot timer 9 becomes High at a given time. On the other hand, in order to restrict the peak of an integrated value of a waveform at the time of a shock which requires no start signal and prevent a waveform at the time of a collision which requires the start signal, from causing a delay in the output of the start signal, a value varied with time, which is shown in FIG. 14(a), is subtracted from the waveform outputted from the G sensor 1 and the result of subtraction is integrated by the integral processor 13. Therefore, the peak of an integrated value corresponding to the output of the integral processor 13 does not exceed a threshold THB as shown in FIG. 14(c) and a waveform (control signal $S_B$) outputted from the one-shot timer 14 is Low. Thus, since the control signal $S_B$ provides prohibition against the generation of the start signal even if the decision signal $S_A$ becomes High, a start signal $S_C$ shown in FIG. 14(d) becomes Low and hence unnecessary start signals can be prevented from being outputted.

[Second Embodiment]

Figure 15:
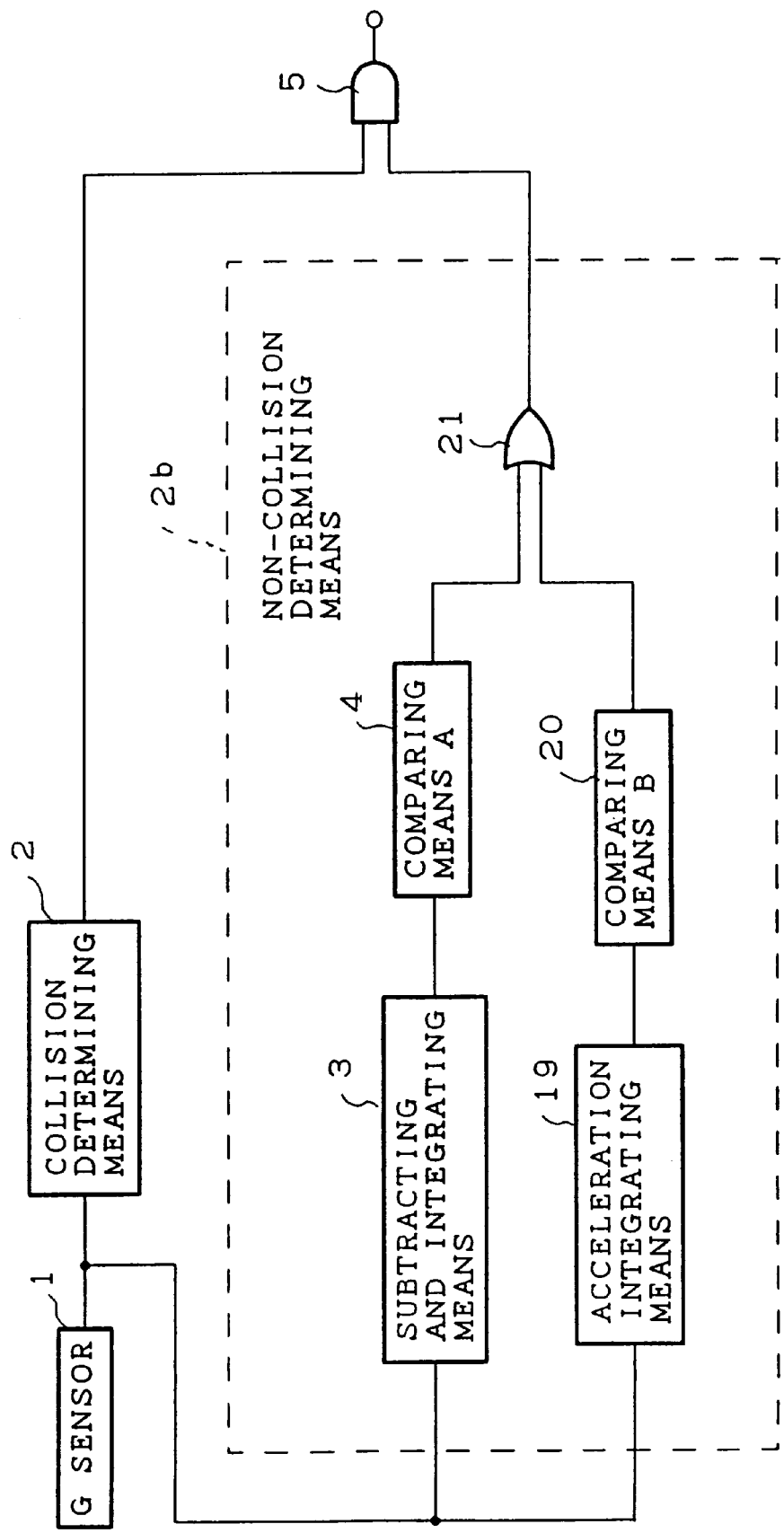
FIG. 15 is a block diagram illustrating a basic configuration of a device for starting an occupant crash protector, according to a second embodiment of the present invention.

FIG. 15 is a block diagram showing a basic configuration of a device for starting an occupant crash protector, according to a second embodiment of the present invention. The same elements of structure as those shown in FIG. 1 are identified by like reference numerals and the description of certain common elements will therefore be omitted. In FIG. 15, reference numeral 2b indicates a non-collision determining means employed in the second embodiment. Reference numeral 19 indicates an acceleration integrating means for integrating the output of a G sensor 1. Reference numeral 20 indicates a comparing means B (second comparing means) for comparing the output of the acceleration integrating means 19 with a threshold THC (second threshold) and thereby controlling the generation of a start signal. Reference numeral 21 indicates an ORing means or a logical sum means for outputting the OR of the output of a comparing means A4 from the subtracting and integrating means 3 and the output of the comparing means B, designated as reference numeral 20 (FIG. 15) (hereinafter abbreviated as "B20"), from the acceleration integrating means 19. The threshold THC is equivalent to a predetermined value larger than the peak value of an integrated value at the time of a shock unrequiring a start signal, of the output of the acceleration integrating means 19.

Figure 16:
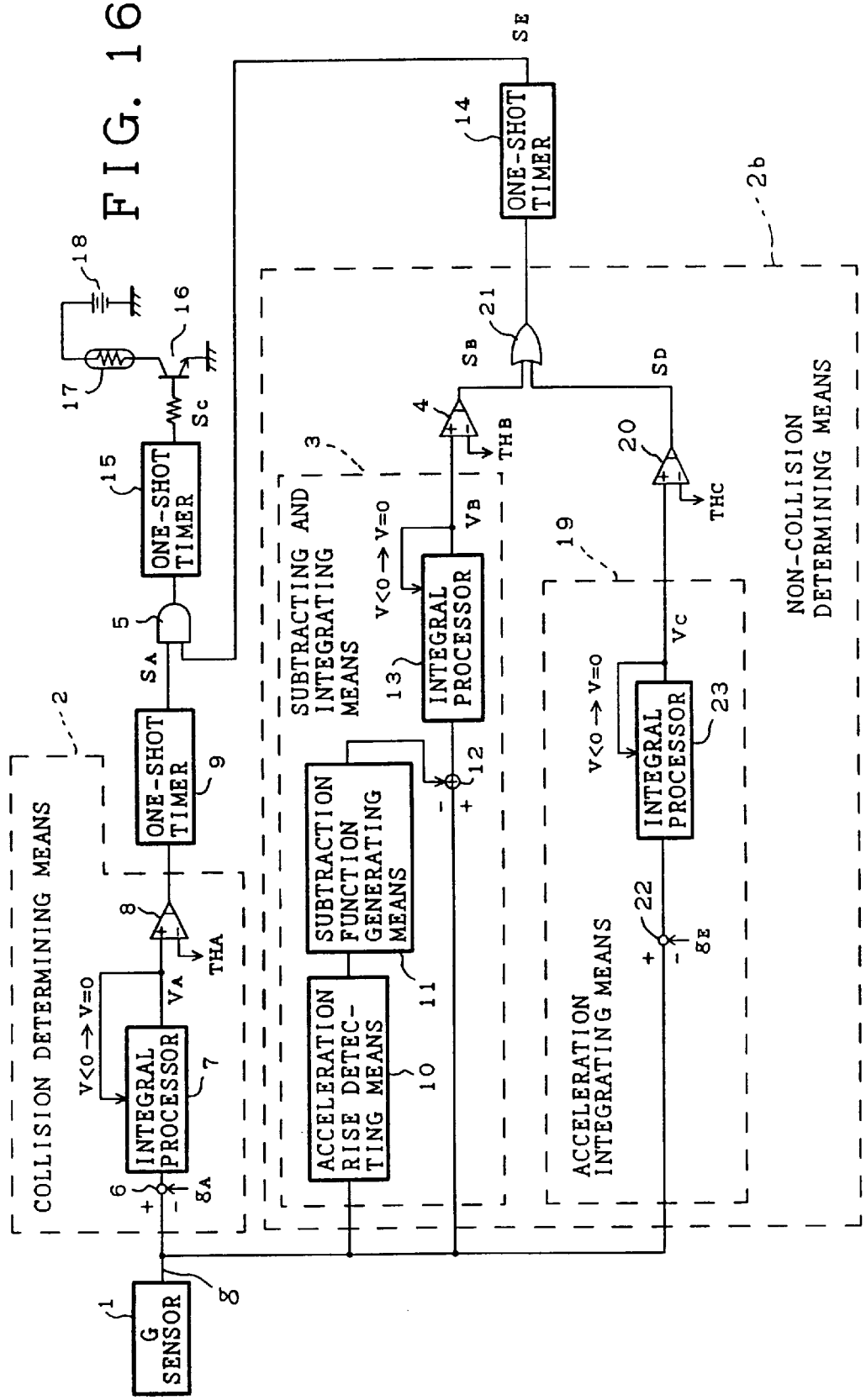
FIG. 16 is a block diagram depicting specific configurational examples of respective blocks in the basic configuration shown in FIG. 15.

FIG. 16 is a block diagram showing specific circuit examples of respective blocks in the basic configuration shown in FIG. 15. In FIG. 16, the acceleration integrating means 19 has a subtraction processor 22 for subtracting a predetermined value $g_E$ from an acceleration signal g detected by the G sensor 1, and an integral processor 23 having a reset function for integrating the output of the subtraction processor 22.

Since other configurations are similar to those shown in FIG. 2, the same elements of structure as those shown in FIG. 2 are identified by the same reference numerals and the description of certain common elements will therefore be omitted.

The device shown in FIG. 16 can be also materialized by a microcomputer in a manner similar to FIG. 2.

The operation of the present embodiment will now be described.

Figure 17:
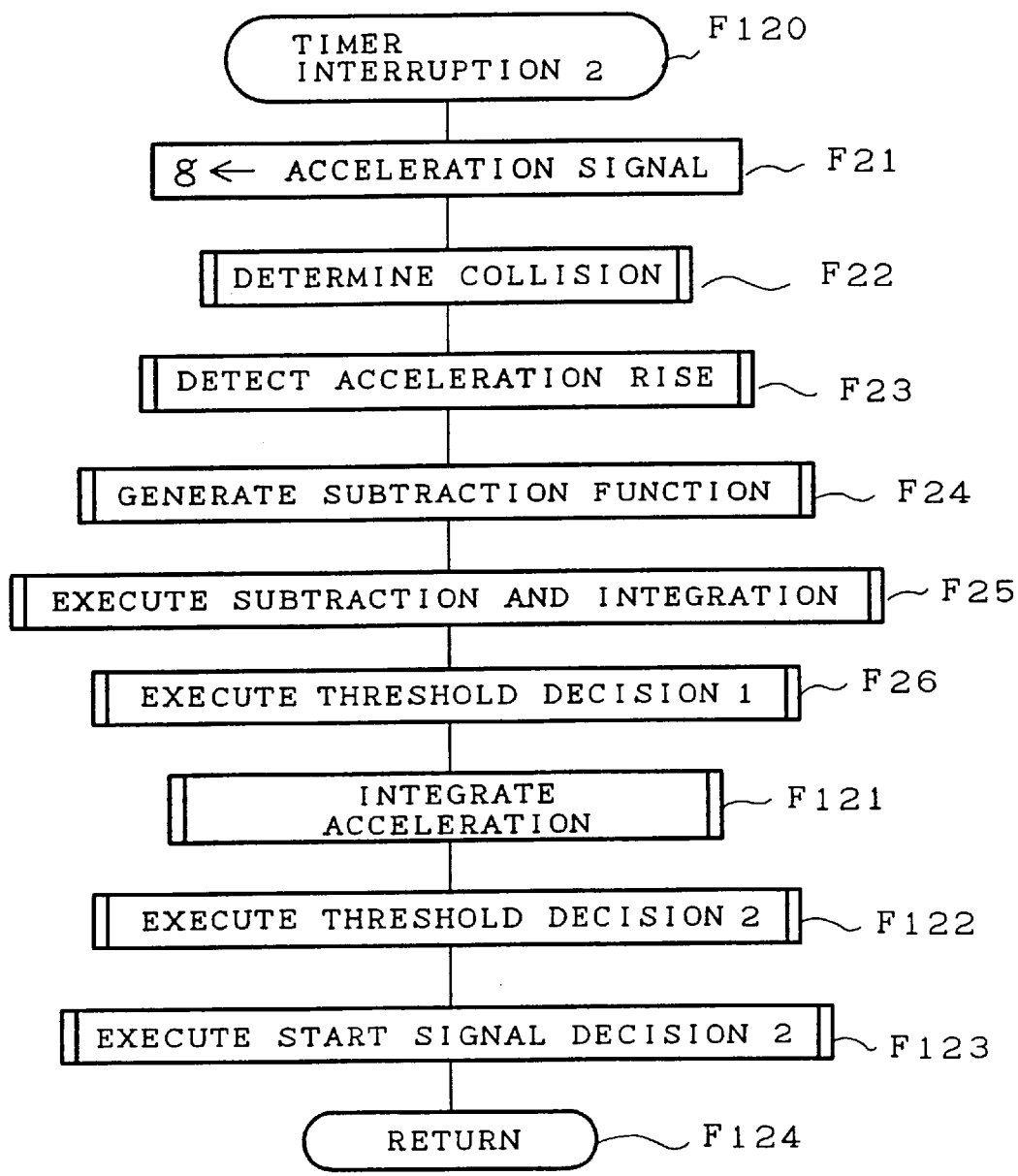
FIG. 17 is a flowchart for describing the operation of the starting device shown in FIG. 16.

FIG. 17 is a flowchart for describing the operation of the device shown in FIG. 16 which has been realized by the microcomputer. Since the main control flow is identical to that employed in the first embodiment, its description will be omitted.

In a process F120 shown in FIG. 17, a timer interruption 2 is started at predetermined time intervals. In a process F21, an acceleration signal outputted from the G sensor 1 is input as g. Further, a collision decision is made in a process F22. Next, an acceleration rise is detected by an acceleration rise detecting means 10 in a process F23. In a process F24, a subtraction function is generated from a subtraction function generating means 11 in response to the acceleration rise. In a process F25, a subtracted and integrated value is determined by a subtracting means 12 and an integral processor 13 and is compared with the preset threshold THB in a process F26. Next, the integral of acceleration or an acceleration integrated value is determined by the subtracting means 22 and the integral processor 23 in a process F121 and is compared with the preset threshold THC in a process F122. It is judged in a process F123, based on the result of decision in the process F22 and the results of decisions in the processes F26 and F122 whether a start signal is output. Afterwards, the timer interruption 2 is completed.

The acceleration integration in the process F121 is performed in the same manner as described above. Namely, in the subtraction and integration shown in FIG. 9, the integrated value $V_B$ is set as $V_C$. In FIG. 6 illustrative of the integral process in the process F92, the predetermined value $g_E$ is set to the offset OFS in the process F51.

The threshold decision 2 in the process F122 is performed in the same manner as described above. Namely, in the threshold decision 1 shown in FIG. 10, the integrated value $V_B$ is replaced by $V_C$, the threshold THB is replaced by THC and the control signal $S_B$ is replaced by $S_D$.

The start signal decision 2 in the process F123 is performed as shown in FIG. 18. Namely, if it is judged in a process F131 that the control signal $S_B$ based on the subtraction and integration and the control signal $S_D$ based on the acceleration integration are both Low, then the routine procedure proceeds to NO, i.e., a process F133 where a control signal $S_E$ is rendered Low. If it is judged in the process F131 that at least one of the control signal $S_B$ and the control signal $S_D$ is High, then the routine procedure proceeds to YES, i.e., a process F132 where the control signal $S_E$ is rendered High. Next, when it is judged in a process F134 that the collision decision signal $S_A$ and the control signal $S_E$ are both High, the routine procedure proceeds to YES, i.e., a process F135 where a start signal $S_C$ is set High. If it is judged in the process F134 that at least one of the collision decision signal $S_A$ and the control signal $S_E$ is Low, then the routine procedure proceeds to NO, i.e., a process F136 where the start signal $S_C$ is rendered Low and the process for the start signal decision 2 is terminated.

FIG. 19 shows waveforms outputted from the respective components of the device shown in FIG. 16 at the time of a special collision (dive collision developed under a truck) which requires a start signal. FIG. 19(a) illustrates a waveform outputted from the G sensor 1 at the time of the special collision which requires the start signal $S_C$. A function indicated by a solid line in the drawing corresponds to a waveform outputted from the subtraction function generating means 11. FIG. 19(b) shows a waveform obtained by subtracting a predetermined value $g_A$ from the G waveform shown in FIG. 19(a) and integrating the result of subtraction with the integral processor 7. A waveform (decision signal $S_A$) outputted from the one-shot timer 9 is also shown in the drawing. FIG. 19(c) shows a waveform obtained by subtracting a value varied with time from the G waveform shown in FIG. 19(a) and integrating the result of subtraction with the integral processor 13. A waveform (control signal $S_B$) outputted from the comparing means A4 is also illustrated in the drawing. FIG. 19(d) shows a waveform obtained by subtracting a predetermined value $g_E$ from the G waveform shown in FIG. 19(a) and integrating the result of subtraction with the integral processor 23. A threshold THC shown in the drawing indicates a value determined so as to become larger than the peak value of an output waveform obtained by integrating a waveform at the time of a shock, which requires no start signal, such as a run on a curb, hammering or the like, by the acceleration integrating means 19. A waveform (control signal $S_D$) outputted from the comparing means B20 is also illustrated in the same drawing. FIG. 19(e) shows a waveform (start signal $S_C$) outputted from the one-shot timer 15 driven based on the output of the logical product means 5 which makes a logical product of both the output (control signal $S_E$) of the logical sum means 21 for ORing the control signal $S_B$ shown in FIG. 19(c) and the control signal $S_D$ shown in FIG. 19(d), and the decision signal $S_A$ shown in FIG. 19(b).

Figure 19A:
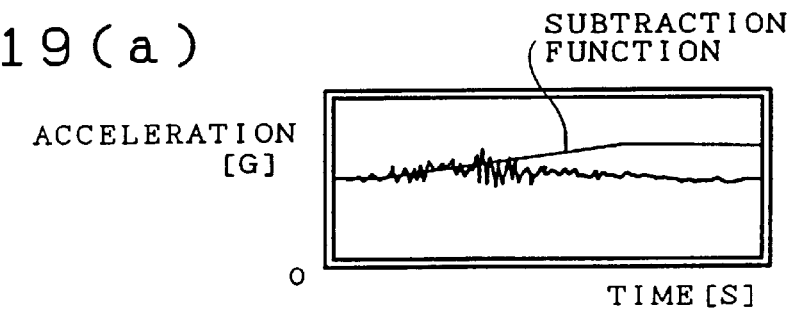
FIGS. 19(a) to 19(e) are signal waveform charts for describing the operation of generation of start signals by the starting device shown in FIG. 16.

Upon the special collision (upon the dive collision developed under the truck) shown in FIG. 19(a), the waveform gradually rises. However, the decision of the subtracting and integrating means 3 is performed by subtracting the value varied with time from the G waveform to restrict the latter half portion of the waveform and paying attention to the first half portion of the waveform. Therefore, the output waveform of the integral processor 13 is not so increased and does not exceed the threshold THB because the G waveform shown in FIG. 19(a) slowly rises. Thus, upon such a collision, the predetermine value $g_E$ rather than the value varied with time was subtracted from the G waveform to effectively use the rising edge of the intermediate portion of the waveform.

Figure 19B:
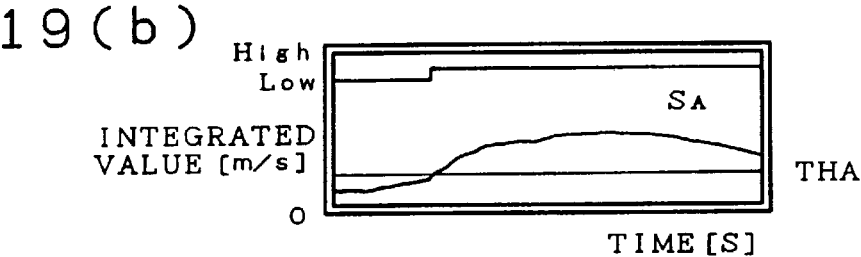
Figure 19C:
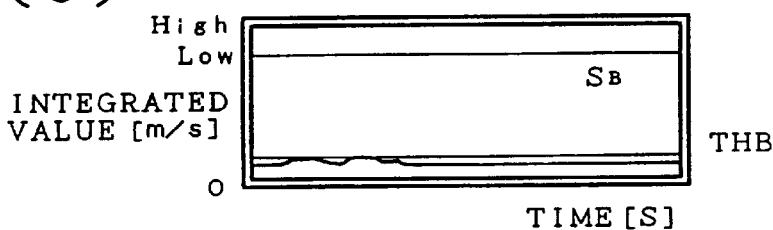
Figure 19D:
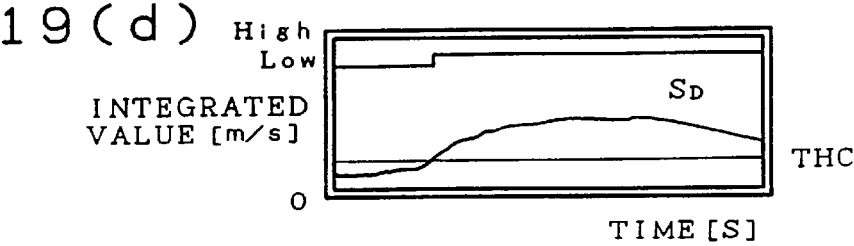
Figure 19E:
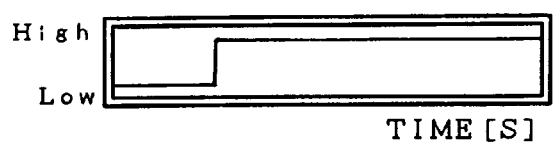

Upon the special collision, the output waveform of the integral processor 7 exceeds the threshold THA relatively quickly and the decision signal $S_A$ becomes High at a given time as shown in FIG. 19(b). Further, the output of the acceleration integrating means 19, which is obtained by subtracting the predetermined value $g_E$ from the G waveform with the subtracting means 22 and thereafter integrating the result of subtraction with the integral processor 23, exceeds the threshold THC at a given time and the control signal $S_D$ corresponding to the output of the comparing means B20 becomes High as shown in FIG. 19(d). Since the output (control signal $S_E$) of the logical sum means 21 is based on the logical sum of the control signal $S_B$ and the control signal $S_D$ the one-shot timer 14 is driven based on the control signal $S_D$.

Thus, the decision section composed of the acceleration integrating means 19 is principally effective on the special collision or the like on which the waveform slowly rises. Further, the decision section composed of the subtracting and integrating means 3 is principally effective on the high-speed collision or the like on which the waveform sharply rises.

FIG. 20 shows waveforms outputted from the respective components of the device shown in FIG. 16 at the time of a shock produced upon run on a curb, for example, which requires no start signal. Since the portions for outputting the respective waveforms are identical to those shown in FIG. 19, the same portions as those shown in FIG. 19 are identified by like reference portions and the description of certain common portions will therefore be omitted.

Figure 20A:
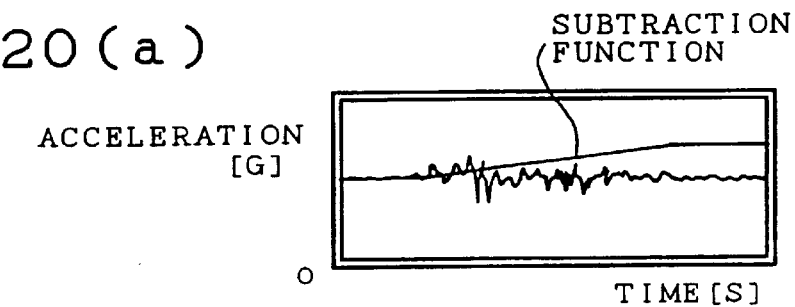
FIGS. 20(a) to 20(e) are signal waveform charts for describing the operation of non-generation of the start signals by the starting device shown in FIG. 16.
Figure 20B:
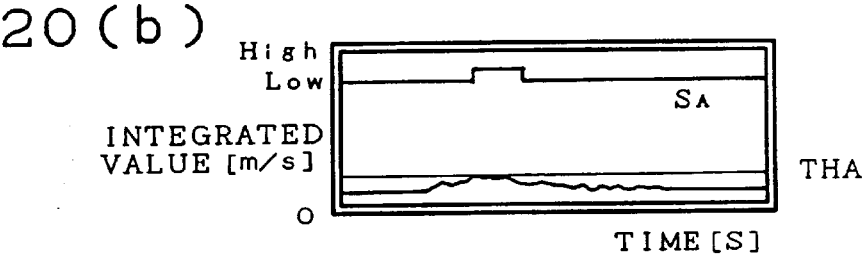
Figure 20C:
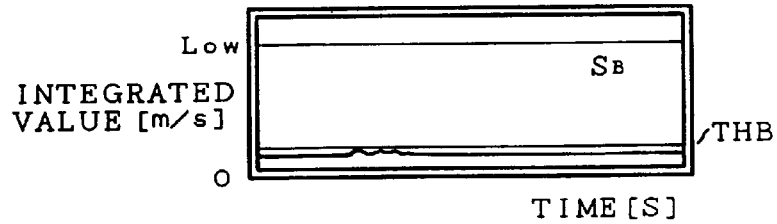
Figure 20D:
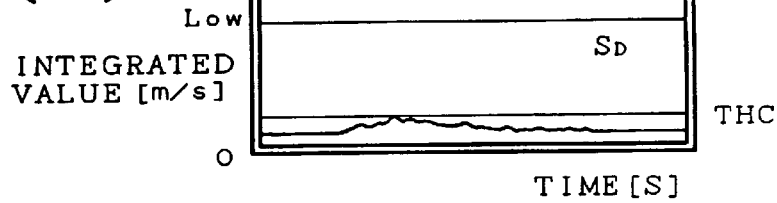
Figure 20E:
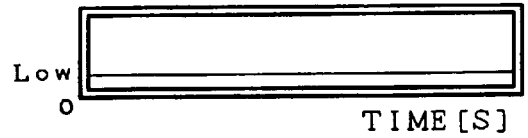

In a run-on-curb G waveform whose first half portion is similar to the on-collision waveform as shown in FIG. 20(a), a waveform outputted from the integral processor 7 gradually increases as shown in FIG. 20(b) and exceeds a threshold THA indicated by a straight line in the drawing. Therefore, a waveform (decision signal $S_A$) outputted from the one-shot timer 9 becomes High at a given time. On the other hand, in order to restrict the peak of an integrated value of a waveform at the time of a shock which requires no start signal and prevent a waveform at the time of a collision which requires the start signal, from causing a delay in the output of the start signal, a value varied with time, which is shown in FIG. 20(a), is subtracted from the waveform outputted from the G sensor 1 and the result of subtraction is integrated by the integral processor 13. Since the value varied with time is subjected to integration after its subtraction, the peak of an integrated value does not exceed a threshold THB as shown in FIG. 20(c) and a waveform (control signal $S_B$) outputted from the comparing means A4 is Low. Similarly, in order to restrict the peak of the integrated value of the waveform at the time of the collision which requires no start signal and prevent the waveform at the time of the collision which requires the start signal, from causing a delay in the output of the start signal, the predetermined value $g_E$ is subtracted from the waveform outputted from the G sensor 1 and the result of subtraction is integrated by the integral processor 23. Therefore, the peak of the integrated value does not exceed a threshold THC and a waveform (control signal $S_D$) outputted from the comparing means B20 is Low. Consequently, a control signal $S_E$ corresponding to the output of the logical sum means 21, which is based on the logical sum of the control signal $S_B$ and the control signal $S_D$, is Low. Thus, since the control signal $S_E$ provides prohibition against the generation of the start signal even if the decision signal $S_A$ becomes High, a start signal $S_C$ shown in FIG. 20(e) becomes Low and hence unnecessary start signals can be prevented from being outputted.

[Third Embodiment]

FIG. 21 is a block diagram showing a basic configuration of a device for starting an occupant crash protector, according to a third embodiment of the present invention. The same elements of structure as those shown in FIG. 15 are identified by like reference numerals and the description of certain common elements will therefore be omitted. In FIG. 21, reference numeral 2c indicates a non-collision determining means employed in the third embodiment. Reference numeral 24 indicates a cumulative time measuring means for cumulating time intervals required to output accelerations greater than a predetermined threshold. Reference numeral 25 indicates a comparing means C (third comparing means) for comparing the output of the cumulative time measuring means 24 and a threshold and thereby controlling the generation of a start signal. Reference numeral 26 indicates an ANDing means or a logical product means (second logical product means) for controlling the generation of the start signal, based on both the output of an ORing or logical sum means 21 which produces the ORing or logical sum of a signal outputted from a decision means comprised of a subtracting and integrating means 3 and a signal outputted from a decision means comprised of an acceleration integrating means 19, and the output of the comparing means C designated at numeral 25.

Figure 22:
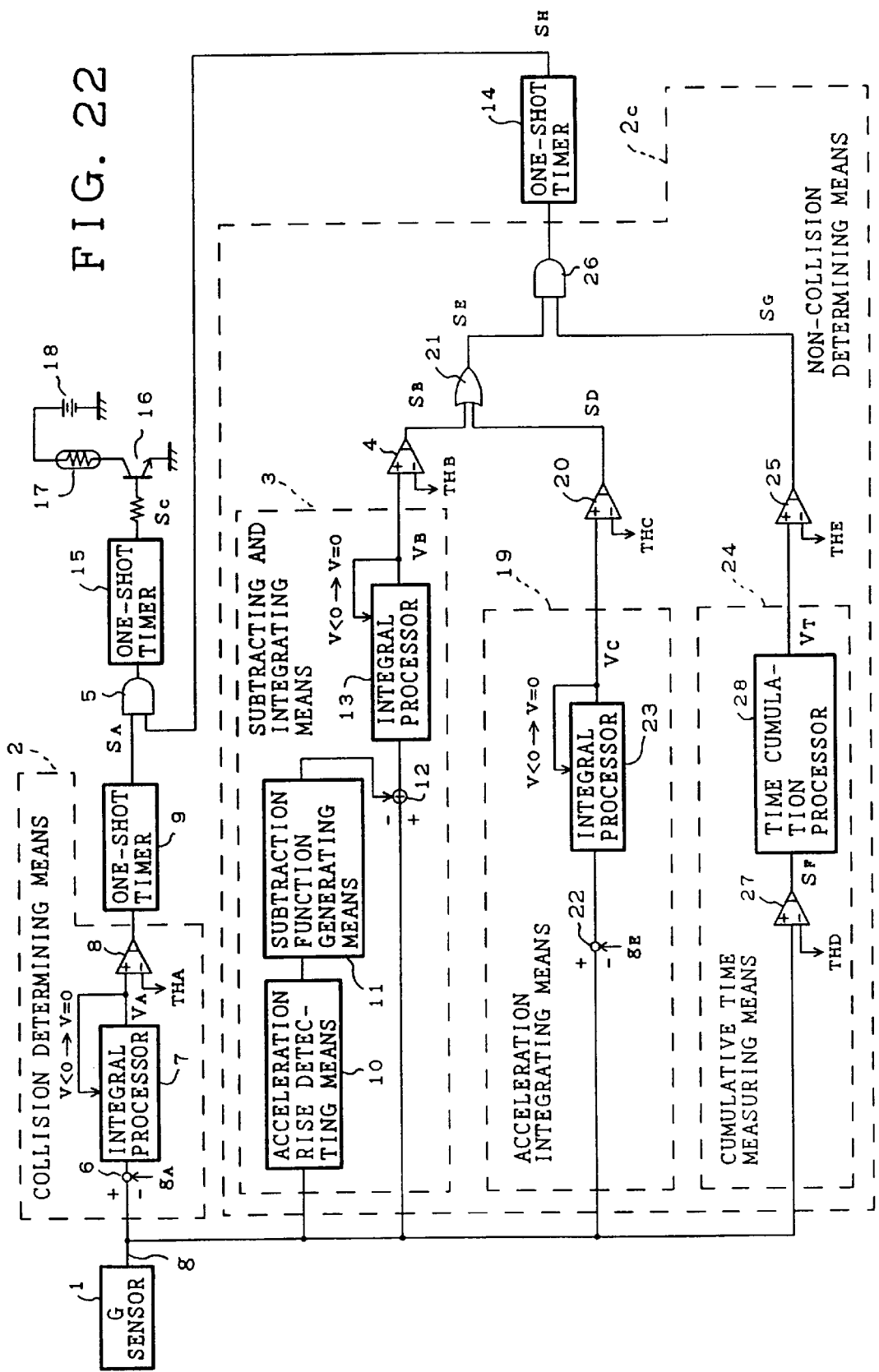
FIG. 22 is a block diagram showing specific configurational examples of respective blocks in the basic configuration shown in FIG. 21.

FIG. 22 is a block diagram showing specific configurational examples of respective blocks in the basic configuration shown in FIG. 21. In FIG. 22, the cumulative time measuring means 24 has a comparing means 27 for comparing an acceleration signal g detected by a G sensor 1 with a threshold (third threshold) THD, and a time cumulation processor 28 for cumulating time intervals during which the acceleration signal g exceeds the threshold THD. Further, the time cumulation processor 28 has the function of initially setting a cumulated value $V_T$ to 0 after a predetermined time interval has elapsed since the acceleration signal g rises. Since other configurations are identical to those shown in FIG. 16, the same elements of structure as those shown in FIG. 16 are identified by like reference numerals and the description of certain common elements will therefore be omitted.

The operation of the third embodiment will now be described.

Figure 23:
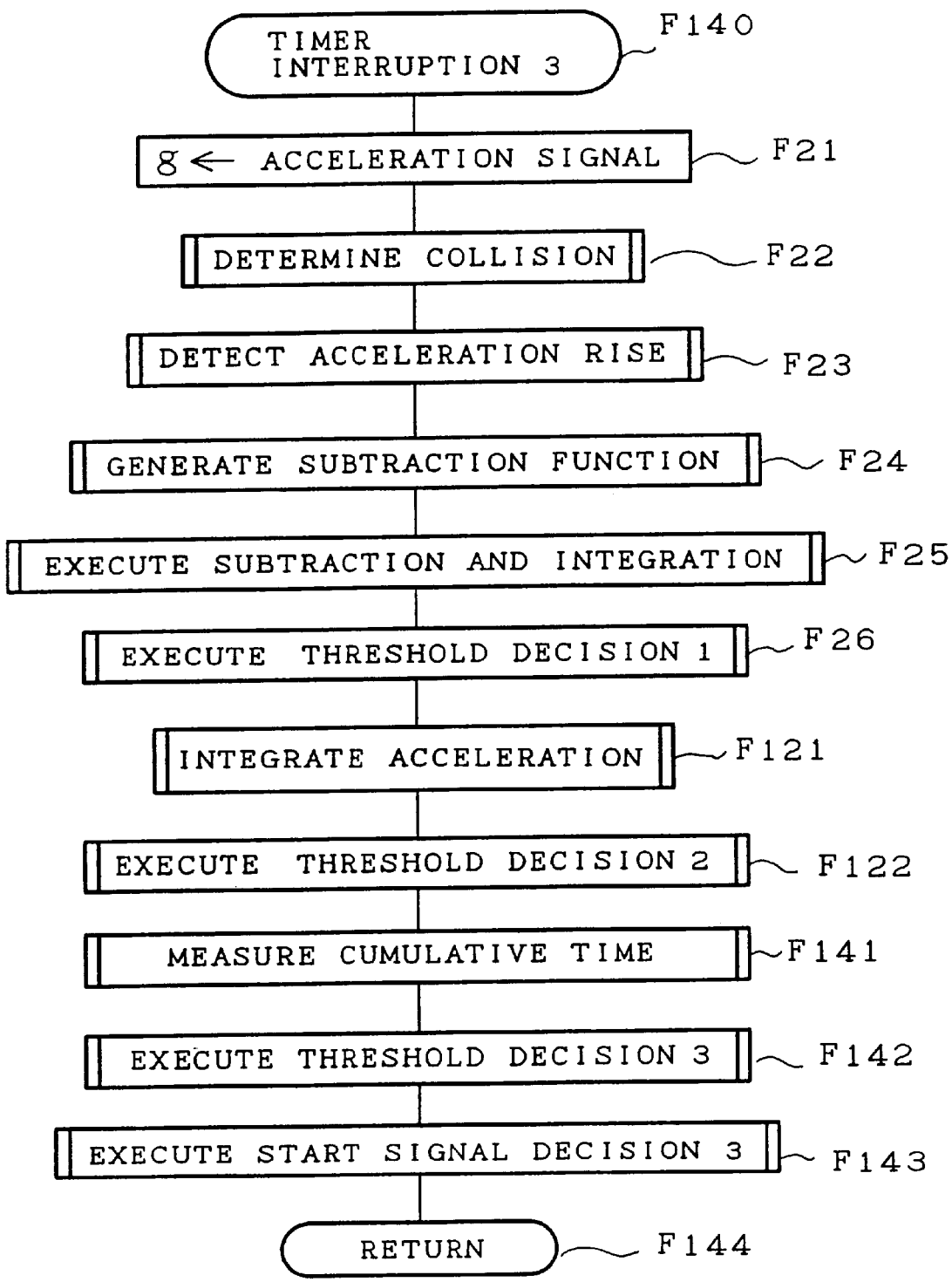
FIG. 23 is a flowchart for describing the operation of the starting device shown in FIG. 22.

FIG. 23 is a flowchart for describing main control of the device shown in FIG. 22, which has been realized by a microcomputer. Since a flow for the main control is identical to that executed in the first embodiment, its description will be omitted.

In a process F140 shown in FIG. 23, a timer interruption 3 is started at predetermined time intervals. In a process F21, an acceleration signal is input as g. Further, a normal collision decision is made in a process F22. Next, an acceleration rise is detected in a process F23. In a process F24, a subtraction function is generated in response to the acceleration rise. In a process F25, a subtracted and integrated value is determined and is compared with a preset threshold THB in a process F26. Next, the integral of acceleration or an acceleration integrated value is determined in a process F121 and is compared with a preset threshold THC in a process F122. In a process F141, a cumulative time interval is measured by the cumulative time measuring means 24 and is compared with a preset threshold THE (fourth threshold) in a process F142. It is judged in a process F143, based on the result of decision $S_A$ in the process F22 and the results of decisions $S_B$, $S_D$ and $S_G$ in the processes F26, F122 and F142 whether a start signal is output. Afterwards, the timer interruption 3 is completed.

Figure 24:
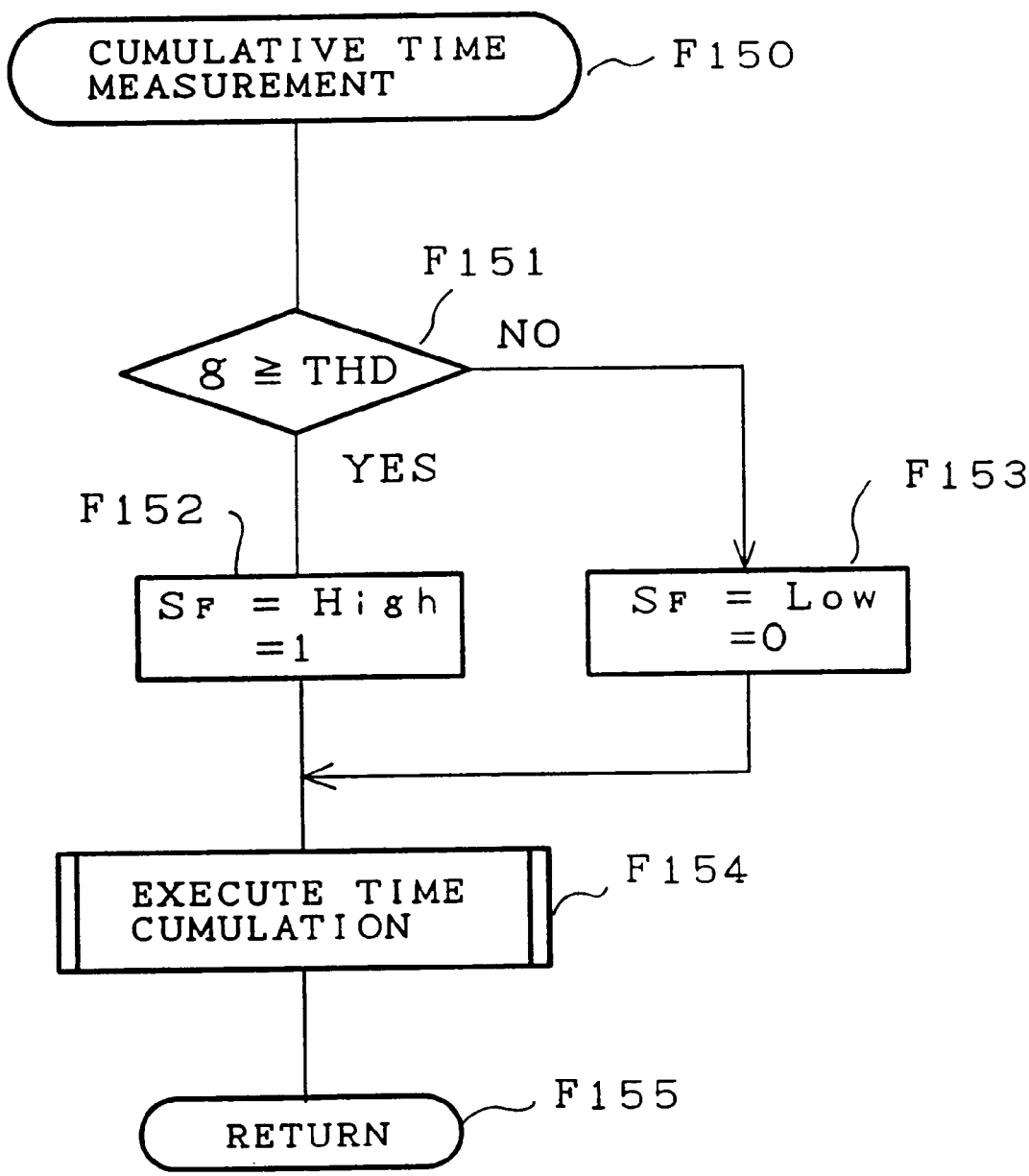
FIG. 24 is a flowchart for describing a cumulative time measuring process shown in FIG. 23, in detail.
Figure 25:
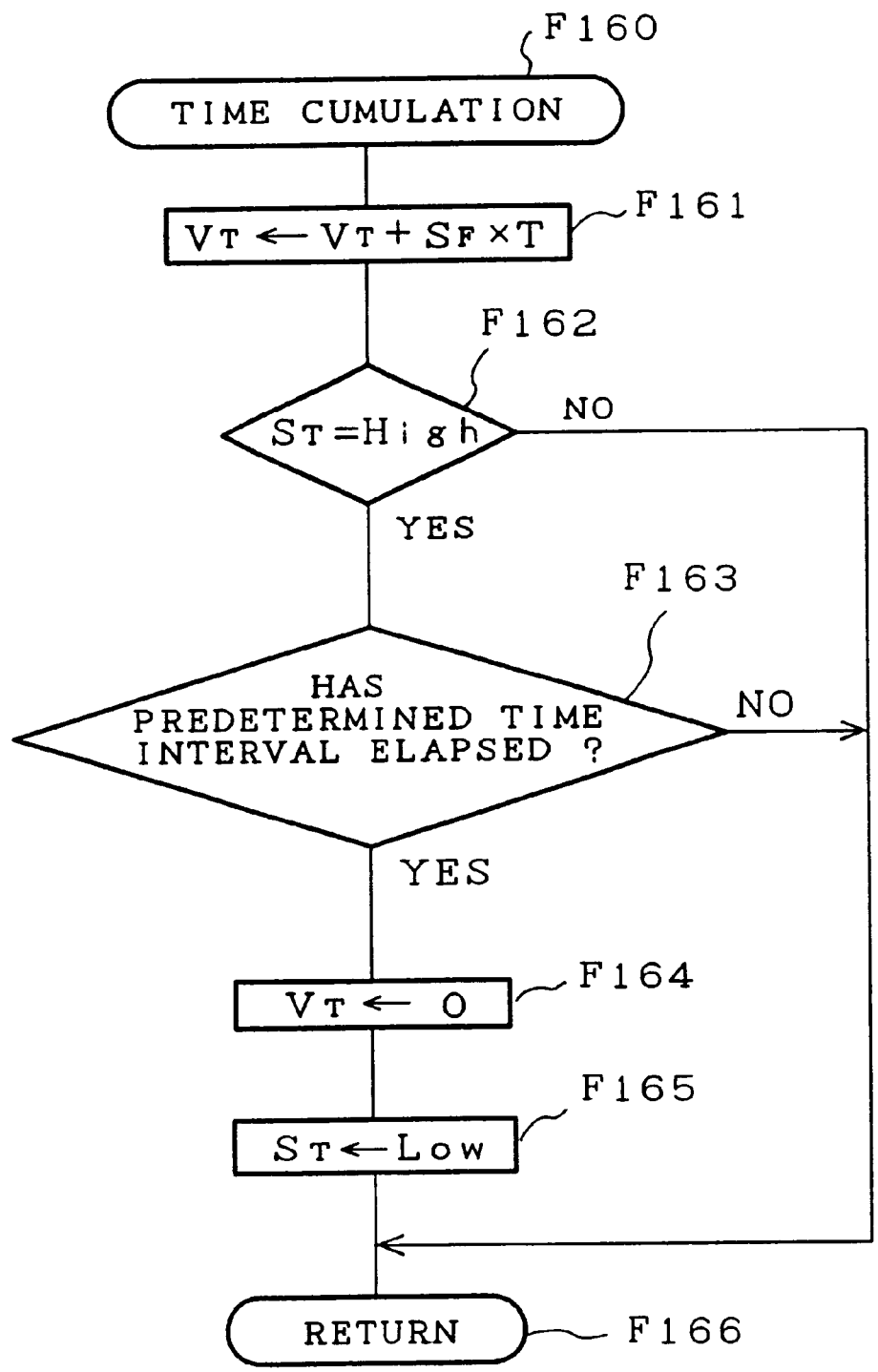
FIG. 25 is a flowchart for describing a time cumulation process shown in FIG. 24, in detail.

The cumulative time measurement in the process F141 is performed as shown in FIG. 24. Namely, when it is judged in a process F151 that g outputted from the G sensor 1 is greater than or equal to the preset threshold THD, the routine procedure proceeds to YES, i.e., a process 152 where a signal $S_F$ outputted from the comparing means 27 is set to High or 1. When the output g is found to be smaller than or equal to the threshold THD, the routine procedure proceeds to a process F153 where the output signal $S_F$ of the comparing means 27 is set to Low or 0. Thereafter, a time cumulation is executed in a process F154. This time cumulation includes processes of F160 to F166 shown in FIG. 25. In FIG. 25, one produced by multiplying the output signal $S_F$ by the sampling time interval T set in the process F11 in FIG. 3 is added to the cumulated value and the result of addition is defined as an output $V_T$ produced from the time cumulation processor 28.

In the case of the time cumulation as shown in FIG. 25, when the rise signal $S_T$ detected in the process F23 goes High, the routine procedure proceeds to YES in a process F162. When the detected signal $S_T$ becomes High and a predetermined time interval has elapsed, the routine procedure proceeds to a process F164 where the cumulated value $V_T$ is reset to 0. Thereafter, the detected signal $S_T$ is rendered Low in a process F165 and the routine procedure proceeds to a process F166. When the detected signal $S_T$ is found to be Low in the process F162 and it is judged in the process F163 that the predetermined time interval has not yet elapsed after the detected signal $S_T$ has been set High, the routine procedure proceeds to a process F166.

The threshold decision 3 of the comparing means C25 in the process F142 shown in FIG. 23 is performed in the same manner as the threshold decision 1 shown in FIG. 10 on the precondition that the integrated value $V_B$ is replaced by $V_T$, the threshold THB is replaced by THE and the control signal $S_B$ is replaced by $S_G$. Further, the cumulative time interval is compared with the threshold THE to control the start signal.

Figure 26:
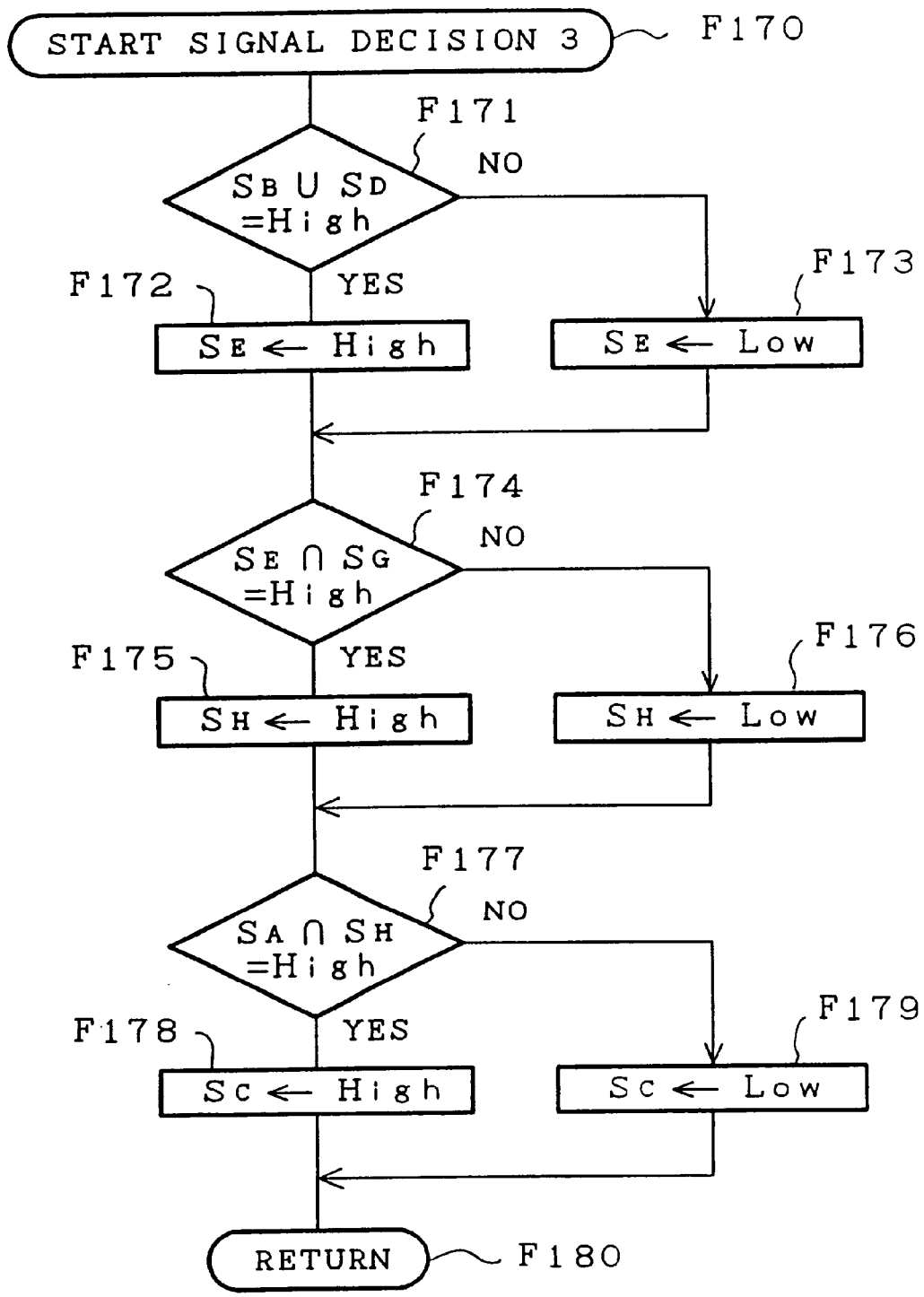
FIG. 26 is a flowchart for describing a process for a start signal decision 3 shown in FIG. 23, in detail.

The start signal decision 3 of the ORing means 21, the ANDing means 26 and the ANDing means 5 in the process F143 is carried out as shown in FIG. 26. Namely, if it is judged in a process F171 that the control signal $S_B$ outputted from the subtracting and integrating means 3 and the control signal $S_D$ outputted from the acceleration integrating means 19 are both Low, then the routine procedure proceeds to NO, i.e., a process F173 where a control signal $S_E$ is rendered Low. If it is judged in the process F171 that at least one of the control signals $S_B$ and $S_D$ is High, then the routine procedure proceeds to YES, i.e., a process F172 where the control signal $S_E$ is rendered High. If it is next judged in a process F174 that the control signal $S_E$ and the control signal $S_G$ produced from the cumulative time measurement are both High, then the routine procedure proceeds to YES, i.e., a process F175 where a control signal $S_H$ is rendered High. If it is judged in the process F174 that at least one of the control signal $S_E$ and the control signal $S_G$ corresponding to the output of the comparing means C25 is Low, then the routine procedure proceeds to NO, i.e., a process F176 where the control signal $S_H$ corresponding to the output of the one-shot timer 14 is set Low. If it is judged in a process F177 that the decision signal $S_A$ and the control signal $S_H$ are both High, then the routine procedure proceeds to YES, i.e., a process F178 where a start signal $S_C$ is rendered High. If it is judged in the process F177 that at least one of the decision signal $S_A$ and the control signal $S_H$ is Low, then the routine procedure proceeds to NO, i.e., a process F179 where the start signal $S_C$ is rendered Low.

Figure 27:
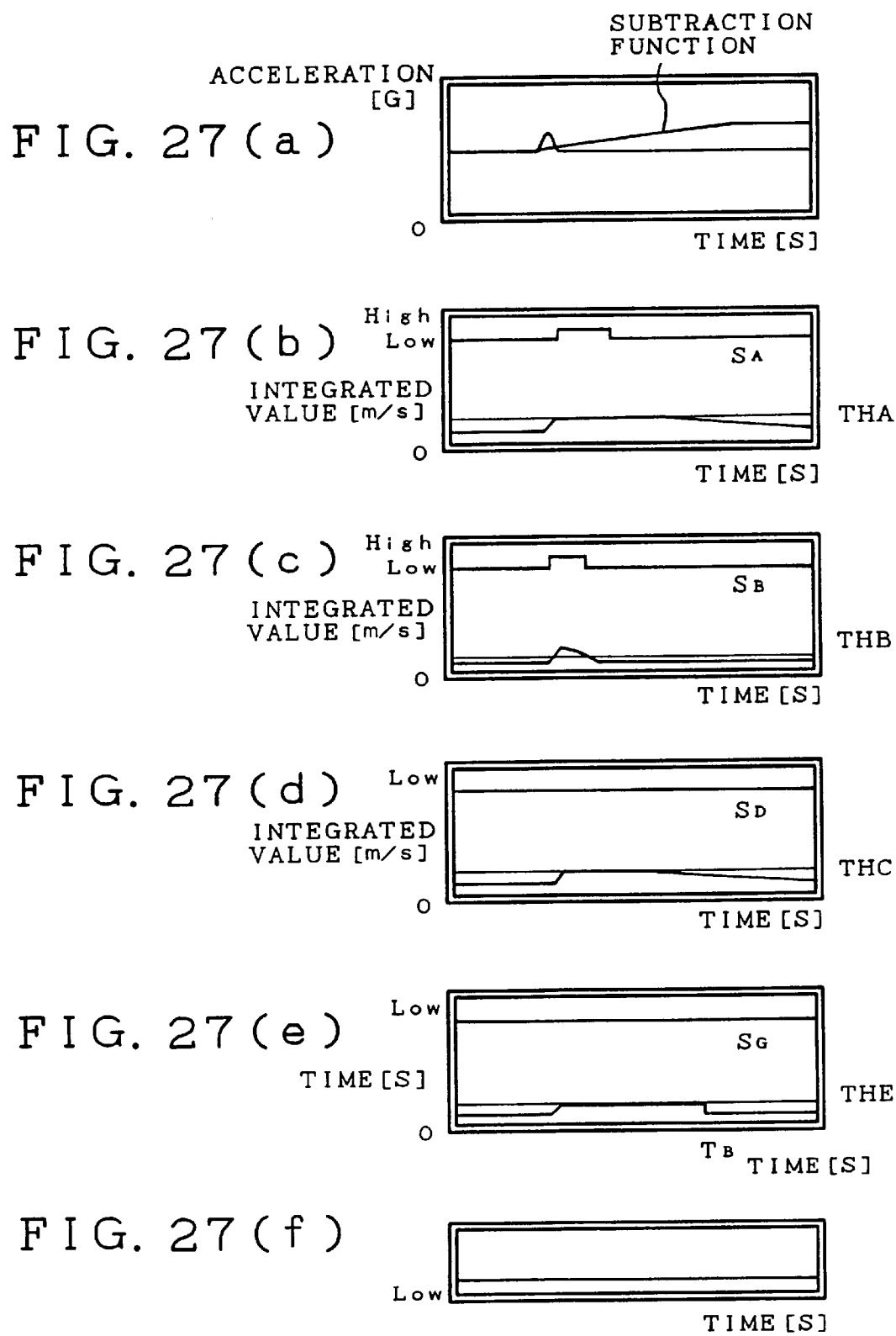
FIGS. 27(a) to 27(f) are signal waveform charts for describing the operation of non-generation of start signals by the starting device shown in FIG. 22.

FIG. 27 shows waveforms outputted from the respective components of the device shown in FIG. 22 at the time of an impact or shock such as hammering or the like which requires no start signal. FIG. 27(*a*) illustrates a waveform outputted from the G sensor 1 at the time of the shock such as hammering or the like which no requires the start signal $S_C$. A function indicated by a solid line in the drawing corresponds to a waveform outputted from the subtraction function generating means 11. FIG. 27(*b*) shows a waveform obtained by subtracting a predetermined value $g_A$ from the G waveform shown in FIG. 27(*a*) and integrating the result of subtraction with the integral processor 7. A waveform (decision signal $S_A$) outputted from the one-shot timer 9 is also shown in the drawing. FIG. 27(*c*) shows a waveform obtained by subtracting a value varied with time from the G waveform shown in FIG. 27(*a*) and integrating the result of subtraction with the integral processor 13. A waveform (control signal $S_B$) outputted from the comparing means A4 is also illustrated in the drawing. FIG. 27(*d*) shows a waveform obtained by subtracting a predetermined value $g_E$ from the G waveform shown in FIG. 27(*a*) and integrating the result of subtraction with the integral processor 23. A waveform (control signal $S_D$) outputted from the comparing means B20 is also shown in the drawing. FIG. 27(*e*) shows a waveform outputted from the time cumulation processor 28 for cumulating time intervals during which the output waveform shown in FIG. 27(*a*) is outputted so as to become greater than the predetermined threshold THD. A waveform (control signal $S_G$) outputted from the comparing means C25 is also shown in the drawing. The time cumulation processor 28 initially sets an output to 0 at a time $T_B$ shown in the drawing during which a predetermined time interval has elapsed since the detection of the acceleration rise. A threshold THE in the drawing is set to a value determined so as to become larger than the peak value of the output waveform of the cumulative time measuring means 24 at the time of a shock such as a run on a curb, hammering or the like, which no requires the start signal, or a threshold at which the timing for setting High the values of both the output (control signal $S_E$) of the ORing means 21 for ORing the control signal $S_B$ shown in FIG. 27(*c*) and the control signal $S_D$ shown in FIG. 27(*d*) at the time of the shock which no requires the start signal, and the control signal $S_G$ outputted from the comparing means C25, are shifted from each other in such a manner that the logical product of the output (control signal $S_E$) of the ORing means 21 and the control signal $S_G$ is not set High. FIG. 27(*f*) illustrates a waveform (start signal $S_C$) outputted from the one-shot timer 15 driven based on the output of the ANDing means 5 which ANDs the decision signal $S_A$ shown in FIG. 27(*b*) and the output (control signal $S_H$) of the ANDing means 26 for ANDing the output (control signal $S_E$) of the ORing means 21 for ORing both the control signal $S_B$ shown in FIG. 27(*c*) and the control signal $S_D$ shown in FIG. 27(*d*), and the control signal $S_G$ shown in FIG. 27(*e*).

When the shock that no requires the start signal, occurs even when the amplitude of acceleration greatly varies in a short time upon rising of the acceleration as shown in FIG. 27(*a*), the output waveform of the integral processor 7 suddenly increases as shown in FIG. 27(*b*) and thereby exceeds a threshold THA indicated by a straight line in the drawing. Therefore, the output waveform (decision signal $S_A$) of the one-shot timer 9 becomes High. Further, since the G waveform corresponding to the output of the integral processor 13 for subjecting the subtraction function to integration after its subtraction also rises sharply and is wide, the integrated value exceeds a threshold THB as shown in FIG. 27(*c*). Therefore, the output waveform (control signal $S_B$) of the comparing means A4 becomes High. Thus, the output waveform (control signal $S_E$) of the ORing means 21 becomes High.

On the other hand, according to the third embodiment, the time intervals during which the output of the G sensor 1 is outputted so as to becomes greater than the predetermined threshold THD are cumulated to restrict the peak of a time-cumulated value of a waveform which requires no start signal and prevent a waveform which requires the start signal, from causing a delay in the output of the start signal. Therefore, the peak of the cumulated value no longer exceeds the threshold THE and the output waveform (control signal $S_G$) of the comparing means C25 is Low. Thus, since the control signal $S_G$ provides prohibition against the generation of the start signal even if the control signal $S_E$ becomes High, the start signal $S_C$ shown in FIG. 27(*f*) becomes Low and hence unnecessary start signals can be prevented from being outputted.

Figure 28:
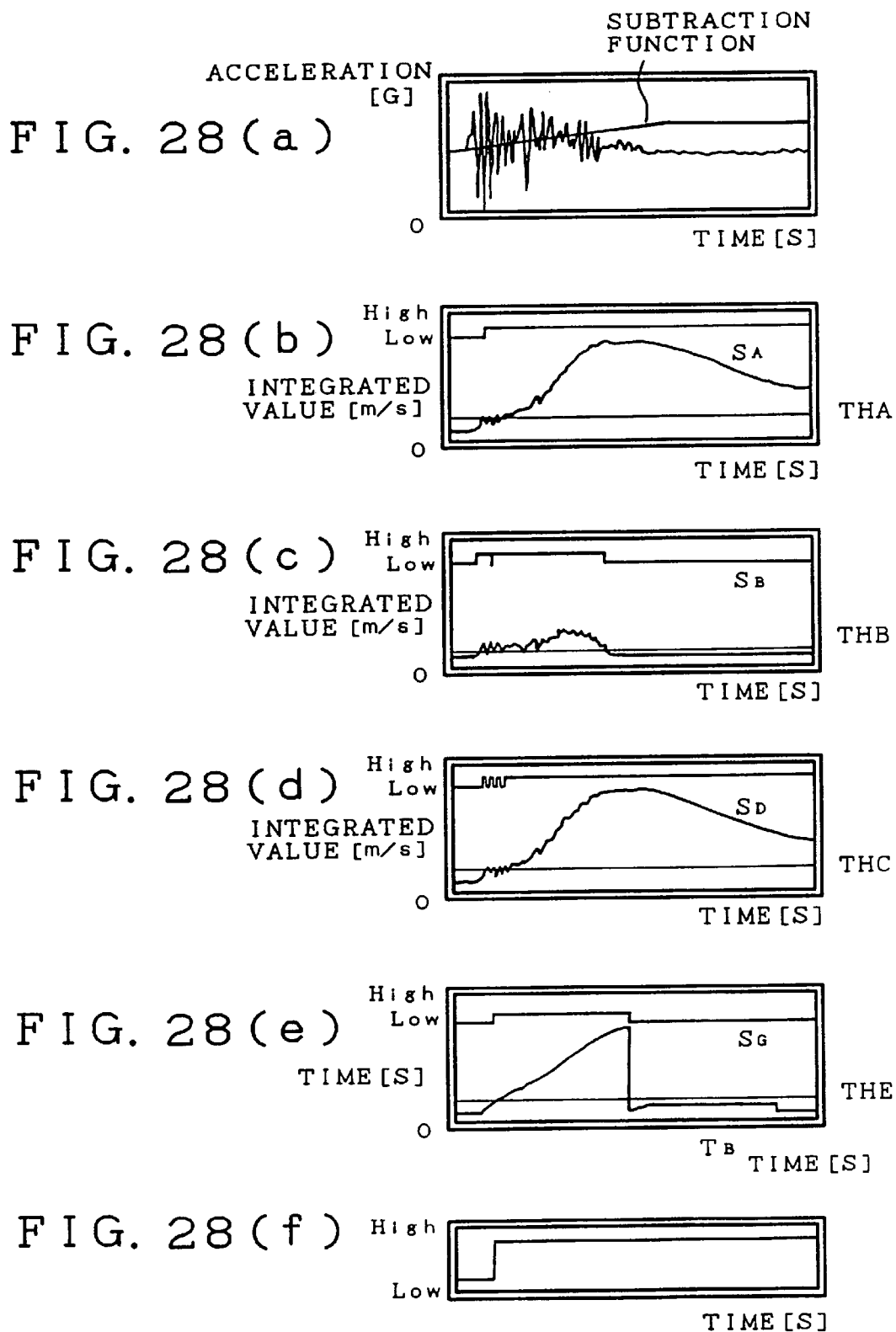
FIGS. 28(a) to 28(f) are signal waveform charts for describing the operation of generation of the start signals by the starting device shown in FIG. 22.

FIG. 28 illustrates waveforms outputted from the respective components of the device shown in FIG. 22 at the time of a high-speed collision. Since the portions for outputting the respective waveforms are identical to those shown in FIG. 27, the same portions as those shown in FIG. 27 are identified by like reference numerals and the description of certain common portions will therefore be omitted.

Upon the high-speed collision, as shown in FIG. 28(*b*), the output waveform of the integral processor 7 exceeds a threshold THA relatively quickly and a decision signal $S_A$ becomes High at a given time. The output of the subtracting and integrating means 3 exceeds a threshold THB at a given time as shown in FIG. 28(*c*) and a control signal $S_B$ becomes High. As shown in FIG. 28(*d*), the output of the acceleration integrating means 19 also exceeds a threshold THC at a given time and a control signal $S_D$ becomes High. Since the waveform at the time of the collision which requires the start signal is outputted while a large acceleration is continuously produced, the output of the cumulative time measuring means 24 also exceeds a threshold THE relatively quickly as shown in FIG. 28(*e*) and a control signal $S_G$ becomes High. Thus, since the output (start signal $S_C$) of the one-shot timer 15 becomes High at a given time, the starting device is reliably started according to the high-speed collision.

[Fourth Embodiment]

Figure 29:
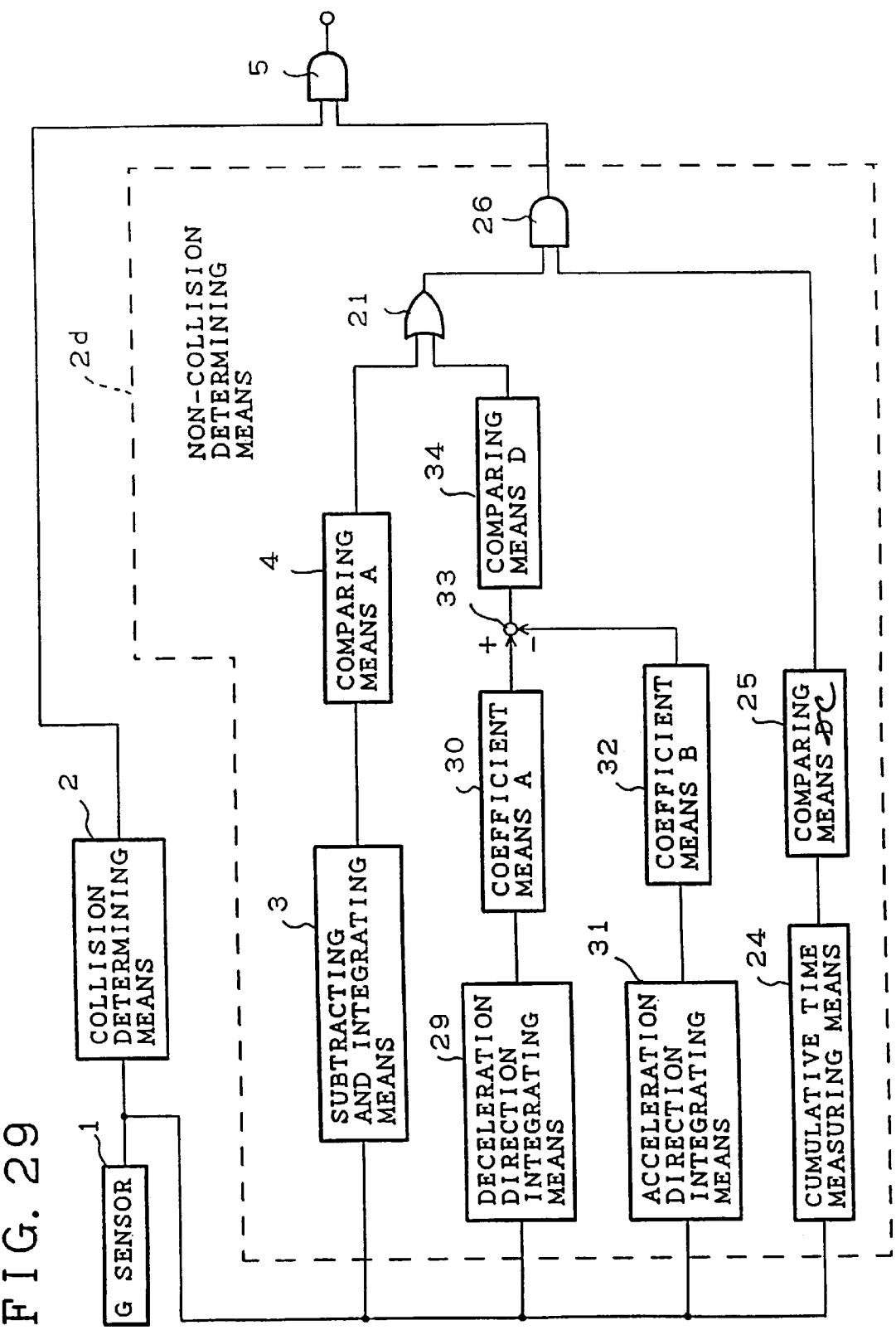
FIG. 29 is a block diagram showing a basic configuration of a device for starting an occupant crash proctor, according to a fourth embodiment of the present invention.

FIG. 29 is a block diagram illustrating a basic configuration of a device for starting an occupant crash protector, according to a fourth embodiment of the present invention. The same elements of structure as those shown in FIG. 21 are identified by like reference numerals and the description of certain common elements will therefore be omitted. In FIG. 29, reference numeral 2*d* indicates a non-collision determining means employed in the fourth embodiment. Reference numeral 29 indicates a deceleration direction integrating means for integrating a signal about an acceleration developed in the direction of deceleration of a vehicle from the output of the G sensor 1. Reference numeral 30 indicates a coefficient means A (first coefficient means) for multiplying the output of the deceleration direction integrating means 29 by a coefficient $K_1$ so as to assign weights to the output thereof. Reference numeral 31 indicates an acceleration direction integrating means for integrating a signal about an acceleration developed in the direction of acceleration of the vehicle from the output of the G sensor 1. Reference numeral 32 indicates a coefficient means B (second coefficient means) for multiplying the output of the acceleration direction integrating means 31 by a coefficient $K_2$ so as to assign weights to the output thereof. Reference numeral 33 indicates a subtraction processor for subtracting the output of the coefficient means B designated at numeral 32 from the output of the coefficient means A designated at numeral 30. Reference numeral 34 indicates a comparing means D (fourth comparing means) for comparing the output of the subtraction processor 33 with a predetermined threshold.

Figure 30:
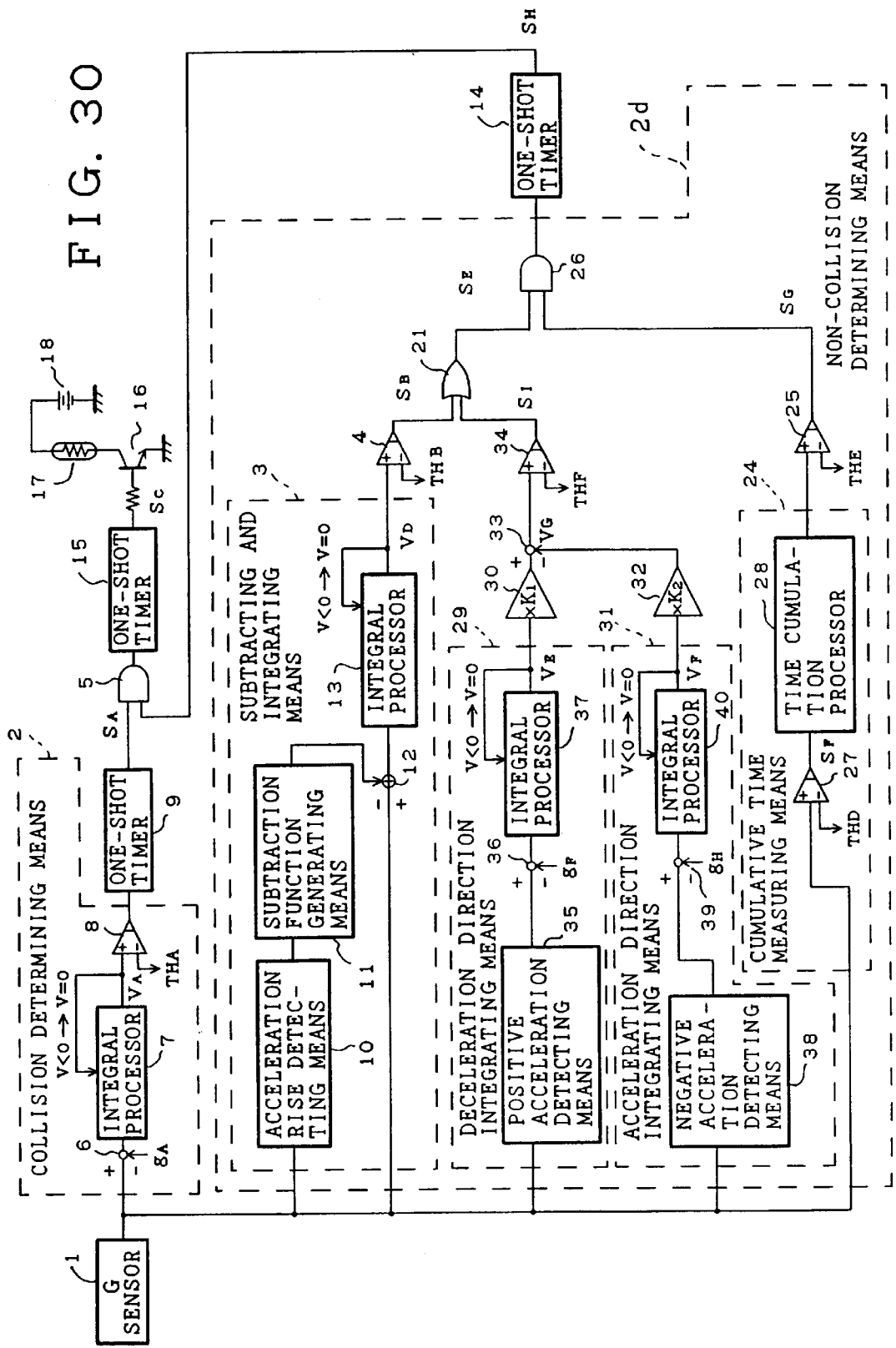
FIG. 30 is a block diagram illustrating specific configurational examples of respective blocks in the basic configuration shown in FIG. 29.

FIG. 30 is a block diagram showing specific configurational examples of respective blocks in the basic configuration shown in FIG. 29. Referring to FIG. 30, the deceleration direction integrating means 29 has a positive acceleration detecting means 35 for detecting only a positive acceleration (G sensor 1 will produce a positive acceleration when a vehicle decelerates) outputted from the G sensor 1, a subtraction processor 36 for subtracting a predetermined value $g_F$ from the output of the positive acceleration detecting means 35, and an integral processor 37 for integrating the output of the subtraction processor 36. Further, the acceleration direction integrating means 31 has a negative acceleration detecting means 38 for detecting only a negative acceleration outputted from the G sensor 1, a subtraction processor 39 for subtracting a predetermined value $g_H$ from the output of the negative acceleration detecting means 38, and an integral processor 40 for integrating the output of the subtraction processor 39. Since other configurations are identical to those shown in FIG. 22, the same elements of structure as those shown in FIG. 22 are identified by like reference numerals and the description of certain common elements will therefore be omitted.

The operation of the present embodiment will now be described.

Figure 31:
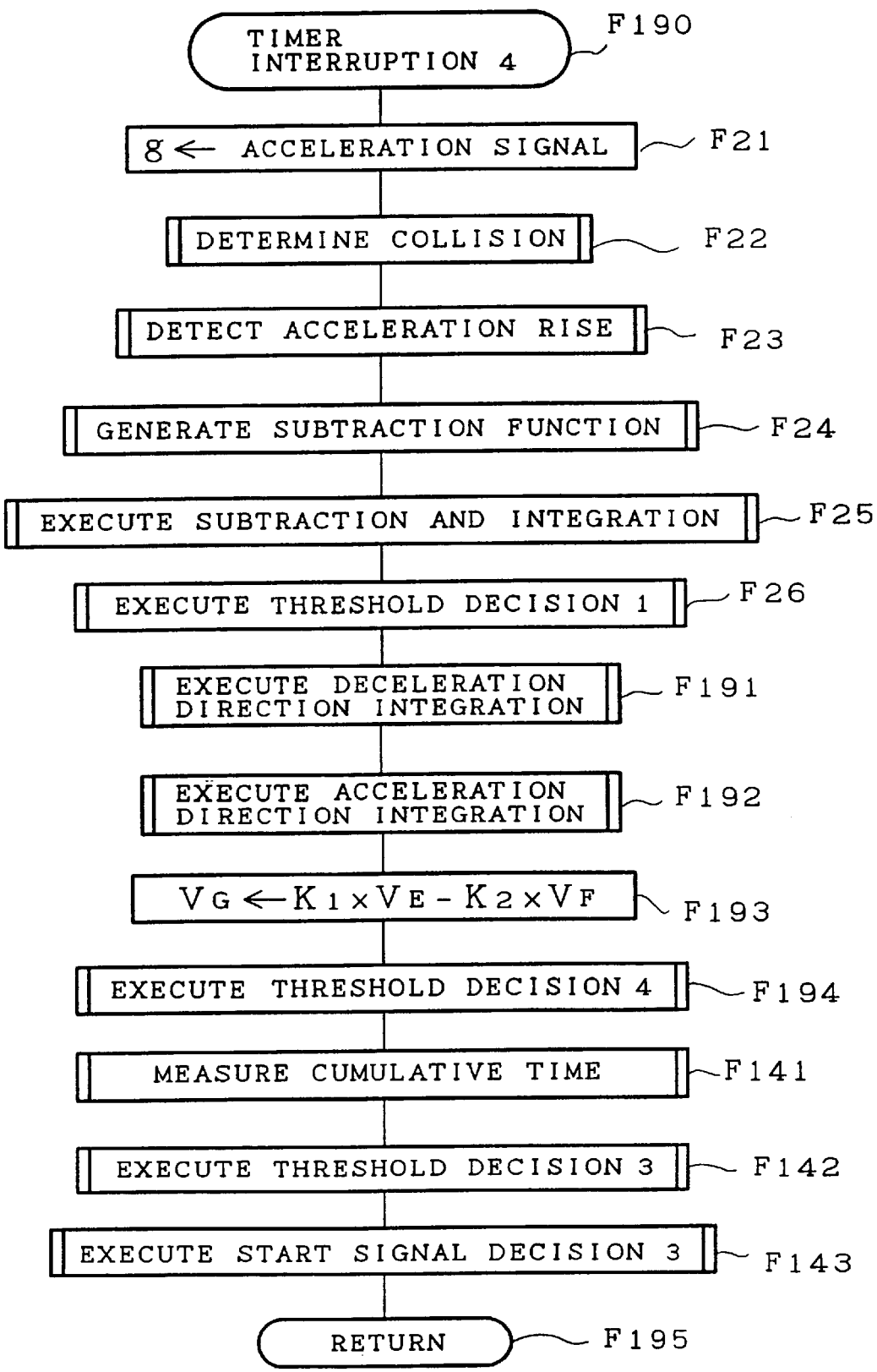
FIG. 31 is a flowchart for describing the operation of the starting device shown in FIG. 30.

FIG. 31 is a flowchart for describing the operation of the device shown in FIG. 30, which has been realized by a microcomputer. Since a flow for main control is identical to that employed in the first embodiment, its detailed description will be omitted.

In a process F190 shown in FIG. 31, a timer interruption 4 is started for each predetermined time interval. In a process F21, an acceleration signal is input as g. Further, a normal collision decision is made in a process F22. Next, an acceleration rise is detected in a process F23. In a process F24, a subtraction function is generated in response to the acceleration rise. In a process F25, a subtracted and integrated value is determined and is compared with a preset threshold THB in a process F26. Next, an integrated value in the direction of deceleration of the vehicle is determined in a process F191 and an integrated value in the direction of acceleration thereof is determined in a process F192. In a process F193, a value obtained by assigning a weight of a coefficient $K_2$ to the integral of acceleration or the acceleration integrated value $V_F$ is subtracted from a value obtained by assigning a weight of a coefficient $K_1$ to the integral of deceleration or the deceleration integrated value $V_E$ and the result of subtraction is defined as $V_G$. In a process F194, a comparison is made between $V_G$ and a preset threshold THF. In a process F141, a cumulative time interval is measured and is compared with a preset threshold THE in a process F142. It is judged in process F143, based on the result of decision $S_A$ in the process F22 and the results of decisions $S_B$, $S_I$ and $S_G$ in the processes F26, F194 and F142, whether a start signal is outputted. Thereafter, the timer interruption 4 is completed.

Figure 32:
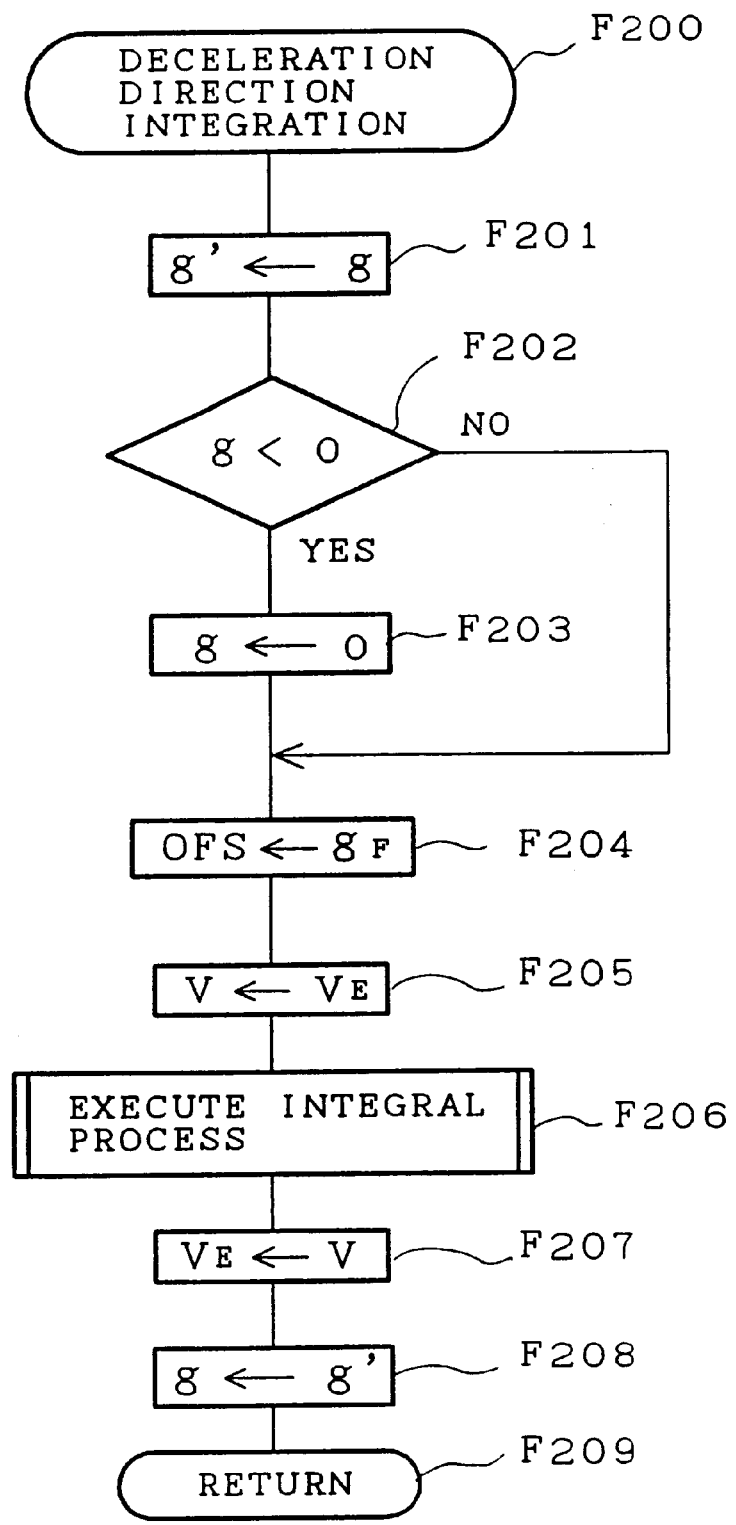
FIG. 32 is a flowchart for describing a deceleration direction integrating process shown in FIG. 31, in detail.

The integration in the direction of deceleration of the vehicle in the process F191 shown in FIG. 31 is carried out as illustrated in FIG. 32. Namely, the acceleration signal g is saved on an acceleration signal g' in a process F201. If it is judged in a process F202 that g is smaller than 0, then the routine procedure proceeds to a process F203 where g is set to 0. Thereafter, the routine procedure proceeds to a process F204. If it is judged in the process F202 that g is greater than 0, then the routine procedure proceeds to a process F204. Next, an offset OFS is set to a predetermined value $g_F$ in the process F204. In a process F205, $V_E$ is set to an integrated value V and an integral process is executed in a process F206.

In a process F207, the integrated value $V_E$ is set to the integrated value V. In a process F208, the acceleration signal g' is reset to the acceleration signal g. Thereafter, the routine procedure proceeds to a process F209 where the process F191 shown in FIG. 31 is terminated.

Figure 33:
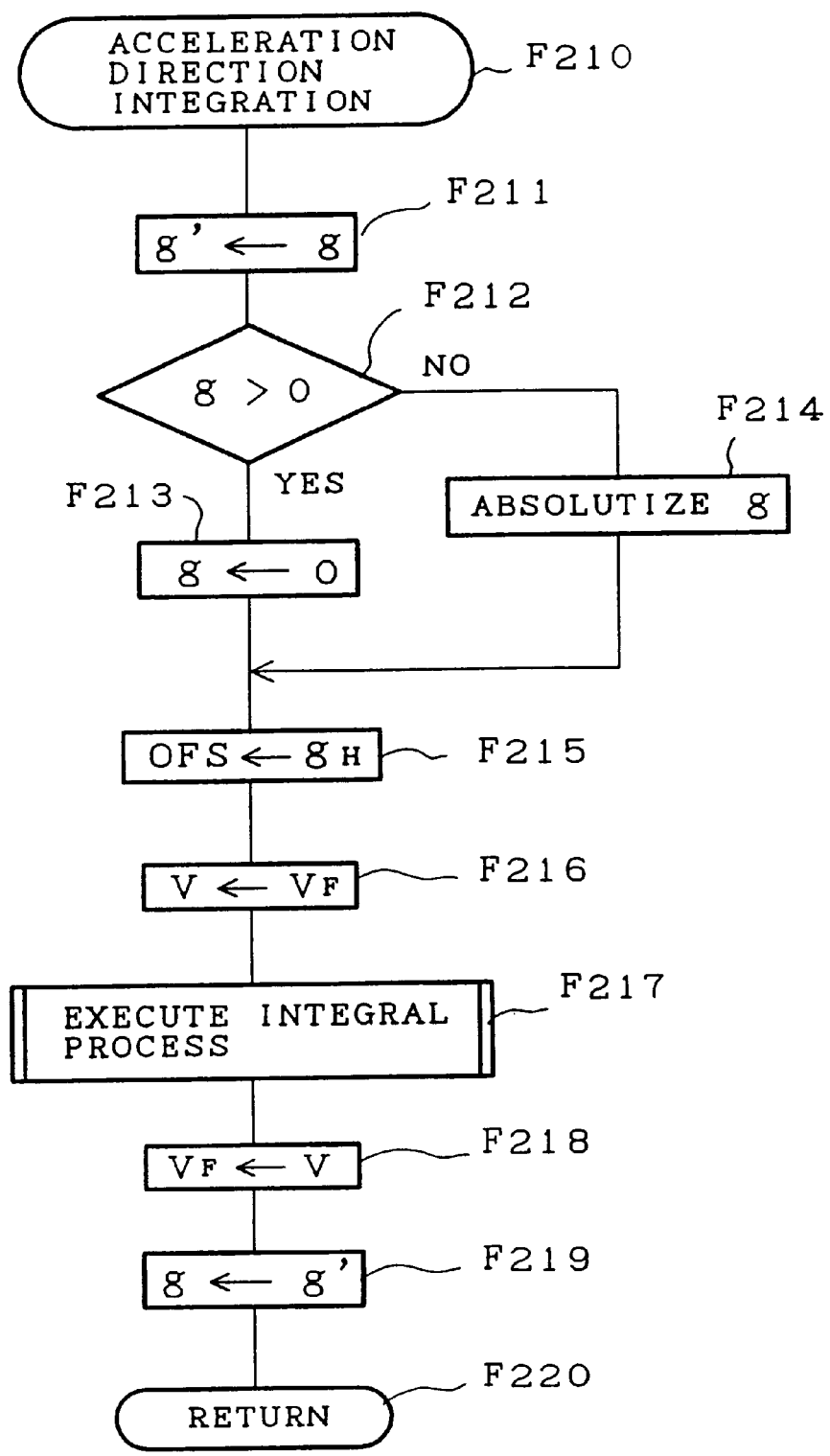
FIG. 33 is a flowchart for describing an acceleration direction integrating process shown in FIG. 31, in detail.

The integration in the direction of acceleration of the vehicle in the process F192 shown in FIG. 31 is performed as shown in FIG. 33. Namely, in a process F211, an acceleration signal g is saved on an acceleration signal g'. If it is judged in a process F212 that g is smaller than 0, then the routine procedure proceeds to a process F214 where g is absolutized, followed by proceeding to a process F215. If it is judged in the process F212 that g is greater than 0, then the routine procedure proceeds to a process F213 where g is set to 0. Next, an offset OFS is set to $g_H$ in a process F215. In a process F216, $V_F$ is set to an integrated value V and an integral process is executed in a process F217.

In a process F218, the integrated value $V_F$ is set to the integrated value V. In a process F219, the acceleration signal g' is reset to the acceleration signal g and thereafter the routine procedure proceeds to a process F220 where the process F192 shown in FIG. 31 is finished.

FIG. 34 shows parts of waveforms outputted from the respective components in the non-collision determining means 2d. The left side as seen in the FIG. 34(*a*) shows a waveform outputted from the G sensor 1 at the time of a shock such as a run on a curb, which requires no start signal. The right side as seen in FIG. 34(*a*) illustrates a waveform outputted from the G sensor 1 at the time of a special collision (such as a dive collision under a truck, for example) which requires the start signal. Further, the left and right sides as seen in FIG. 34(*b*) respectively show waveforms each obtained by subtracting a value produced by assigning a weight of a coefficient $K_2=4$ to an integrated value of a G waveform as defined in the direction of acceleration of the vehicle from a value produced by assigning a weight of a coefficient $K_1=1$ to an integrated value of the G waveform as defined in the direction of deceleration of the vehicle and waveforms each obtained by subtracting a predetermined value (corresponding to the maximum value of an acceleration developed upon normal running of the vehicle) from the G waveform and integrating the result of subtraction, upon the shock such as the run on the curb, which no requires the start signal and the special collision which requires the start signal.

When the predetermined value is simply subtracted from the output of the G sensor 1 and the result of subtraction is integrated, the integrated value at the time of the run on the curb is represented as V5 indicated on the left side as seen in FIG. 34(*b*) and the integrated value at the time of the special collision is represented as V7 indicated on the right side as seen in FIG. 34(b). Since the start signal is unnecessary upon run on the curb, the threshold is set to a threshold TH3 greater than the peak value of V5. TTF at the time of the special collision becomes t3 at which V7 exceeds the threshold TH3.

On the other hand, when a value produced by weighting the integrated value as defined in the direction of acceleration of the vehicle is subtracted from a value produced by weighting the integrated value as defined in the direction of deceleration of the vehicle as in the fourth embodiment, the output waveform at the time of the run on the curb is represented as V6 indicated on the left side as seen in FIG. 34(b) and the integrated value at the time of the special collision is represented as V8 indicated on the right side as seen in FIG. 34(b). Since a negative acceleration is frequently detected in the case of the waveform at the time of the run on the curb, V6 becomes smaller than V5. Since the threshold may be a value greater than the peak value of V6, the threshold becomes a threshold TH4 lower than the threshold TH3 at V5. Thus, TTF at the time of the special collision becomes t4 earlier than t3.

FIG. 35 shows waveforms outputted from the respective components of the device shown in FIG. 30 at the time of a special collision (such as a dive collision under a truck or the like) which requires a start signal. FIG. 35(a) illustrates a waveform outputted from the G sensor 1 at the time of the special collision which requires a start signal $S_C$. A function indicated by a solid line in the drawing corresponds to a waveform outputted from the subtraction function generating means 11. FIG. 35(b) shows a waveform obtained by subtracting a predetermined value $g_A$ from the G waveform shown in FIG. 35(a) and integrating the result of subtraction with the integral processor 7. A waveform (decision signal $S_A$) outputted from the one-shot timer 9 is also shown in the drawing. FIG. 35(c) shows a waveform obtained by subtracting a value varied with time from the G waveform shown in FIG. 35(a) and integrating the result of subtraction with the integral processor 13. A waveform (control signal $S_B$) outputted from the comparing means A4 is also illustrated in the drawing. FIG. 35(d) shows a waveform outputted from the subtraction processor 33 for subtracting the value obtained by weighting the integrated value as defined in the direction of acceleration of the vehicle from the value obtained by weighting the integrated value as defined in the direction of deceleration of the vehicle. A threshold THF in the drawing is of a value defined so as to become larger than the peak value of the output waveform of the subtraction processor 33 at the time of the shock unrequiring the start signal, such as the run on the curb, hammering or the like. A waveform (control signal $S_I$) outputted from the comparing means D34 is also shown in the drawing. FIG. 35(e) shows a waveform outputted from the time cumulation processor 28 for cumulating time intervals during which the acceleration shown in FIG. 35(a) is greater than a predetermined threshold THD. A waveform (control signal $S_G$) outputted from the comparing means C25 is also shown in the drawing. FIG. 35(f) illustrates a waveform (start signal $S_C$) outputted from the one-shot timer 15 driven based on the output of the ANDing means 5 which ANDs the decision signal $S_A$ shown in FIG. 35(b) and the output (control signal $S_H$) of the ANDing means 26 for ANDing the output (control signal $S_E$) of the ORing means 21 for ORing both the control signal $S_B$ shown in FIG. 35(c) and the control signal $S_I$ shown in FIG. 35(d), and the control signal $S_G$ shown in FIG. 35(e).

Upon the special collision, the output waveform of the integral processor 7 exceeds the threshold THA relatively quickly and the decision signal $S_A$ becomes High at a given time as shown in FIG. 35(b).

Since, however, the output waveform of the G sensor 1 does not rise sharply upon the special collision such as the dive collision under the truck or the like, the output waveform of the integral processor 13, which is obtained by subtracting the value varied with time from the G waveform and integrating the result of subtraction, does not exceed a threshold THB.

Thus, in the fourth embodiment, the output waveform of the subtraction processor 33 shown in FIG. 35(d) is produced which is obtained by subtracting the value produced by weighting the acceleration-direction integrated value from the value produced by weighting the deceleration-direction integrated value. The output waveform of the subtraction processor 33 exceeds the threshold THF relatively quickly and the control signal $S_I$ becomes High. Further, the output waveform of the time cumulation processor 24 exceeds a threshold THE and the control signal $S_G$ becomes High.

Since the one-shot timer 15 is driven based on the logical product of the decision signal $S_A$ and the control signal $S_H$, the start signal $S_C$ or the output waveform becomes High at a given time. The High start signal $S_C$ brings a transistor 16 into conduction to thereby activate a starting means 17 so as to protect an occupant. Thus, the starting device can be reliably started up even in the case of the special collision such as the dive collision under the truck or the like. FIG. 36 shows waveforms outputted from the respective components of the device shown in FIG. 30 at the time of a run on a curb, which requires no start signal. Since the portions for outputting the respective waveforms are identical to those shown in FIG. 35, the same portions as those shown in FIG. 35 are identified by like reference numerals and the description of certain common portions will therefore be omitted.

As shown in FIG. 36(a), the waveform of the acceleration signal at the time of the rub on the curb is similar in rise to the waveform at the time of the collision. In a waveform at the time of the run on the curb, in which an acceleration (negative acceleration) in the direction of acceleration of the vehicle is frequently detected, the output waveform of the integral processor 7 gradually increases as shown in FIG. 36(b) and exceeds a threshold THA indicated by a straight line in the drawing. Therefore, a waveform (decision signal $S_A$) outputted from the one-shot timer 9 becomes High at a given time.

In the fourth embodiment, however, in order to restrict the peak of the integrated value of the waveform which no requires the start signal and prevent the waveform which requires the start signal, from causing a delay in the output of the start signal, the accelerations in the directions of deceleration and acceleration of the vehicle are weighted and the difference therebetween is determined after having been taken out and integrated from the output waveform of the G sensor 1. Accordingly, the peak of the difference does not exceed a threshold THF in the case of the run on the curb and a waveform (control signal $S_I$) outputted from the comparing means D34 becomes Low. Thus, since the control signal $S_I$ provides prohibition against the generation of the start signal even if the decision signal $S_A$ becomes High, a start signal $S_C$ shown in FIG. 36(e) becomes Low and hence unnecessary start signals can be prevented from being outputted.

[Fifth Embodiment]

Figure 37:
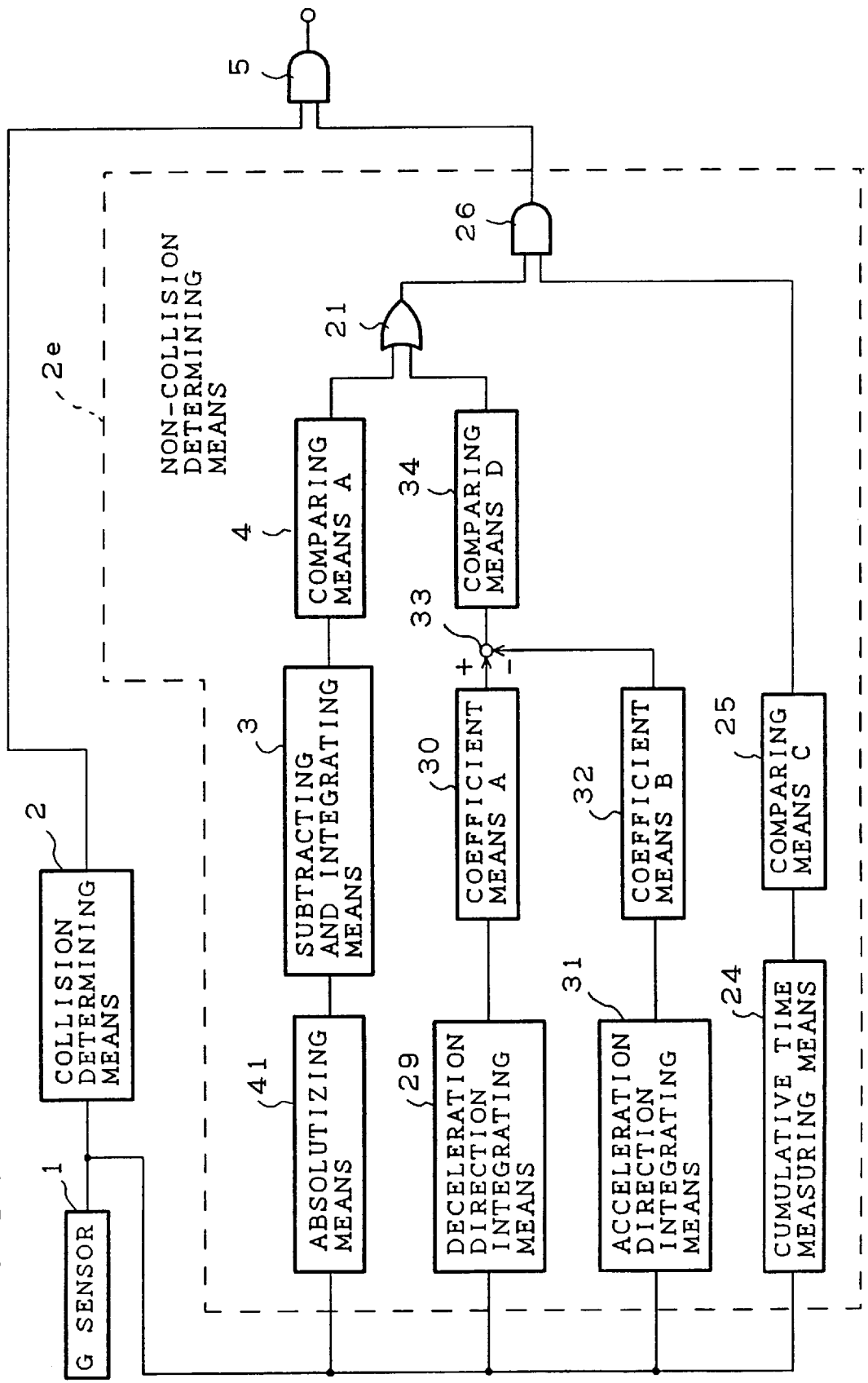
FIG. 37 is a block diagram illustrating a basic configuration of a device for starting an occupant crash protector, according to a fifth embodiment of the present invention.

FIG. 37 is a block diagram showing a basic configuration of a device for starting an occupant crash protector, according to a fifth embodiment of the present invention. The same elements of structure as those shown in FIG. 29 are identified by like reference numerals and the description of certain common elements will therefore be omitted. In FIG. 37, reference numeral 2e indicates a non-collision determining means employed in the fifth embodiment. Reference numeral 41 indicates an absolutizing means for absolutizing the output of a G sensor 1.

Figure 38:
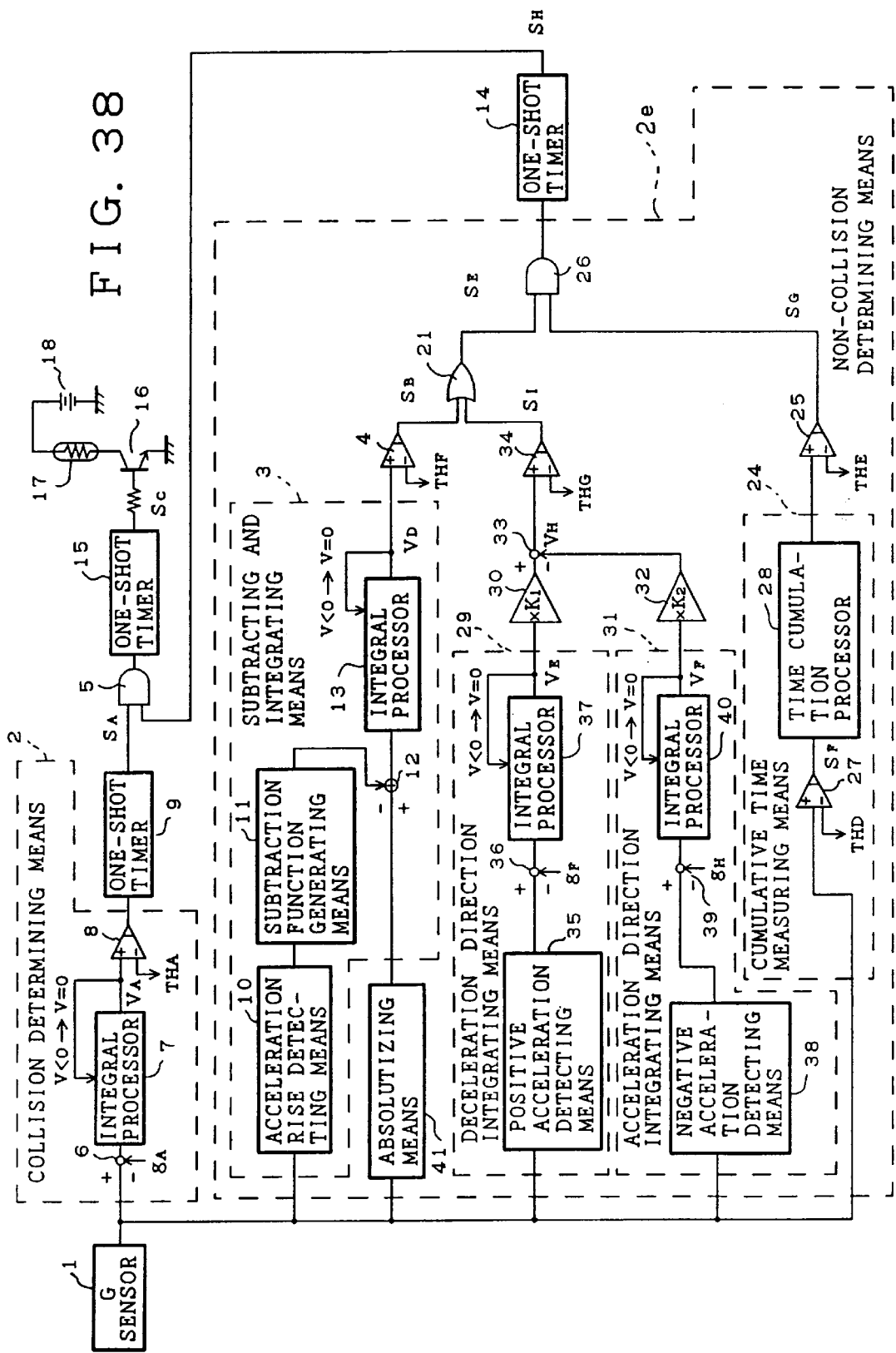
FIG. 38 is a block diagram showing specific configurational examples of respective blocks in the basic configuration shown in FIG. 37.

FIG. 38 is a block diagram illustrating specific configurational examples of respective blocks in the basic configuration shown in FIG. 37. The same elements of structure as those shown in FIG. 30 are identified by like reference numerals and the description of certain common elements will therefore be omitted.

Figure 39A:
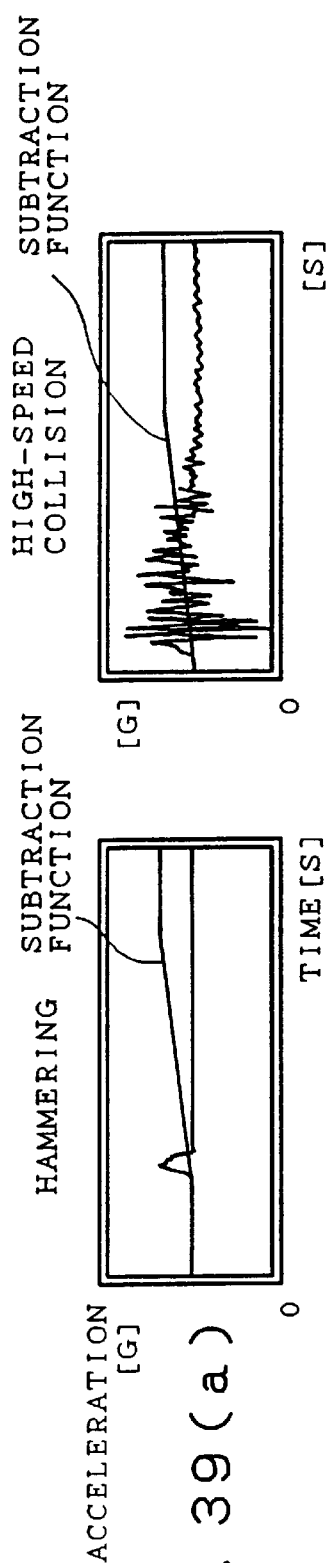
FIGS. 39(a) to 39(c) are signal waveform charts for describing the speeding up of starting of the starting device shown in FIG. 38 at the time of a high-speed collision.
Figure 39B:
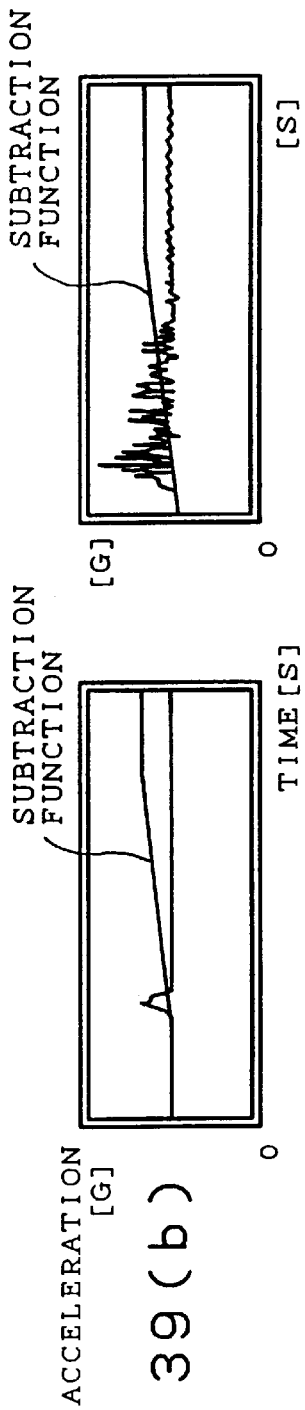
Figure 39C:
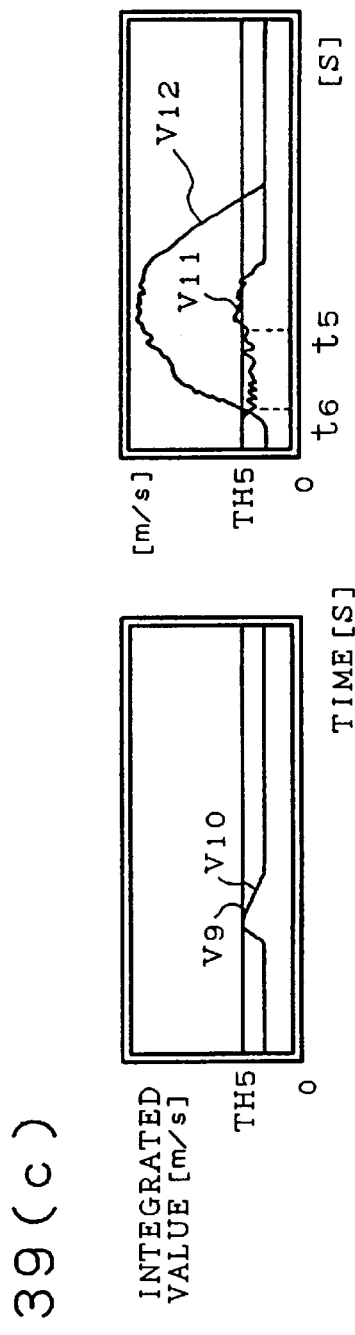
Figure 40:
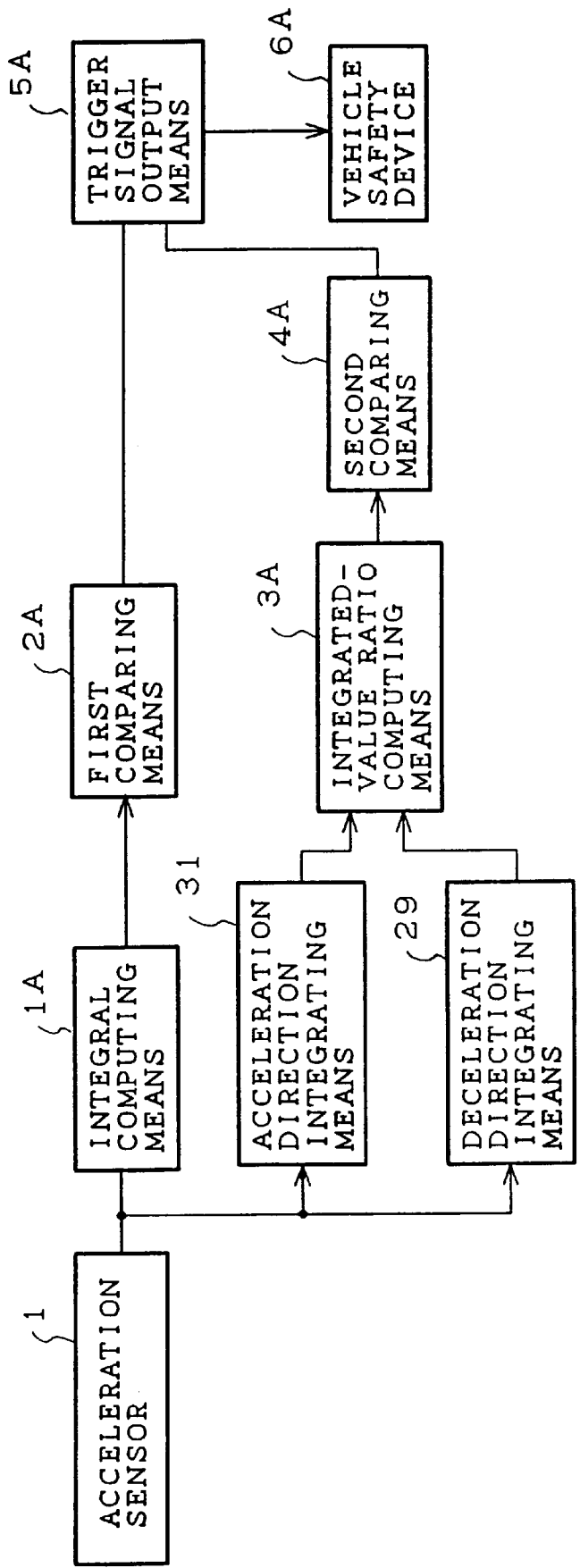
FIG. 40 is a block diagram showing the configuration of a conventional device for starting an occupant crash protector.

FIG. 39 shows parts of waveforms outputted from respective components of the device shown in FIG. 38. The left side as seen in FIG. 39(a) shows a waveform outputted from the G sensor 1 at the time of a shock such as hammering or the like, which no requires a start signal, and a subtracted value corresponding to the output of the subtraction function generating means 11. The right side as seen in FIG. 39(a) illustrates a waveform outputted from the G sensor 1 at the time of a high-speed collision which requires the start signal, and a subtracted value corresponding to the output of the subtraction function generating means 11. FIG. 39(b) shows waveforms outputted from the absolutizing means 41 for absolutizing the above two G waveforms, and subtracted values. FIG. 39(c) illustrates integrated values subsequent to the subtraction and integration by a subtracting means 12 and an integral processor 13 at the time that the two waveforms are subjected and unsbjected to an absolutizing process.

When the subtraction function is integrated after its subtraction without absolutizing the output of the G sensor 1, the subtracted and integrated value at the time of hammering or the like becomes V9 shown in FIG. 39(c) and the subtracted and integrated value at the time of the high-speed collision becomes V11 shown in FIG. 39(c). Since no start signal is required upon hammering, the threshold is set to TH5 greater than the peak value of the subtracted and integrated value V9 at hammering. Accordingly, TTF at the high-speed collision becomes t5 at which V11 exceeds the threshold TH5.

On the other hand, when the subtraction function is subtracted from the waveform produced by absolutizing the G waveform and the result of subtraction is thereafter integrated according to the fifth embodiment, the subtracted and integrated value at hammering becomes V10 shown in FIG. 39(c) and the subtracted and integrated value at the high-speed collision becomes V12 shown in FIG. 39(c). Since, however, the integrated value at hammering remains unchanged virtually even if the absolutization is made, the threshold still remains at TH5. On the other hand, since the negative acceleration is added in the positive direction, the subtracted and integrated value at the high-speed collision after execution of the absolutization rises sharply. Accordingly, the TTF at the time of the high-speed collision becomes earlier as indicated at t6. Since the integrated value after its absolutization continues to increase at the first half portion of the waveform as illustrated in FIG. 39(c), the TTF does not greatly vary due to variations in waveform.

Thus, since the acceleration on the negative side is also integrated and added by using the waveform obtained by absolutizing the output waveform of the G sensor 1, the whole waveform can be effectively used with respect to the waveform in which the acceleration on the negative side (i.e., in the direction of acceleration of the vehicle) is outputted at the first half portion of the waveform, and the start signal can be outputted at high speed.

According to the device shown in FIG. 38, the determining means employed in the first through fifth embodiments can realize a combination of both reliable prohibition against the outputting of the start signal upon all the shocks and collisions that no require the start signals and the most prompt outputting of the start signals at the time of all the collisions that require the start signals.

According to the first aspect of the present invention, as has been described above, since the start signal is obtained from the logical product of both the output of the collision determining means for determining the collision including the shock that no requires the start signal, and the output of the non-collision determining means for detecting only the collision that requires the start signal, using the value obtained by integrating the value varied with time after its subtraction, an advantageous effect can be brought about that the start signal can be reliably prevented from being outputted upon collisions such as hammering, etc. or when the vehicle travels on a rough road, and the start signal can be promptly outputted upon some high-speed collision and special collision.

According to the second aspect of the present invention, since the subtracted value generating means for generating such a value that the value integrated after the subtraction exceeds the predetermined threshold, only upon the collision which requires the start signal, as the value varied with time, is provided in the aforementioned first aspect, the same effect as that obtained according to the first aspect of the present invention can be brought about.

According to the third aspect of the present invention, since the starting device is controlled based on the ORing of both the output of the determining means, based on the subtracted and integrated value and the output of the determining means, based on the value obtained by integrating the acceleration signal, an advantageous effect can be brought about that the determining means can principally output the start signal promptly against the high-speed collision and the special collision, based on the subtracted and integrated value and principally output it promptly against the low- and medium-speed collisions, based on the acceleration integration or the integral of acceleration.

According to the fourth aspect of the present invention, since the cumulative time measuring means is used which cumulates the output time intervals during which the acceleration signal is detected in excess of the predetermined threshold, an advantageous effect can be brought about that the start signal can be reliably prevented from being outputted at the portion where the sharp and large acceleration is outputted upon commencement of the shock as in the case of both the waveform that starts from the acceleration (acceleration on the negative side) in the direction of acceleration of the vehicle like the collision from the rear, and hammering.

According to the fifth aspect of the present invention, since the generation of the start signal is controlled based on the difference between the value produced by weighting the integrated value of the acceleration signal in the direction of deceleration of the vehicle and the value produced by weighting the integrated value in the direction of acceleration of the vehicle, an advantageous effect can be brought about that the start signal can be prevented from being outputted for the shock such as the run on the curb upon which the acceleration in the direction of acceleration of the vehicle is frequently detected, and the start signal can be promptly outputted for the normal collision.

According to the sixth aspect of the present invention, since the acceleration signal is absolutized, an advantageous effect can be brought about that the start signal at the time of the collision upon which the acceleration in the direction of acceleration of the vehicle is frequently detected, can be outputted at high speed by effectively using the entirety of the waveforms about the accelerations in the direction of acceleration of the vehicle and in the direction of deceleration thereof, and the start signal at the time of the run on the curb which no requires the start signal, can be reliably prevented from being outputted.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A device for starting an occupant crash protector, comprising:

an acceleration sensor for detecting an acceleration at the time of a collision;

collision determining means for detecting said collision including a shock that does not require a start signal based on the output of said acceleration sensor;

subtracting and integrating means for subtracting a value varied with time from the output of said acceleration sensor, and integrating the result of said subtraction;

non-collision determining means for setting a value greater than a peak value of a subtracted and integrated value at the time of said shock that does not require a start signal, based on said output of said subtracting and integrating means, as a first threshold, comparing said value with each output of said subtracting and integrating means, and detecting only a collision requiring a start signal based on the result of the comparison, said non-collision determining means comprising a first comparing means; and first ANDing means for outputting a logical product of the output of said collision determining means and the output of said non-collision determining means as a start signal.

2. A device according to claim 1, wherein said subtracting and integrating means comprises:

subtracted value generated means for generating a subtracted value, wherein said value subjected to integration after subtraction by said subtracting and integrating means exceeds a first predetermined threshold only upon a collision requiring said start signal, as the value varied with time;

subtracting means for subtracting the subtracted value from the output of said acceleration sensor; and integrating means for outputting a value obtained by integrating the output of said subtracting means with respect to time to said first comparing means.

3. A device according to claim 1, wherein said non-collision determining means further comprises:

acceleration integrating means for integrating the output of said acceleration sensor;

second comparing means for comparing the output of said acceleration integrating means with a second threshold greater than the peak value of an acceleration integral at the time of said shock that does not require said start signal; and ORing means for outputting a logical product of the output of said second comparing means and the output of said first comparing) means to said first ANDing means.

4. A device according to claim 3, wherein said non-collision determining means comprises:

cumulative time measuring means for cumulating time intervals required to output accelerations exceeding a third threshold based on the output of said acceleration sensor;

third comparing means for comparing the output of said cumulative time measuring means with a fourth threshold greater than the peak value of a cumulative time interval at the time of said shock that does not require said start signal; and second ANDing means for outputting a logical product of the output of said third comparing means and the output of said ORing means to said first ANDing means.

5. A device according to claim 1, wherein said non-collision determining means comprises:

cumulative time measuring means for cumulating time intervals required to output accelerations exceeding a third threshold set based on the output of said acceleration sensor;

third comparing means for comparing the output of said cumulative time measuring means with a fourth threshold greater than the peak value of a cumulative time interval at the time of said shock that does not require said start signal;

deceleration direction integrating means for integrating a signal in the direction of deceleration of a vehicle from the output of said acceleration sensor;

first coefficient means for multiplying the output of said deceleration direction integrating means by a coefficient and assigning weights to the output thereof;

acceleration direction integrating means for integrating a signal in the direction of acceleration of said vehicle from the output of said acceleration sensor;

second coefficient means for multiplying the output of said acceleration direction integrating means by a coefficient and assigning weights to the output thereof;

fourth comparing means for comparing a value obtained by subtracting the output of said second coefficient means from the output of said first coefficient means with said fourth threshold greater than the peak value of the cumulative time interval at the time of said shock that does not require said start signal; and ORing means for outputting a logical product of the output of said first comparing means and the output of said fourth comparing means to said ANDing means.

6. A device according to claim 1, wherein an absolutizing means for absolutizing the output of said acceleration sensor is placed in a stage preceding said subtracting and integrating means.

7. A device according to claim 2, wherein an absolutizing means for absolutizing the output of said acceleration sensor is placed in a stage prior to said subtracting and integrating means.

8. A device according to claim 3, wherein an absolutizing means for absolutizing the output of said acceleration sensor is placed in a stage preceding said subtracting and integrating means.

9. A device according to claim 4, wherein an absolutizing means for absolutizing the output of said acceleration sensor is placed in a stage preceding said subtracting and integrating means.

10. A device according to claim 5, wherein an absolutizing means for absolutizing the output of said acceleration sensor is placed in a stage preceding said subtracting and integrating means.

* * * * *